(12) United States Patent
Shiomi

(10) Patent No.: US 9,052,558 B2
(45) Date of Patent: Jun. 9, 2015

(54) DISPLAY DEVICE, METHOD OF DRIVING DISPLAY DEVICE, LIQUID CRYSTAL DISPLAY, AND TELEVISION RECEIVER

(75) Inventor: Makoto Shiomi, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 257 days.

(21) Appl. No.: 13/510,217

(22) PCT Filed: Nov. 17, 2010

(86) PCT No.: PCT/JP2010/070467
§ 371 (c)(1),
(2), (4) Date: May 16, 2012

(87) PCT Pub. No.: WO2011/077867
PCT Pub. Date: Jun. 30, 2011

(65) Prior Publication Data
US 2012/0218322 A1    Aug. 30, 2012

(30) Foreign Application Priority Data
Dec. 24, 2009   (JP) .................................. 2009 293293

(51) Int. Cl.
*G09G 5/10* (2006.01)
*G02F 1/1362* (2006.01)
*G09G 3/36* (2006.01)
*H04N 5/66* (2006.01)

(52) U.S. Cl.
CPC ........ *G02F 1/136286* (2013.01); *G09G 3/3648* (2013.01); *H04N 5/66* (2013.01); *G09G 3/3614* (2013.01); *G09G 2300/0426* (2013.01); *G09G 2310/0205* (2013.01); *G09G 2320/0252* (2013.01); *G09G 2320/0261* (2013.01); *G09G 2320/0285* (2013.01); *G09G 2340/16* (2013.01)

(58) Field of Classification Search
CPC .. G06F 3/0484; G06F 3/0481; G06F 3/04842
See application file for complete search history.

(56) References Cited

U.S. PATENT DOCUMENTS

| 5,453,857 A | 9/1995 | Takahara |
| 2009/0190181 A1* | 7/2009 | Ohkawa ....................... 358/3.23 |
| 2011/0012815 A1 | 1/2011 | Tsubata |
| 2011/0315991 A1* | 12/2011 | Sugihara et al. ................ 257/59 |

FOREIGN PATENT DOCUMENTS

| JP | 6-274130 | 9/1994 |
| JP | 10-253987 | 9/1998 |
| JP | 2006-243519 | 9/2006 |
| JP | 2008-165135 | 7/2008 |
| WO | WO-2009/122608 | 10/2009 |
| WO | WO-2010/103726 | 9/2010 |
| WO | WO-2010/119597 | 10/2010 |

* cited by examiner

*Primary Examiner* — Kenneth B Lee, Jr.
(74) *Attorney, Agent, or Firm* — Morrison & Foerster LLP

(57) ABSTRACT

Data signal lines are provided to pixel arrays such that adjacent first and second pixel arrays ($\alpha$, $\beta$) and including plural pixels are provided with two data signal lines each. Each pixel includes a pixel electrode (17*a*). The two scanning signal lines (16*a*, 16*b*) are selected concurrently. Respective pixel electrodes (17*a*, 17*b*) for pixels (101, 102) are connected with a data signal line (15*x*) and a data signal line (15*y*), respectively. Input gray scales of data signals inputted to the display device externally is corrected such that if input gray scales of data signals to be supplied respectively to the pixel electrodes (17*a*, 17*b*) are different from each other, the input gray scales are corrected to cause a gray scale difference between post-correction gray scales to be greater than that between the input gray scales. Display is carried out with the post-correction gray scales.

9 Claims, 40 Drawing Sheets

FIG. 10

|  | | Comparative Pixel | | | | | | | | |
|---|---|---|---|---|---|---|---|---|---|---|
|  | | 0 | 32 | 64 | 96 | 128 | 160 | 192 | 224 | 255 |
| Target Pixel | 0 | 0 | -1 | -1 | -3 | -4 | -6 | -8 | -12 | -31 |
|  | 32 | 7 | 0 | -2 | -5 | -9 | -14 | -21 | -35 | -68 |
|  | 64 | 13 | 5 | 0 | -3 | -7 | -12 | -20 | -33 | -61 |
|  | 96 | 15 | 6 | 4 | 0 | -3 | -7 | -13 | -25 | -49 |
|  | 128 | 15 | 8 | 6 | 4 | 0 | -4 | -8 | -18 | -38 |
|  | 160 | 14 | 9 | 7 | 6 | 4 | 0 | -4 | -11 | -25 |
|  | 192 | 12 | 9 | 8 | 6 | 5 | 3 | 0 | -4 | -14 |
|  | 224 | 8 | 6 | 5 | 5 | 4 | 3 | 3 | 0 | -4 |
|  | 255 | 5 | 5 | 5 | 5 | 3 | 3 | 3 | 3 | 0 |

FIG. 11

|  | | Comparative Pixel | | | | | | | | |
|---|---|---|---|---|---|---|---|---|---|---|
|  | | 0 | 32 | 64 | 96 | 128 | 160 | 192 | 224 | 255 |
| Target Pixel | 0 | 0 | 0 | 0 | 0 | 0 | 0 | 0 | 0 | 0 |
|  | 32 | 39 | 32 | 30 | 27 | 23 | 18 | 11 | 0 | 0 |
|  | 64 | 77 | 69 | 64 | 61 | 57 | 52 | 44 | 31 | 3 |
|  | 96 | 111 | 102 | 100 | 96 | 93 | 89 | 83 | 71 | 47 |
|  | 128 | 143 | 136 | 134 | 132 | 128 | 124 | 120 | 110 | 90 |
|  | 160 | 174 | 169 | 167 | 166 | 164 | 160 | 156 | 149 | 135 |
|  | 192 | 204 | 201 | 200 | 198 | 197 | 195 | 192 | 188 | 178 |
|  | 224 | 232 | 230 | 229 | 229 | 228 | 227 | 227 | 224 | 220 |
|  | 255 | 255 | 255 | 255 | 255 | 255 | 255 | 255 | 255 | 255 |

|  |  | Comparative Pixel | | | | | | | | |
|---|---|---|---|---|---|---|---|---|---|---|
|  |  | 0 | 32 | 64 | 96 | 128 | 160 | 192 | 224 | 255 |
| Target Pixel | 0 | 0 | 0 | 0 | 0 | 0 | 0 | 0 | 0 | 0 |
|  | 32 | 39 | 32 | 30 | 27 | 23 | 18 | 11 | 0 | 0 |
|  | 64 | 77 | 69 | 64 | 61 | 57 | 52 | 44 | 31 | 3 |
|  | 96 | 111 | 102 | 100 | 96 | 93 | 89 | 83 | 71 | 47 |
|  | 128 | 143 | 136 | 134 | 132 | 128 | 124 | 120 | 110 | 90 |
|  | 160 | 174 | 169 | 167 | 166 | 164 | 160 | 156 | 149 | 135 |
|  | 192 | 204 | 201 | 200 | 198 | 197 | 195 | 192 | 188 | 178 |
|  | 224 | 232 | 230 | 229 | 229 | 228 | 227 | 227 | 224 | 220 |
|  | 255 | 255 | 255 | 255 | 255 | 255 | 255 | 255 | 255 | 255 |

FIG. 31

|  | | Comparative Pixel | | | | | | | | |
|---|---|---|---|---|---|---|---|---|---|---|
|  | | 0 | 32 | 64 | 96 | 128 | 160 | 192 | 224 | 255 |
| Target Pixel | 0 | 0 | -1 | -1 | -3 | -4 | -6 | -8 | -12 | -31 |
|  | 32 | 7 | 0 | -2 | -5 | -9 | -14 | -21 | -35 | -68 |
|  | 64 | 13 | 5 | 0 | -3 | -7 | -12 | -20 | -33 | -61 |
|  | 96 | 15 | 6 | 4 | 0 | -3 | -7 | -13 | -25 | -49 |
|  | 128 | 15 | 8 | 6 | 4 | 0 | -4 | -8 | -18 | -38 |
|  | 160 | 14 | 9 | 7 | 6 | 4 | 0 | -4 | -11 | -25 |
|  | 192 | 12 | 9 | 8 | 6 | 5 | 3 | 0 | -4 | -14 |
|  | 224 | 8 | 6 | 5 | 5 | 4 | 3 | 3 | 0 | -4 |
|  | 255 | 5 | 5 | 5 | 5 | 3 | 3 | 3 | 3 | 0 |

FIG. 32

|  | | Comparative Pixel | | | | | | | | |
|---|---|---|---|---|---|---|---|---|---|---|
|  | | 0 | 32 | 64 | 96 | 128 | 160 | 192 | 224 | 255 |
| Target Pixel | 0 | 0 | 0 | 0 | 0 | 0 | 0 | 0 | 0 | 0 |
|  | 32 | 39 | 32 | 30 | 27 | 23 | 18 | 11 | 0 | 0 |
|  | 64 | 77 | 69 | 64 | 61 | 57 | 52 | 44 | 31 | 3 |
|  | 96 | 111 | 102 | 100 | 96 | 93 | 89 | 83 | 71 | 47 |
|  | 128 | 143 | 136 | 134 | 132 | 128 | 124 | 120 | 110 | 90 |
|  | 160 | 174 | 169 | 167 | 166 | 164 | 160 | 156 | 149 | 135 |
|  | 192 | 204 | 201 | 200 | 198 | 197 | 195 | 192 | 188 | 178 |
|  | 224 | 232 | 230 | 229 | 229 | 228 | 227 | 227 | 224 | 220 |
|  | 255 | 255 | 255 | 255 | 255 | 255 | 255 | 255 | 255 | 255 |

FIG. 33

|  |  | Comparative Pixel | | | | | | | | |
|---|---|---|---|---|---|---|---|---|---|---|
|  |  | 0 | 32 | 64 | 96 | 128 | 160 | 192 | 224 | 255 |
| Target Pixel | 0 | 0 | -1 | -3 | -4 | -6 | -7 | -10 | -17 | -51 |
|  | 32 | 9 | 0 | -3 | -6 | -12 | -18 | -27 | -46 | -86 |
|  | 64 | 16 | 6 | 0 | -4 | -9 | -16 | -26 | -42 | -75 |
|  | 96 | 19 | 8 | 5 | 1 | -4 | -10 | -17 | -32 | -59 |
|  | 128 | 20 | 10 | 7 | 5 | 0 | -5 | -10 | -23 | -46 |
|  | 160 | 19 | 12 | 9 | 7 | 5 | 1 | -5 | -14 | -31 |
|  | 192 | 16 | 12 | 10 | 8 | 6 | 4 | 1 | -5 | -16 |
|  | 224 | 11 | 10 | 8 | 6 | 5 | 4 | 3 | 0 | -6 |
|  | 255 | 7 | 6 | 6 | 6 | 5 | 5 | 3 | 3 | 0 |

FIG. 34

|  |  | Comparative Pixel | | | | | | | | |
|---|---|---|---|---|---|---|---|---|---|---|
|  |  | 0 | 32 | 64 | 96 | 128 | 160 | 192 | 224 | 255 |
| Target Pixel | 0 | 0 | 0 | 0 | 0 | 0 | 0 | 0 | 0 | 0 |
|  | 32 | 41 | 32 | 29 | 26 | 20 | 14 | 5 | 0 | 0 |
|  | 64 | 80 | 70 | 64 | 60 | 55 | 48 | 38 | 22 | 0 |
|  | 96 | 115 | 104 | 101 | 97 | 92 | 86 | 79 | 64 | 37 |
|  | 128 | 148 | 138 | 135 | 133 | 128 | 123 | 118 | 105 | 82 |
|  | 160 | 179 | 172 | 169 | 167 | 165 | 161 | 155 | 146 | 129 |
|  | 192 | 208 | 204 | 202 | 200 | 198 | 196 | 193 | 187 | 176 |
|  | 224 | 235 | 234 | 232 | 230 | 229 | 228 | 227 | 224 | 218 |
|  | 255 | 255 | 255 | 255 | 255 | 255 | 255 | 255 | 255 | 255 |

(a)

(b)

(a)

(b)

DISPLAY DEVICE, METHOD OF DRIVING DISPLAY DEVICE, LIQUID CRYSTAL DISPLAY, AND TELEVISION RECEIVER

REFERENCE TO RELATED APPLICATIONS

This application is a national stage application under 35 USC 371 of International Application No. PCT/JP2010/070467, filed Nov. 17, 2010, which claims priority from Japanese Patent Application No. 2009-293293, filed Dec. 24, 2009, the entire contents of which are incorporated herein by reference.

FIELD OF THE INVENTION

The present invention relates to a liquid crystal display device in which a plurality of data signal lines are provided to each pixel array.

BACKGROUND OF THE INVENTION

Recently, liquid crystal display devices have been improved to have a larger size and higher resolution. In association with this, the number of pixels and resistances such as wiring resistances of data signals lines have been increased consequently, thereby making it difficult to sufficiently charge each pixel.

Patent Document 1 (see FIG. 35) discloses a configuration in which two data signal lines (left data signal line and a right data signal line) is provided to each pixel array to connect odd-numbered pixels in the pixel array with the left data signal line and to connect even-numbered pixels in the pixel array with the right signal line, and adjacent two scanning signal lines (one of which is connected to pixel electrodes of the odd-numbered pixels and the other one of which is connected to pixel electrodes of the even-numbered pixels) are concurrently selected. With this configuration, it becomes possible to supply the data signal potential to pixel electrodes of two adjacent pixels, thereby increasing a screen rewriting speed and allowing each pixels to have a longer charging time to electrically charge them.

Japanese Patent Application Publication, Tokukaihei, No. 10-253987 (Publication Date: Aug. 10, 1998)

SUMMARY OF INVENTION

The inventors of the present invention found that display unevenness of horizontal strip shape occurs when adjacent two scanning signal lines are concurrently selected in the configuration in which a plurality of data signal lines are provided to each pixel array as described above, and deduced that the display unevenness of horizontal strip shape occurs due to parasite capacitance between pixel electrodes in the pixel array and the data signal lines associated with the pixel electrodes. The reason why the display unevenness occurs is explained below, referring to FIGS. 35 to 38.

(a) and (b) of FIG. 36 illustrate two display images (with a white center portion and a gray surrounding portion) that supposed to be displayed formally. In FIG. 36, a to f and A to F are each one pixel. In (a) of FIG. 36, the pixels a, b, e, f, A, B, E, and F display in gray, while the pixels c, d, D, and D display in white. In (b) of FIG. 36, the pixels a, f, A, and F display in gray, while the pixels b to e, and B to E display in white. FIG. 37 is an equivalent circuit schematic, in which pixels 101 to 106 correspond to the pixels a to f in FIG. 36, and pixels 111 to 116 correspond to the pixels A to F in FIG. 36.

FIG. 38 is a timing chart illustrating a driving method for driving a liquid crystal panel (normally black mode) in displaying the image illustrated in (a) of FIG. 36. (a) of FIG. 40 illustrates a displayed image displayed by this driving method. FIG. 39 is a timing chart illustrating a driving method for driving a liquid crystal panel (normally black mode) in displaying the image illustrated in (b) of FIG. 36. (b) of FIG. 40 illustrates a displayed image displayed by this driving method. In FIGS. 38 and 39, Sx, Sy, SX, and SY are data signals to be supplied to data signal lines 15x, 15y, 15X, and 15Y, respectively (see FIG. 37). Gpa, Gpb, GPc, Gpd, Gpe, and Gpf are gate signals (scanning signals) to be supplied to scanning signal lines 16a, 16b, 16c, 16d, 16e, and 16f (see FIG. 37), respectively. Va, Vb, VA, VB, Vc, Vd, Ve, and Vf are potentials of pixel electrodes 17a, 17b, 17A, 17B, 17c, 17d, 17e, and 17f (see FIG. 37).

In the driving methods, as illustrated in FIGS. 38 and 39, pairs of the scanning lines are concurrently selected, and the data signal lines are supplied with the data signals whose polarity is reversed every frame period (1V). Further, within one horizontal scanning period (H), a pair of data signal lines (15x and 15y, or 15X and 15Y) provided to one pixel array is supplied with data signals of opposite polarities, while each of the pair of data signal lines and a data signal line adjacent thereto (15y and 15 X) are supplied with data signals of the same polarity.

More specifically, in F1, which is one of sequential frames F1 and F2, the data signal lines 15x and 15Y are supplied with positive data signals in a k-th horizontal scanning period (including a scanning period of the scanning signal lines 16a and 16b), and are supplied with positive data signals also in a (k+1)th horizontal scanning period (including a scanning period of the scanning signal lines 16c and 16d). Meanwhile, the data signal lines 15y and 15X are supplied with negative data signals in the k-th horizontal scanning period (including the scanning period of the scanning signal lines 16a and 16b), and are supplied with negative data signals also in the (k+1)th horizontal scanning period (including the scanning period of the scanning signal lines 16c and 16d).

In F2, the data signal lines 15x and 15Y are supplied with negative data signals in the k-th horizontal scanning period (including the scanning period of the scanning signal lines 16a and 16b), and are supplied with negative data signals also in the (k+1)th horizontal scanning period (including the scanning period of the scanning signal lines 16c and 16d). Meanwhile, the data signal lines 15y and 15X are supplied with positive data signals in the k-th horizontal scanning period (including the scanning period of the scanning signal lines 16a and 16b), and are supplied with positive data signals also in the (k+1)th horizontal scanning period (including the scanning period of the scanning signal lines 16c and 16d).

In order to display the image as illustrated in (a) of FIG. 36, the pixel electrodes 17a and 17b correspondingly connected with the scanning signal lines 16a and 16b configured to be concurrently selected are supplied with data signals identical in size (having voltage absolute value) but opposite in polarity (a positive data signal for gray is supplied to the pixel electrode 17a, and a negative data signal for gray is supplied to the pixel electrode 17b) in the k-th horizontal scanning period. In the (k+1)th horizontal period, the pixel electrodes 17c and 17d correspondingly connected with the scanning signal lines 16c and 16d configured to be concurrently selected are supplied with data signals identical in size (having voltage absolute value) but opposite in polarity (a positive data signal for white is supplied to the pixel electrode 17c, and a negative data signal for white is supplied to the pixel electrode 17d).

In this case, each pixel electrode is suffered from cross talks between the pixel electrode and either one of the paired data signal lines provided to the pixel to which the pixel electrode belongs. However, because data signals identical in size (having the same voltage absolute value) but opposite in polarity are supplied to the pair of data signal lines provided to the same pixel array, the influences from the cross talks cancel out each other. More specifically, for example, in F1, the data signal line 15x is supplied with a positive data signal for gray in the k-th horizontal scanning period, and with a positive data signal for white in the (k+1)th horizontal scanning period. Meanwhile, the data signal line 15y is supplied with a negative data signal for gray in the k-th horizontal scanning period, and with a negative data signal for white in the (k+1)th horizontal scanning period. As such, the data signal potential to be supplied to the data signal line 15x shifts to rising (positive side) when the time proceeds from the k-th horizontal scanning period to the (k+1) horizontal scanning period. Meanwhile, the data signal potential to be supplied to the data signal line 15y shifts to falling (negative side) when the time proceeds from the k-th horizontal scanning period to the (k+1) horizontal scanning period. In this way, the potentials in the pixel electrodes 17a and 17b is not changed as a result of the writing of the data signals, thereby avoiding the display unevenness (see (a) of FIG. 40), because a change in the potentials due to the parasite capacitance between the pixel electrode 17a or 17b and the data signal line 15x and a change in the potentials due to the parasite capacitance between the pixel electrode 17a or 17b and the data signal line 15y cancel out each other.

On the other hand, in order to display the image as illustrated in (b) of FIG. 36, the pixel electrodes 17a and 17b correspondingly connected with the scanning signal lines 16a and 16b configured to be concurrently selected are supplied with data signals identical in size (having voltage absolute value) but opposite in polarity (a positive data signal for gray is supplied to the pixel electrode 17a, and a negative data signal for white is supplied to the pixel electrode 17b) in the k-th horizontal scanning period. In the (k+1)th horizontal period, the pixel electrodes 17c and 17d correspondingly connected with the scanning signal lines 16c and 16d configured to be concurrently selected are supplied with data signals identical in size (having voltage absolute value) but opposite in polarity (a positive data signal for white is supplied to the pixel electrode 17c, and a negative data signal for white is supplied to the pixel electrode 17d).

In this case, a parasite capacitance occurs between the data signal line 15x supplied with the positive data signal for white in the (k+1)th horizontal scanning period and the pixel electrode 17a, whereby the pixel electrode 17a has a higher effective potential than a potential of the data signal (positive data signal for gray) supplied thereto (that is, Absolute value of the effective potential based on Vcom>Absolute value of data signal (potential indicated by the dotted line in FIG. 39) based on Vcom). On the other hand, a parasite capacitance occurs between the data signal line 15x supplied with the positive data signal for white in the (k+1)th horizontal scanning period and the pixel electrode 17b, whereby the pixel electrode 17b has a lower effective potential than a potential of the data signal (negative data signal for white) supplied thereto (that is, Absolute value of the effective potential based on Vcom<Absolute value of data signal (potential indicated by the dotted line in FIG. 39) based on Vcom).

More specifically, for example, in F1, the data signal line 15x is supplied with the positive data signal for gray in the k-th horizontal scanning period and with the positive data signal for white in the (k+1)th horizontal scanning period. Meanwhile, the data signal line 15y is supplied with the negative data signal for white in the k-th horizontal scanning period and with the negative data signal for white also in the (k+1)th horizontal scanning period. As such, the data signal potential to be supplied to the data signal line 15x shifts to rising (toward positive side) when the time proceeds from the k-th horizontal scanning period to the (k+1) horizontal scanning period. Meanwhile, the data signal potential to be supplied to the data signal line 15y is not changed when the time proceeds from the k-th horizontal scanning period to the (k+1) horizontal scanning period. As a result, after the data signal is supplied thereto, the potential in the pixel electrodes 17a and 17b shift to rising (toward positive side) due to the parasite capacitance caused between the data signal line 15x and the pixel electrodes 17a or 17b (see FIG. 39).

Thus, as illustrated in (b) of FIG. 40, the pixel a provided with the pixel electrode 17a becomes brighter than the target brightness (gray), while the pixel b provided with the pixel electrode 17b is darker than the target brightness (white). Similarly, the pixel e provided with the pixel electrode 17e is darker than the target brightness (white), while the pixel f provided with the pixel electrode 17f becomes brighter than the target brightness (gray). In this way, noticeable display unevenness occurs in the display image.

In view of the aforementioned problem, an object of the present invention is to improve a display quality of a display device in which a plurality of data signal lines are provided to each pixel array.

In order to attain the object, a display device according to the present invention is a display device including a plurality of scanning signal lines and a plurality of data signal lines, the data signal lines being provided to pixel arrays in such a manner that first and second pixel arrays being adjacent to each other and each including a plurality of pixels are provided with two data signal lines each, wherein: each pixel includes one or plural pixel electrodes; the scanning signal lines are selected in such a manner that every N number of the scanning signal lines are selected concurrently (N is an integer of 1 or greater); each of the first and second pixel arrays is such that one pixel electrode contained in one of two pixels arranged in sequence and one pixel electrode contained in the other one of the two pixels arranged in sequence are connected with different ones of the data signal lines via respective transistors; the transistor connected with the one pixel electrode contained in the one of two pixels arranged in sequence, and the transistor connected with the one pixel electrode contained in the other one of the two pixels arranged in sequence are connected respectively with the N number of scanning signal lines selected concurrently; the display device performs correction of input gray scales of data signals inputted to the display device externally, the display device performing the correction in such a manner that if input gray scales of data signals to be supplied respectively to the pixel electrodes contained in the two pixels arranged in sequence are different from each other, at least the input gray scale for brighter one of the two pixels is corrected to cause a gray scale difference between post-correction gray scales to be greater than a gray scale difference between the input gray scales; and the display device displays with the post-correction gray scales.

In order to attain the object, a method according to the present invention is a method of driving a display device including a plurality of scanning signal lines and a plurality of data signal lines, the data signal lines being provided to pixel arrays in such a manner that first and second pixel arrays being adjacent to each other and each including a plurality of pixels are provided with two data signal lines each, wherein:

each pixel includes one or plural pixel electrodes; the scanning signal lines are selected in such a manner that every N number of the scanning signal lines are selected concurrently (N is an integer of 1 or greater); each of the first and second pixel arrays is such that one pixel electrode contained in one of two pixels arranged in sequence and one pixel electrode contained in the other one of the two pixels arranged in sequence are connected with different ones of the data signal lines via respective transistors; and the transistor connected with the one pixel electrode contained in the one of two pixels arranged in sequence, and the transistor connected with the one pixel electrode contained in the other one of the two pixels arranged in sequence are connected respectively with the N number of scanning signal lines selected concurrently, the method includes: performing correction of input gray scales of data signals inputted to the display device externally, wherein the correction is performed in such a manner that if input gray scales of data signals to be supplied respectively to the pixel electrodes contained in the two pixels arranged in sequence are different from each other, at least the input gray scale for brighter one of the two pixels is corrected to cause a gray scale difference between post-correction gray scales to be greater than a gray scale difference between the input gray scales; and displaying with the post-correction gray scales.

Moreover, the display device may be configured such that: if the input gray scales of the data signal inputted to the display device externally so as to be supplied respectively to the pixel electrodes contained in the two pixels arranged in sequence are different from each other, both the input gray scales are corrected so as to cause the gray scale difference between post-correction gray scales to be greater than the gray scale difference between the input gray scales; and the display device displays with the post-correction gray scales.

With this configurations or method, it is possible to perform the display operation with post-correction gray scales obtained by correcting the input gray scales. The correction corrects the input gray scale in consideration of an amount of a potential change illustrated in FIG. 39. By this, the pixel potential under influence of a parasite capacitance after the potential change can be adjusted to a level of the pixel potential supposed to be attained by the input gray scale. This makes it possible to solve the display unevenness as illustrated in (b) of FIG. 40. Thus, it becomes possible to attain a greater display quality of a display device in which each pixel array is provided with a plurality of data signal lines.

Moreover, the display device may be configured to further include a correction circuit for correcting gray scales of the data signals, wherein if the correction circuit corrects the input gray scale of one of the two pixels arranged in sequence, the correction circuit corrects the input gray scale on the basis of the input gray scale of the other one of the two pixels arranged in sequence.

Moreover, the display device may be configured to further include a table in which input gray scales of data signals to be inputted to the display device externally so as to be supplied to the pixel electrodes, and post-correction gray scales are associated in advance, the correction circuit setting a post-correction gray scale by referring to the table.

Moreover, the display device may be configured such that the post-correction gray scale is calculated from the following Formula:

Post-correction gray scale level of Target Pixel=Input Gray scale level of Target Pixel+$k$×(Input Gray scale level of Target pixel−Input Gray scale level of Comparative Pixel), where:
the target pixel is that one of the two pixels arranged in sequence, whose input gray scale is to be corrected; and
the comparative pixel is that one of the two pixels arranged in sequence which is to be compared with the target pixel in correcting the input gray scale of the target pixel.

In order to attain the object, a display device according to the present invention is a display device including a plurality of scanning signal lines and a plurality of data signal lines, the data signal lines being provided to pixel arrays in such a manner that first and second pixel arrays being adjacent to each other and each including a plurality of pixels are provided with two data signal lines each, wherein: each pixel includes one or plural pixel electrodes; the scanning signal lines are selected in such a manner that every N number of the scanning signal lines are selected concurrently (N is an integer of 1 or greater), and that the scanning signal lines are selected before a formal writing period in which the data signals to be displayed are formally written; each of the first and second pixel arrays is such that one pixel electrode contained in one of two pixels arranged in sequence and one pixel electrode contained in the other one of the two pixels arranged in sequence are connected with different ones of the data signal lines via respective transistors; the transistor connected with the one pixel electrode contained in the one of two pixels arranged in sequence, and the transistor connected with the one pixel electrode contained in the other one of the two pixels arranged in sequence are connected respectively with the N number of scanning signal lines selected concurrently; the display device performs correction of input gray scales of data signals inputted to the display device externally so as to be supplied to the pixel electrodes, the display device performing the correction in such a manner that if input gray scales of data signals to be supplied respectively to pixel electrodes being connected to a same data signal line and having a writing period in which the pixel electrodes are supplied respectively with the same data signals concurrently are different from each other, one of the input gray scales is corrected to cause a gray scale difference between post-correction gray scales to be greater than a gray scale difference between the input gray scales; and the display device displays with the post-correction gray scales.

With this configuration, it is possible to perform the display operation with post-correction gray scales obtained by correcting the input gray scales. The correction corrects the input gray scale in consideration of an amount of a potential change illustrated in FIG. 26. By this, the pixel potential under influence of a parasite capacitance after the potential change can be adjusted to a level of the pixel potential supposed to be attained by the input gray scale. This makes it possible to solve the display unevenness as illustrated in (b) of FIG. 25.

Moreover, the display device may be configured such that the display device performs the correction in such a manner that an input gray scale of a data signal to be supplied to downstream one of the pixel electrodes being connected to the same data signal line and having the writing period in which the pixel electrodes are supplied respectively with the same data signals concurrently is corrected based on an input gray scale of a data signal to be supplied to upstream one of the pixel electrodes, wherein the downstream one of the pixel electrodes is on the downstream of the upstream one of the pixel electrodes along a scanning direction.

Moreover, the display device may be configured such that for a pair of scanning signal lines connected to a same data signal line via respective transistors among the scanning signal lines, a first gate pulse signal to be supplied to one of the pair of scanning signal lines and a second gate pulse signal to be supplied to the other one of the pair of scanning signal lines become active at a timing prior to a formal writing period by a time period equivalent to one horizontal scanning period, wherein the formal writing period is a period in which a data signal to be displayed is formally written; and the first gate pulse signal becomes inactive while the second gate pulse signal is still active.

In order to attain the object, a display device according to the present invention is a display device including a plurality of scanning signal lines and a plurality of data signal lines, the data signal lines being provided to pixel arrays in such a manner that first and second pixel arrays being adjacent to each other and each including a plurality of pixels are provided with two data signal lines each, wherein: each pixel includes one or plural pixel electrodes; the scanning signal lines are selected in such a manner that every N number of the scanning signal lines are selected concurrently (N is an integer of 1 or greater), and that the scanning signal lines are selected before a formal writing period in which the data signals to be displayed are formally written; each of the first and second pixel arrays is such that one pixel electrode contained in one of two pixels arranged in sequence and one pixel electrode contained in the other one of the two pixels arranged in sequence are connected with different ones of the data signal lines via respective transistors; the transistor connected with the one pixel electrode contained in the one of two pixels arranged in sequence, and the transistor connected with the one pixel electrode contained in the other one of the two pixels arranged in sequence are connected respectively with the N number of scanning signal lines selected concurrently; the display device performs correction of input gray scales of data signals inputted to the display device externally, the display device performing the correction in such a manner that if (a) input gray scales of data signal to be supplied respectively to the pixel electrodes contained in the two pixels arranged in sequence are different from each other, and (b) input gray scales of data signal to be supplied respectively to pixel electrodes being connected to a same data signal line and having a writing period in which the pixel electrodes are supplied respectively with the same data signals concurrently are different from each other, the input gray scales for the two pixels are corrected to cause a gray scale difference between post-correction gray scales to be greater than a gray scale difference between the input gray scales; and the display device displays with the post-correction gray scales.

With this configuration, it is possible to perform the display operation with post-correction gray scales obtained by correcting the input gray scales. The correction corrects the input gray scale in consideration of an amount of a potential change illustrated in FIG. 26 or 39. By this, the pixel potential under influence of a parasite capacitance after the potential change can be adjusted to a level of the pixel potential supposed to be attained by the input gray scale. This makes it possible to solve the display unevenness as illustrated in (b) of FIG. 25 or (b) of FIG. 40.

The display device may be configured to further include: a correction circuit for correcting gray scales of the data signals; and first and second tables in each of which input gray scales of data signals to be inputted to the display device externally so as to be supplied to the pixel electrodes, and post-correction gray scales are associated in advance, the first and second tables associating the input gray scales with different post-correction gray scales, and the correction circuit sets a post-correction gray scale by referring the first table, when the correction circuit corrects an input gray scale for one of the two pixels arranged in sequence, and the correction circuit setting a post-correction gray scale by referring to the second table, when the correction circuit corrects an input gray scale for the other one of the two pixels arranged in sequence.

The display device may be configured such that N=2, so that the scanning signal lines are selected in such a manner that every two scanning signal lines are selected concurrently; the transistor connected with the one pixel electrode contained in the one of two pixels arranged in sequence is connected with one of the two scanning signals selected concurrently, and the transistor connected with the one pixel electrode contained in the other one of the two pixels arranged in sequence is connected with the other one of the two scanning signals selected concurrently.

Moreover, the display device may be configured such that the pixel electrodes contained in the first pixel array are provided to overlap both of the two data signal lines provided for the first pixel array; and the pixel electrodes contained in the second pixel array are provided to overlap both of the two data signal lines provided for the second pixel array.

Moreover, the display device may be configured such that the data signal lines are supplied with the data signals in such a manner that a pair of data signal lines provided for one pixel array are supplied respectively with data signals of different polarities in a horizontal scanning period.

Moreover, the display device may be configured such that each pixel contains the plural pixel electrodes.

Moreover, the display device may be configured such that each pixel contains the two pixel electrodes connectable with each other via a capacitance, only one of the two pixel electrodes is connected with one of the data signal lines for the pixel via the transistor connected with one of the scanning signal lines.

A liquid crystal display device according to the present invention includes any one of the display devices. Moreover, a television receiver according to the present invention includes the liquid crystal display device and a tuner for receiving television broadcast.

As described above, the display devices according to the present invention and the methods according to the present invention for driving the same are arranged such that the correction of input gray scales of data signals inputted to the display device externally is performed in such a manner that if input gray scales of data signals to be supplied respectively to the pixel electrodes contained in the two pixels arranged in sequence are different from each other, at least the input gray scale for brighter one of the two pixels is corrected to cause a gray scale difference between post-correction gray scales to be greater than a gray scale difference between the input gray scales, and an image is displayed with the post-correction gray scales. By this, it is possible to improve display quality of a display device in which a plurality of data signal lines are provided for each pixel array.

BRIEF DESCRIPTION OF DRAWINGS

FIG. 10 is a table (correction amount LUT) in which the gray scales of the target pixel, the gray scales of the comparative pixel, and correction amounts are associated with each other.

FIG. 11 is a table (gray scale level correction LUT) in which the gray scales of the target pixel, the gray scales of the comparative pixel, and output gray scales (post-correction gray scales) are associated with each other.

Figure 25:
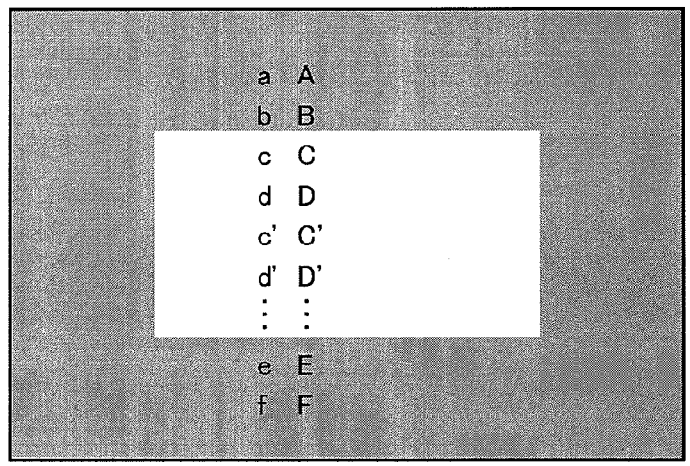
Figure 25:
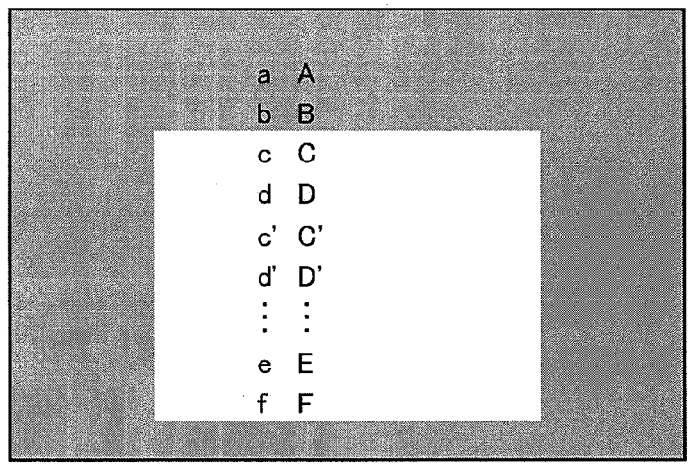

(a) and (b) of FIG. 25 are views illustrating examples of a display image (with a white center portion and a gray surrounding portion).

Figure 26:
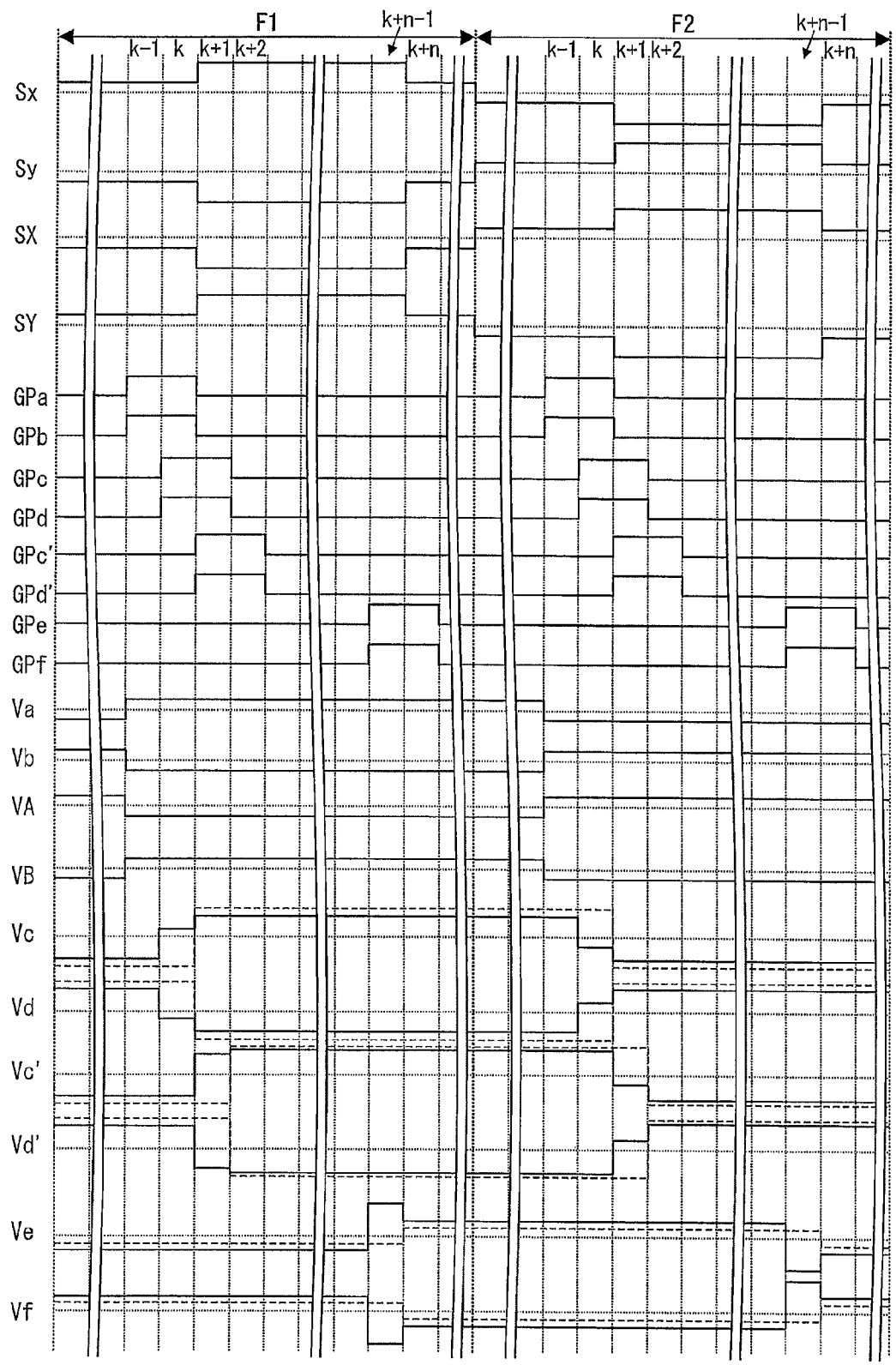

FIG. 26 is a timing chart illustrating a driving method, which results in display unevenness on a liquid crystal panel.

Figure 24:
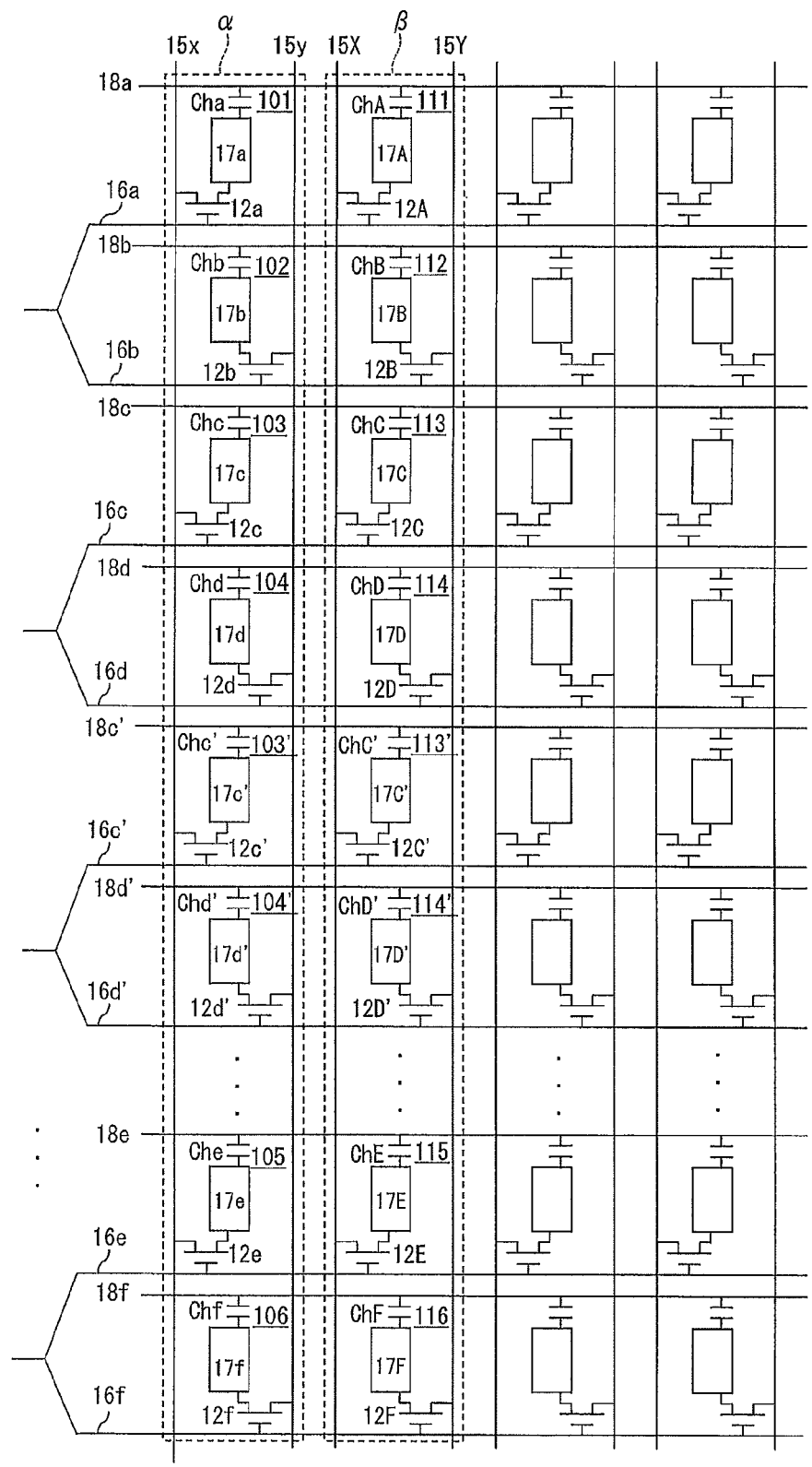
FIG. 24 is an equivalent circuit schematic illustrating part of an active matrix substrate according to Embodiment 2.
Figure 27:
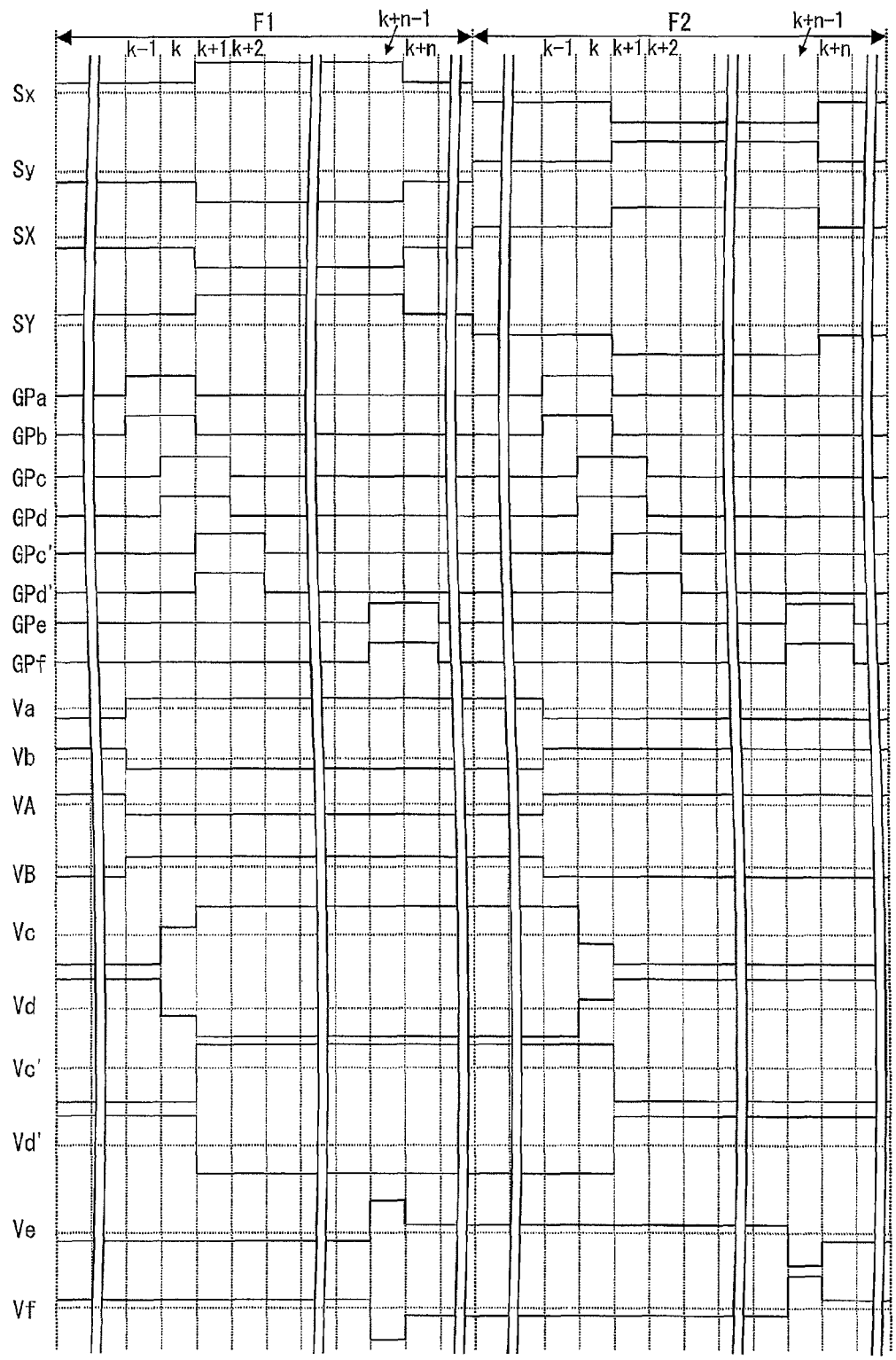

FIG. 27 is a timing chart illustrating a driving method for driving a liquid crystal panel provided with the active matrix substrate of FIG. 24.

FIG. 28 is a table (gray scale level correction LUT) in which gray scales of a target pixel, gray scales of a comparative pixel, and output gray scales (post-correction gray scales) are associated with each other.

Figure 29:
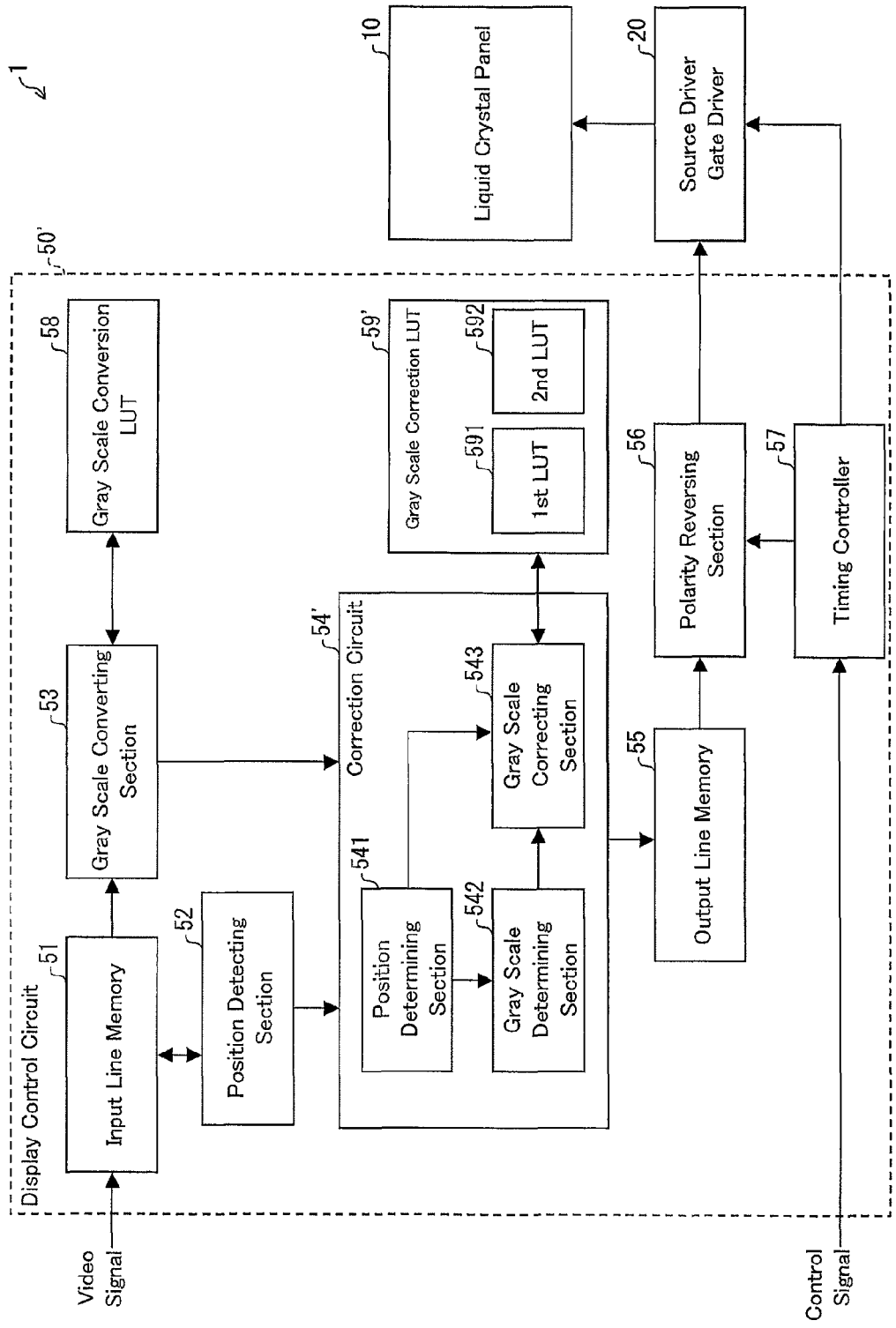

FIG. 29 is a block diagram for explaining details of a display control circuit in a liquid crystal display device according to Embodiment 3.

Figure 30:
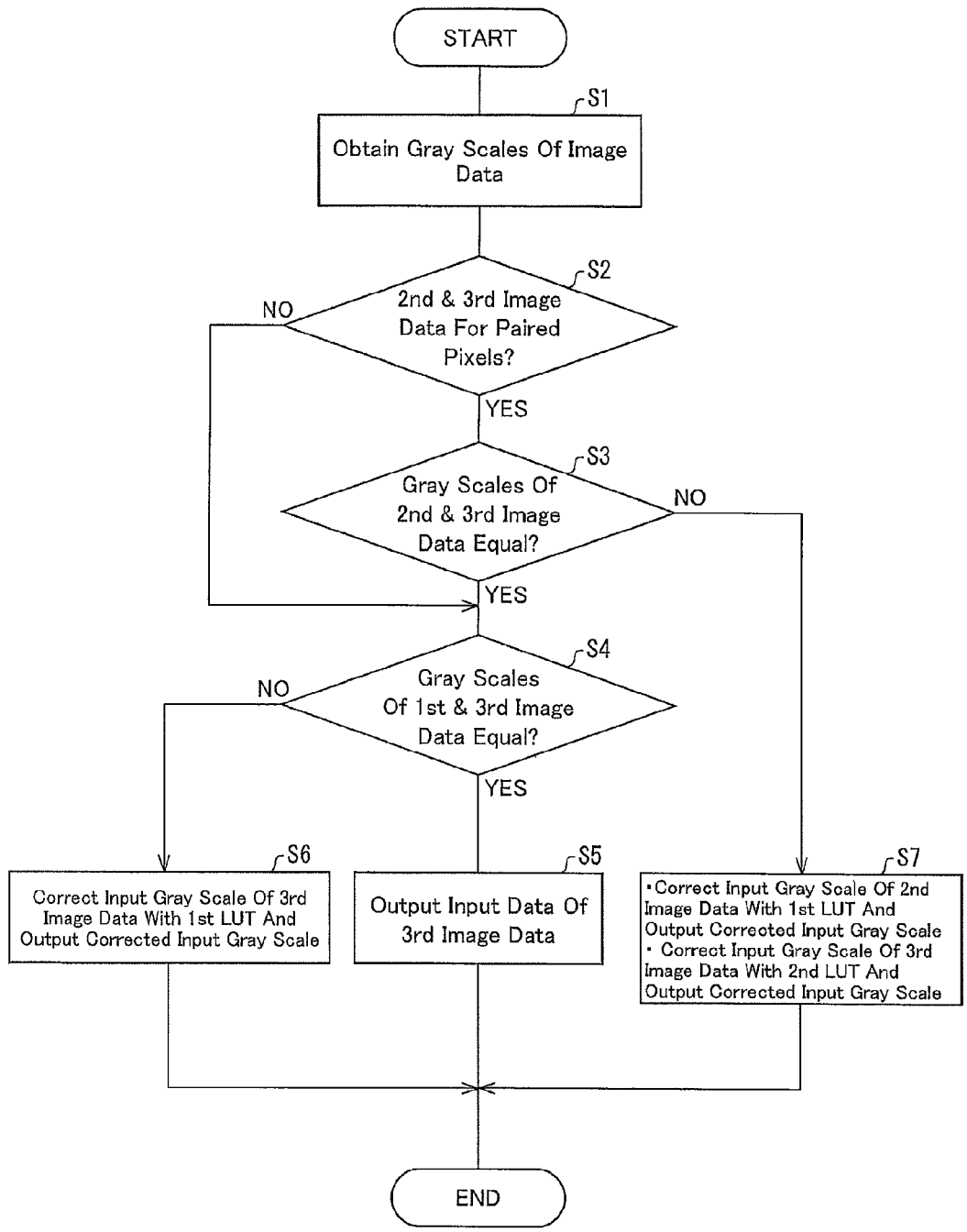

FIG. 30 is an operation flow diagram of a correction circuit in the liquid crystal display device according to Embodiment 3.

FIG. 31 is a table (first correction LUT) in which gray scales of a target pixel, pray scales of a comparative pixel, and correction amounts are associated with each other.

FIG. 32 is a table (first correction LUT) in which gray scales of a target pixel, pray scales of a comparative pixel, and output gray scales (post-correction gray scales) are associated with each other.

FIG. 33 is a table (second correction LUT) in which gray scales of a target pixel, pray scales of a comparative pixel, and correction amounts are associated with each other.

FIG. 34 is a table (second correction LUT) in which gray scales of a target pixel, pray scales of a comparative pixel, and output gray scales (post-correction gray scales) are associated with each other.

Figure 35:
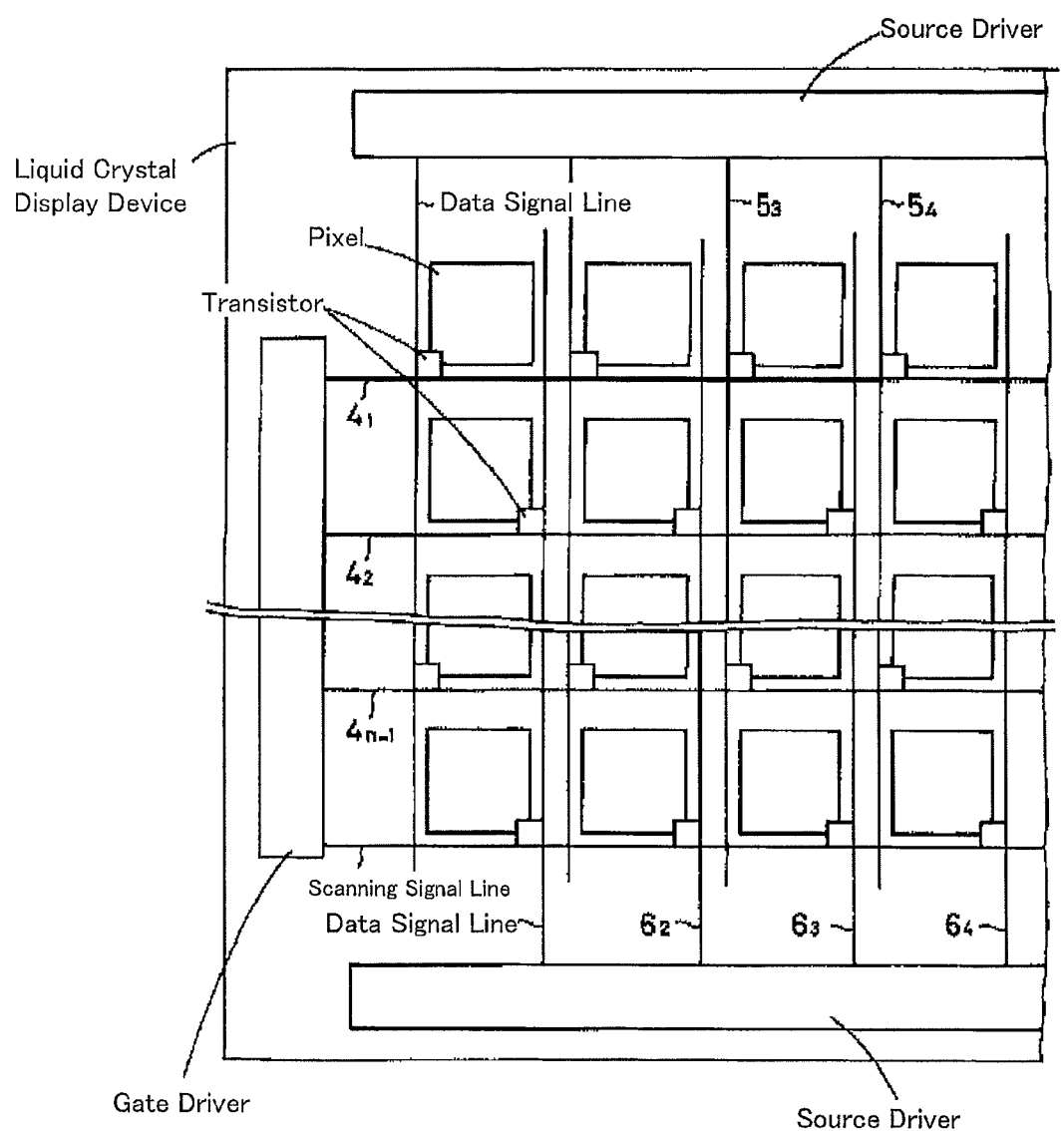

FIG. 35 is a plane view illustrating a configuration of a conventional active matrix substrate.

Figure 36:
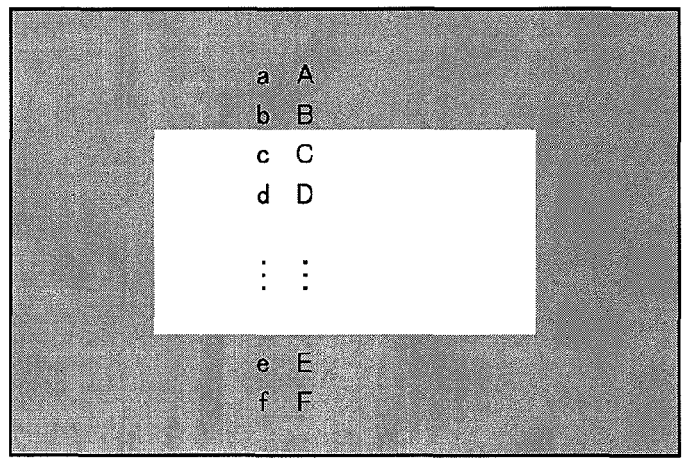
Figure 36:
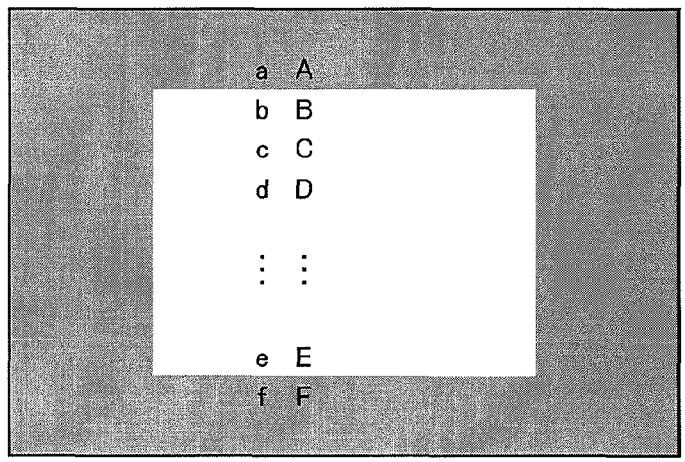

(a) of FIG. 36 is a view illustrating one example of an image to be displayed (which has a white center portion and a gray surrounding portion), and (b) of FIG. 36 is one example of an image with display unevenness.

Figure 37:
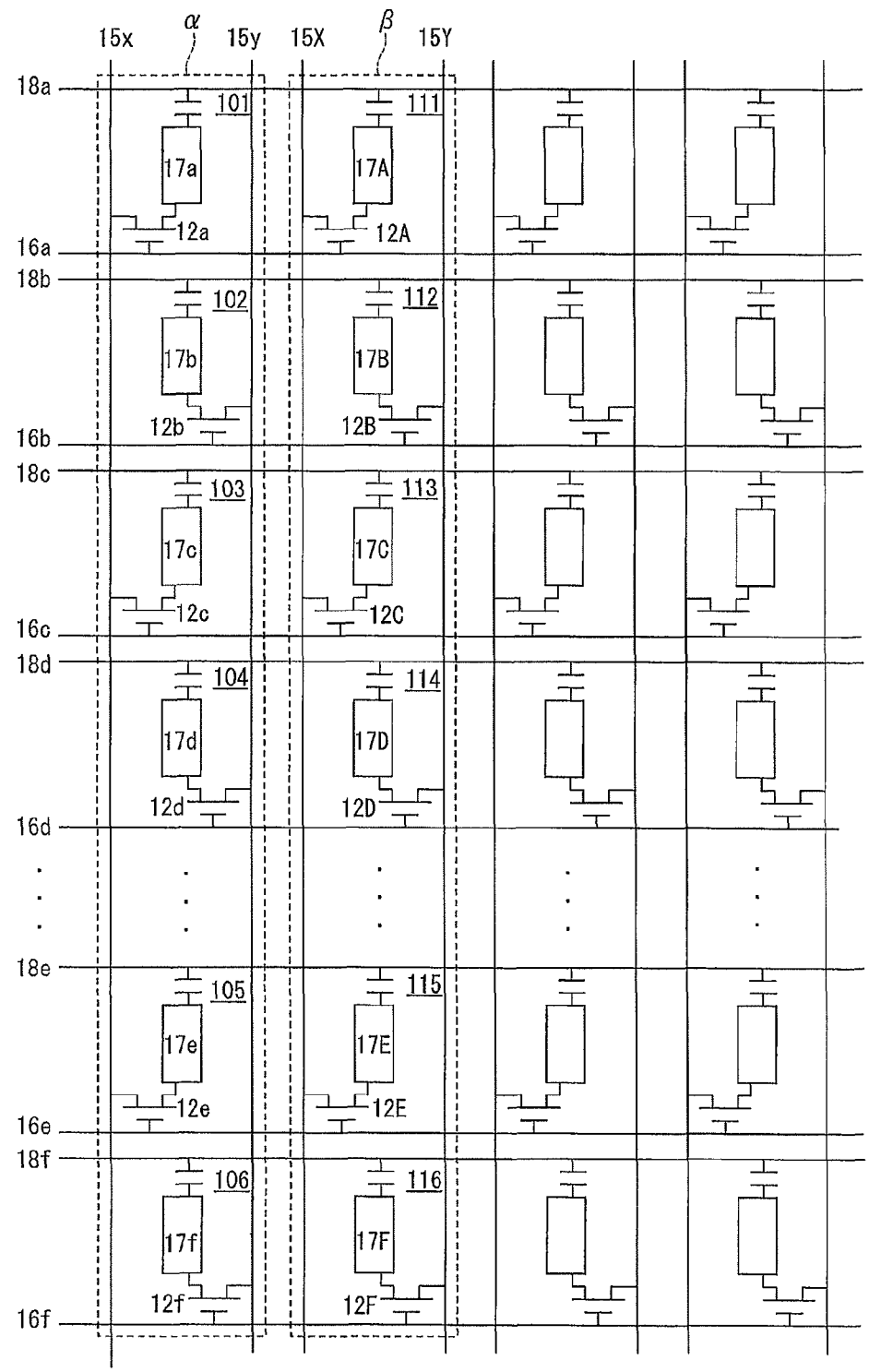

FIG. 37 is an equivalent circuit diagram of the active matrix substrate of FIG. 35.

Figure 38:
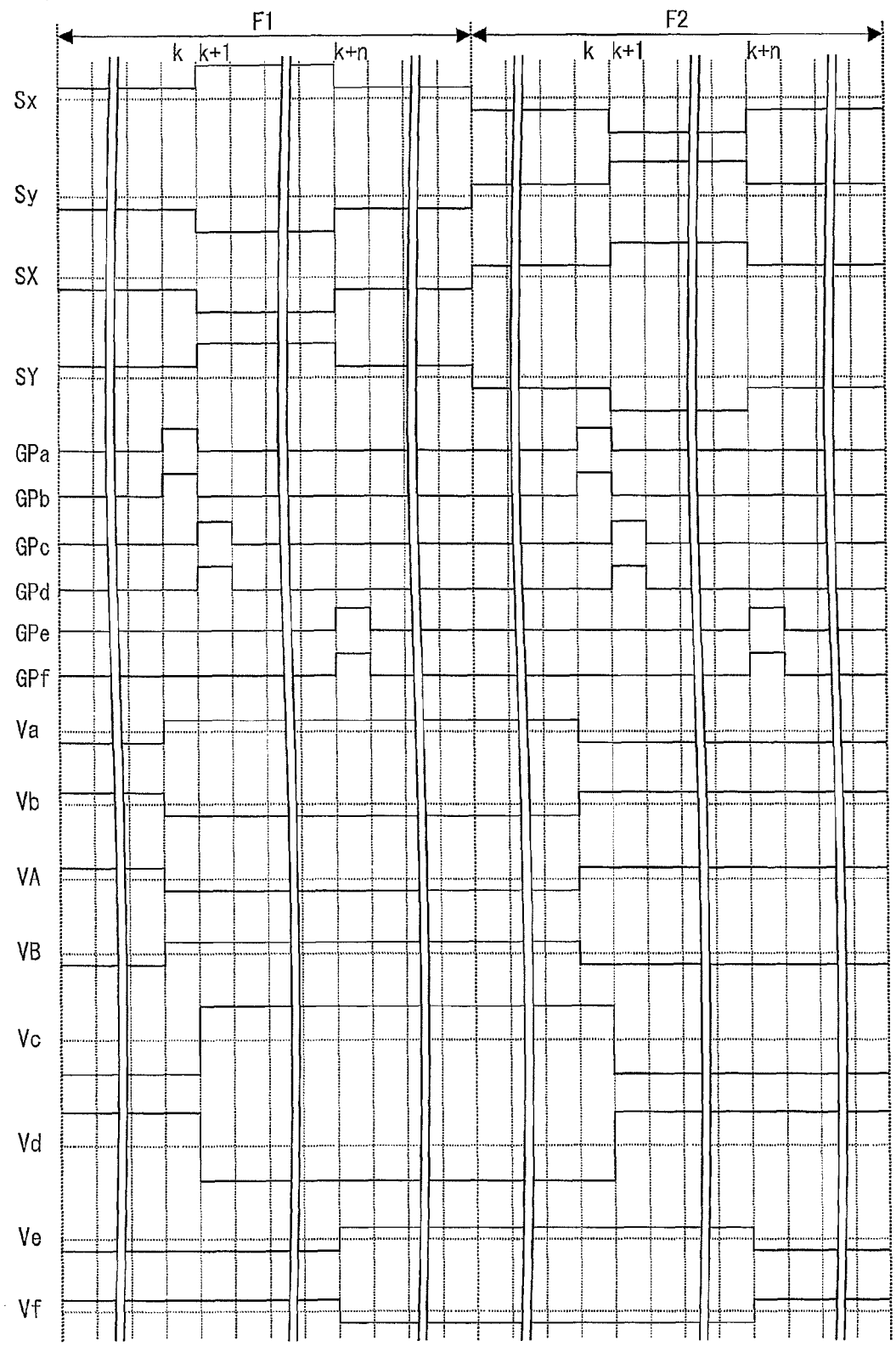

FIG. 38 is a timing chart illustrating a driving method for driving a liquid crystal panel (normally black mode) in displaying the image illustrated in (a) of FIG. 36.

Figure 39:
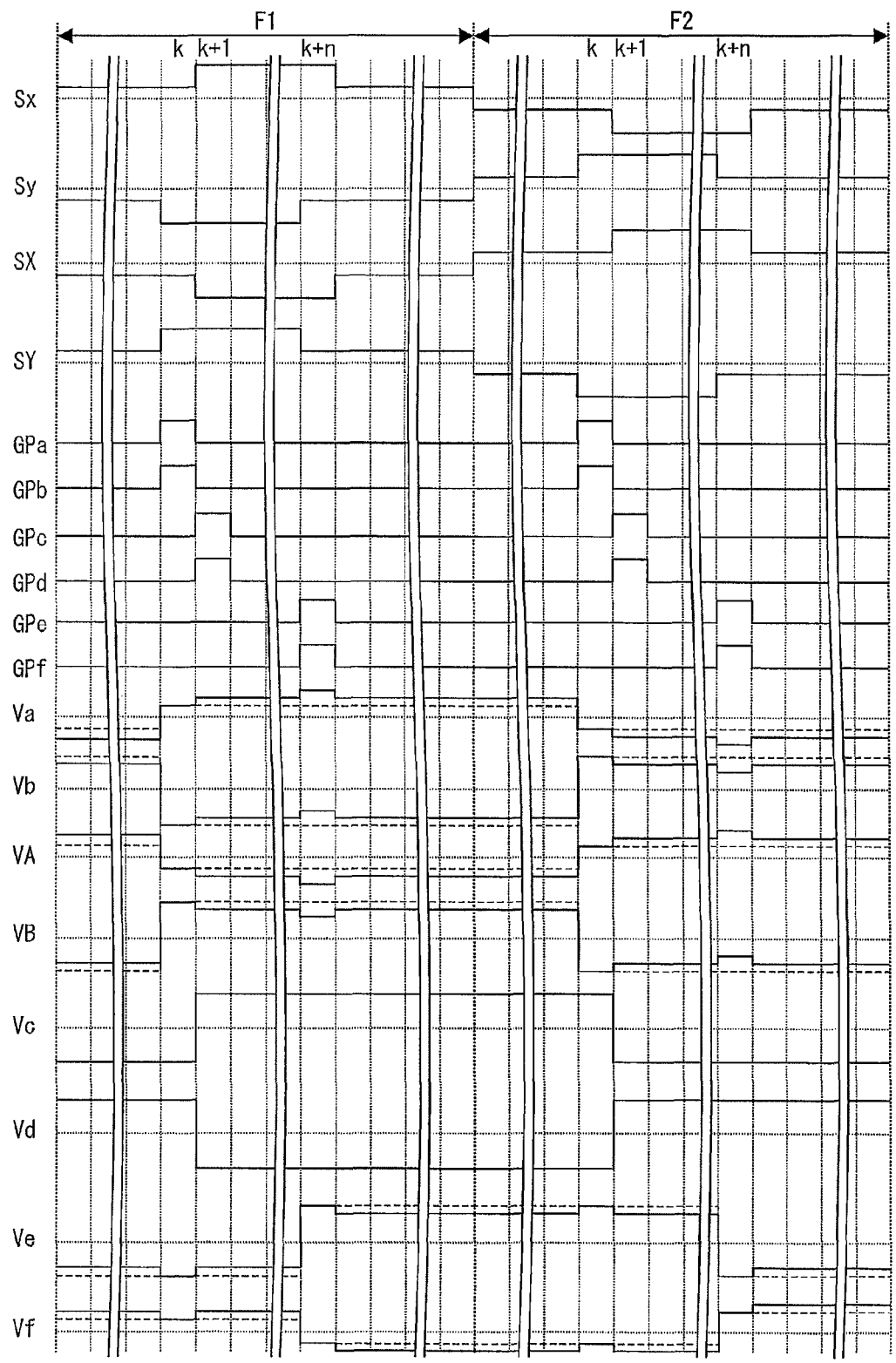

FIG. 39 is a timing chart illustrating a driving method for driving a liquid crystal panel (normally black mode) in displaying the image illustrated in (b) of FIG. 36.

Figure 40:
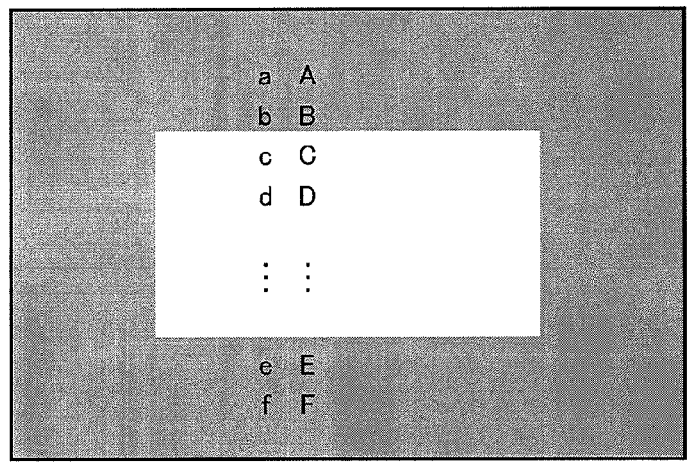
Figure 40:
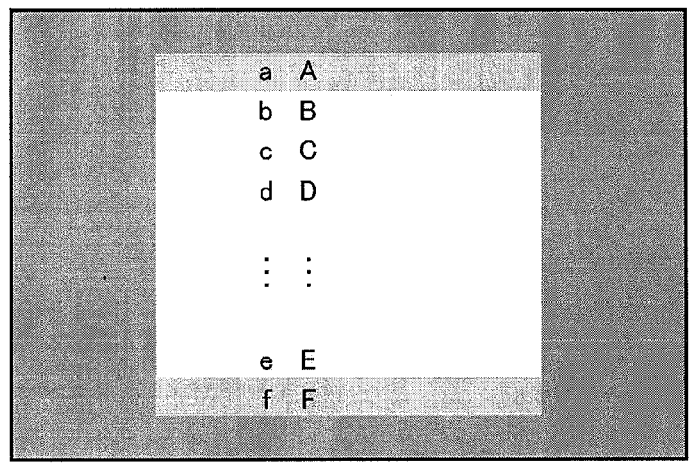

(a) of FIG. 40 is a view illustrating a display image displayed by the driving method of FIG. 38, and (b) of FIG. 40 is a view illustrating a display image displayed by a driving method of FIG. 39.

Figure 41:
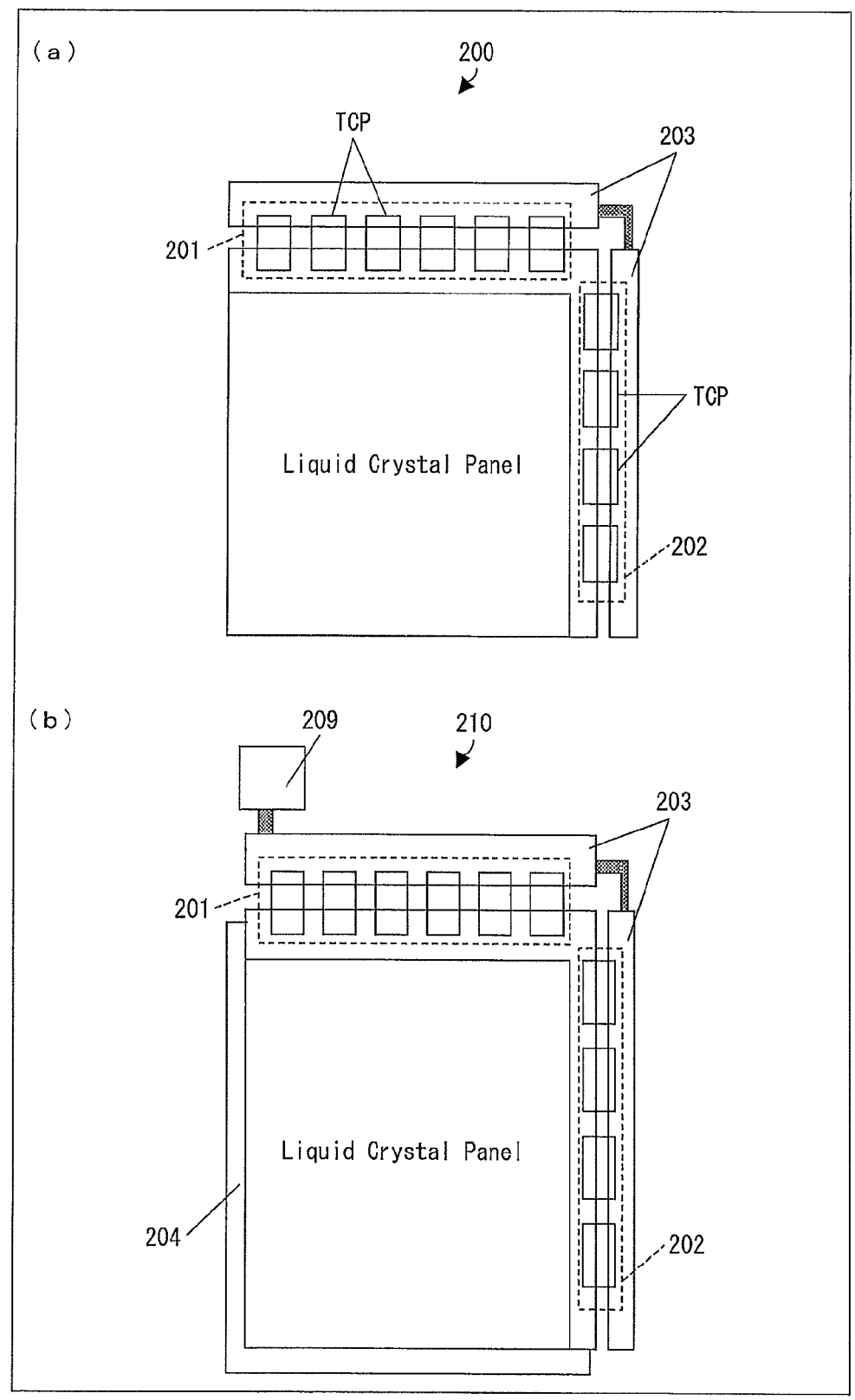

FIG. 41 is a view schematically illustrating configurations of a liquid crystal display unit and a liquid crystal display device of the present invention, where (a) of FIG. 41 illustrates the configuration of the liquid crystal display unit and (b) of FIG. 41 illustrates the configuration of the liquid crystal display device.

Figure 42:
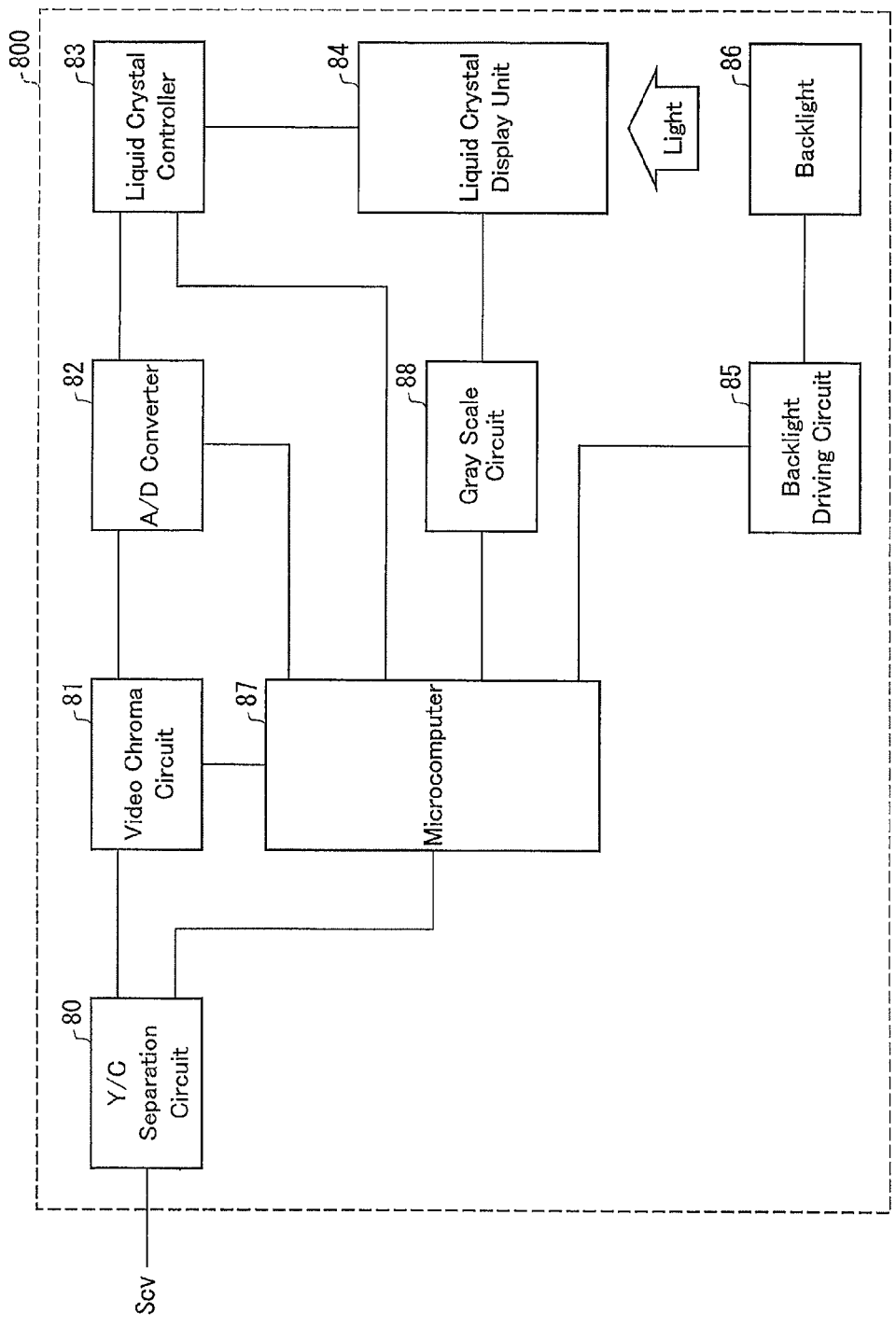

FIG. 42 is a block diagram for explaining a function of the liquid crystal display device according to the present invention.

Figure 43:
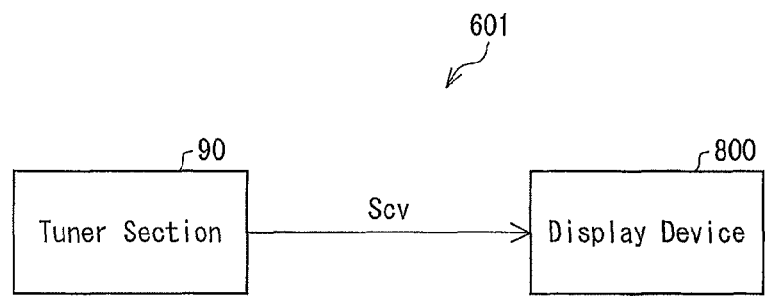

FIG. 43 is a block diagram for explaining a function of a television receiver according to the present invention.

Figure 44:
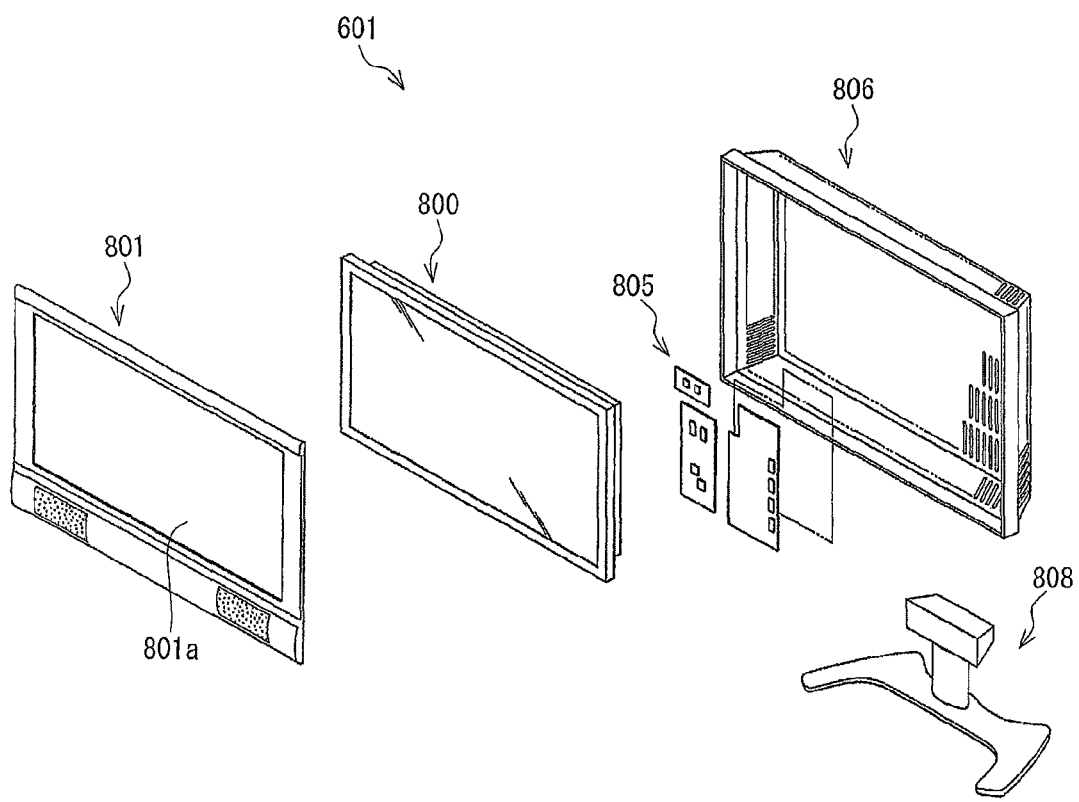

FIG. 44 is an exploded perspective view for illustrating a configuration of the television receiver according to the present invention.

DETAILED DESCRIPTION OF THE INVENTION

Embodiments of the present invention are described below, referring to drawings. Note that for the sake of easy explanation, a direction in which scanning signal lines are extended is referred to as a row direction. Needless to say, the scanning signal lines may be extended in a lateral direction or a height direction in an actual application (viewing) of a liquid crystal display device provided with a liquid crystal panel according to the present invention (or with an active matrix substrate for use in the liquid crystal panel). Note that an alignment structure is omitted from the illustration of the liquid crystal panel in the drawing, where appropriate.

Embodiment 1

Figure 3:
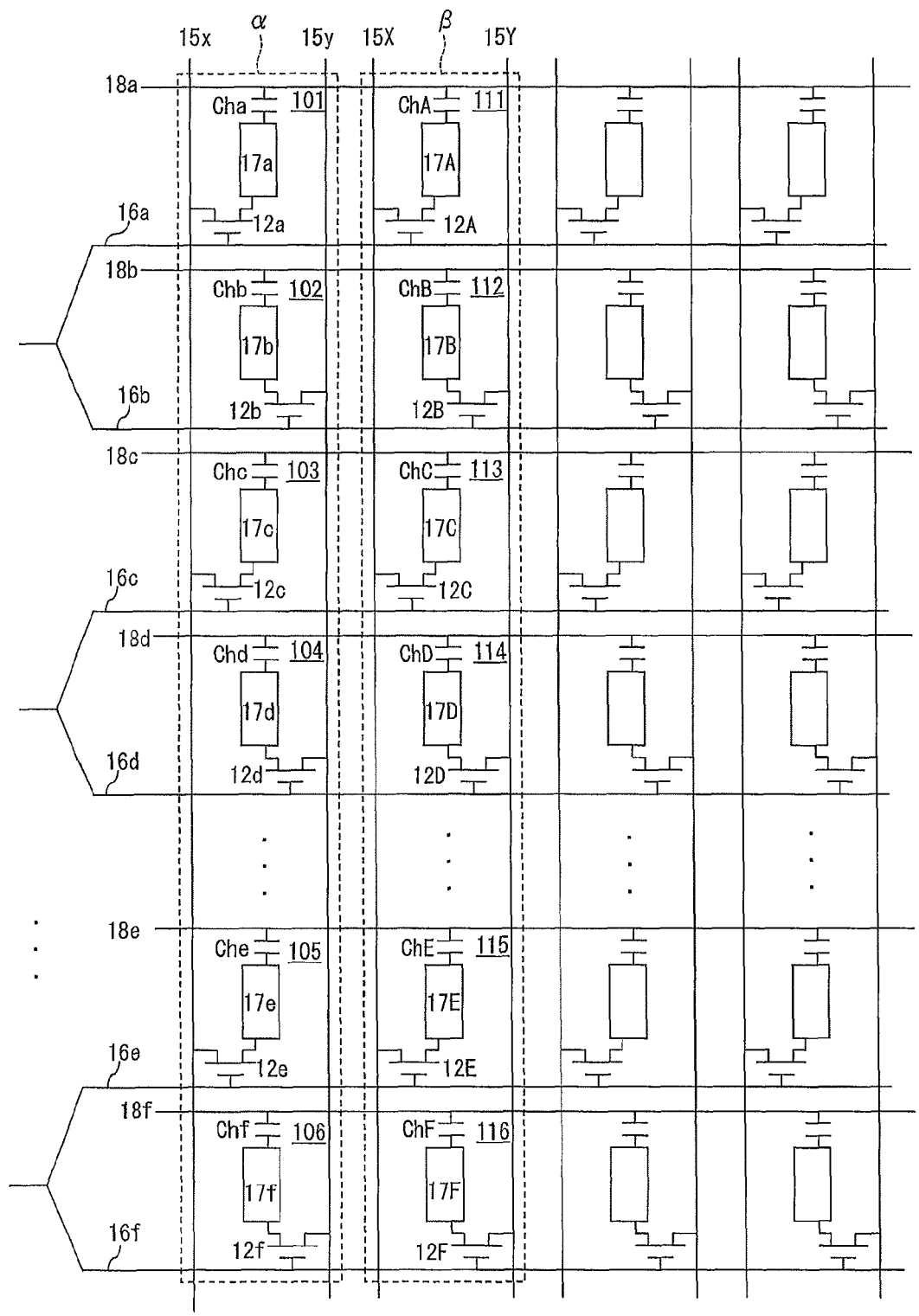
FIG. 3 is an equivalent circuit schematic illustrating part of an active matrix substrate for use in the liquid crystal panel of FIG. 1.

FIG. 3 is an equivalent circuit schematic illustrating part of an active matrix substrate according to Embodiment 1. As illustrated in FIG. 3, the active matrix substrate is configured such that data signals lines 15x, 15y, 15X, and 15Y are aligned in this order, and the scanning signal lines 16a, 16b, 16c, 16d, . . . , 16e, 16f extended along the row direction (lateral direction in FIG. 3) are aligned in this order. A pixel 101 is provided in association with an intersection of the data signal line 15x and the scanning signal line 16a, and with an intersection of the data signal line 15y and the scanning signal line 16a. A pixel 102 is provided in association with an intersection of the data signal line 15x and the scanning signal line 16b, and with an intersection of the data signal line 15y and the scanning signal line 16b. A pixel 103 is provided in association with an intersection of the data signal line 15x and the scanning signal line 16c, and with an intersection of the data signal line 15y and the scanning signal line 16c. A pixel 104 is provided in association with an intersection of the data signal line 15x and the scanning signal line 16d, and with an intersection of the data signal line 15y and the scanning signal line 16d. A pixel 105 is provided in association with an intersection of the data signal line 15x and the scanning signal line 16e, and with an intersection of the data signal line 15y and the scanning signal line 16e. A pixel 106 is provided in association with an intersection of the data signal line 15x and the scanning signal line 16f, and with an intersection of the data signal line 15y and the scanning signal line 16f. Similarly, a pixel 111 is provided in association with an intersection of the data signal line 15X and the scanning signal line 16a, and with an intersection of the data signal line 15Y and the scanning signal line 16a. A pixel 112 is provided in association with an intersection of the data signal line 15X and the scanning signal line 16b, and with an intersection of the data signal line 15Y and the scanning signal line 16b. A pixel 113 is provided in association with an intersection of the data signal line 15X and the scanning signal line 16c, and with an intersection of the data signal line 15Y and the scanning signal line 16c. A pixel 114 is provided in association with an intersection of the data signal line 15X and the scanning signal line 16d, and with an intersection of the data signal line 15Y and the scanning signal line 16d. A pixel 115 is provided in association with an intersection of the data signal line 15X and the scanning signal line 16e, and with an intersection of the data signal line 15Y and the scanning signal line 16e. A pixel 116 is provided in association with an intersection of the data signal line 15X and the scanning signal line 16f, and with an intersection of the data signal line 15Y and the scanning signal line 16f.

A retention capacitor wiring 18a is provided in association with the pixels 101 and 111. A retention capacitor wiring 18b is provided in association with the pixels 102 and 112. A retention capacitor wiring 18c is provided in association with the pixels 103 and 113. A retention capacitor wiring 18d is provided in association with the pixels 104 and 114. A retention capacitor wiring 18e is provided in association with the pixels 105 and 115. A retention capacitor wiring 18f is provided in association with the pixels 106 and 116.

The data signal lines 15x and 15y are provided in association with a pixel array α including the pixels 101 to 106, and the data signal lines 15X and 15Y are provided in association with a pixel array β including the pixels 111 to 116.

Each pixels is provided with one pixel electrode. The pixel electrode 17a of the pixel 101 is connected to the data signal line 15x via a transistor 12a connected to the scanning signal line 16a. The pixel electrode 17b of the pixel 102 is connected to the data signal line 15y via a transistor 12b connected to the scanning signal line 16b. The pixel electrode 17c of the pixel 103 is connected to the data signal line 15x via a transistor 12c connected to the scanning signal line 16c. The pixel electrode 17d of the pixel 104 is connected to the data signal line 15y via a transistor 12d connected to the scanning signal line 16d. The pixel electrode 17e of the pixel 101 is connected to the data signal line 15x via a transistor 12e connected to the scanning signal line 16e. The pixel electrode 17f of the pixel 106 is connected to the data signal line 15y via a transistor 12f connected to the scanning signal line 16f. Similarly, the pixel electrode 17A of the pixel 111 is connected to the data signal line 15X via a transistor 12A connected to the scanning signal line 16a. The pixel electrode 17B of the pixel 112 is connected to the data signal line 15Y via a transistor 12B connected to the scanning signal line 16b. The pixel electrode 17C of the pixel 113 is connected to the data signal line 15X via a transistor 12C connected to the scanning signal line 16c. The pixel electrode 17D of the pixel 114 is connected to the data signal line 15Y via a transistor 12D connected to the scanning signal line 16d. The pixel electrode 17E of the pixel 115 is connected to the data signal line 15X via a transistor 12E connected to the scanning signal line 16e. The pixel electrode 17F of the pixel 116 is connected to the data signal line 15Y via a transistor 12F connected to the scanning signal line 16f.

That is, the data signal line 15y connected with the pixel electrodes (17b, 17d, and 17f) of the even-numbered pixels (102, 104, and 106) in the pixel array α is adjacent with the data signal line 15X connected with the pixel electrodes (17A, 17C, and 17E) of the odd-numbered pixels (111, 113, and 115) in the pixel array β.

Moreover, the scanning signal line 16a for the pixel electrode 17a of the pixel 101 and the pixel electrode 17A of the pixel 111 is electrically connected, inside or outside of a panel, with the scanning signal line 16b for the pixel electrode 17b of the pixel 101 and the pixel electrode 17B of the pixel 111. The scanning signal lines 16a and 16b are configured to be currently selected (as later described). Moreover, the scanning signal line 16c for the pixel electrode 17c of the pixel 103 and the pixel electrode 17C of the pixel 113 is electrically connected, inside or outside of the panel, with the scanning signal line 16d for the pixel electrode 17d of the pixel 104 and the pixel electrode 17D of the pixel 114. The scanning signal lines 16c and 16d are configured to be currently selected (as later described). Moreover, the scanning signal line 16e for the pixel electrode 17e of the pixel 105 and the pixel electrode 17E of the pixel 115 is electrically connected, inside or outside of the panel, with the scanning signal line 16f for the pixel electrode 17f of the pixel 106 and the pixel electrode 17F of the pixel 116. The scanning signal lines 16e and 16f are configured to be currently selected (as later described).

Furthermore, a retention capacitor Cha is formed between the retention capacitor wiring 18a and the pixel electrode 17a. A retention capacitor Chb is formed between the retention capacitor wiring 18b and the pixel electrode 17b. A retention capacitor Chc is formed between the retention capacitor wiring 18c and the pixel electrode 17c. A retention capacitor Chd is formed between the retention capacitor wiring 18d and the pixel electrode 17d. A retention capacitor Che is formed between the retention capacitor wiring 18e and the pixel electrode 17e. A retention capacitor Chf is formed between the retention capacitor wiring 18f and the pixel electrode 17f. Similarly, a retention capacitor ChA is formed between the retention capacitor wiring 18a and the pixel electrode 17B. A retention capacitor ChB is formed between the retention capacitor wiring 18b and the pixel electrode 17B. A retention capacitor ChC is formed between the retention capacitor wiring 18c and the pixel electrode 17C. A retention capacitor ChD is formed between the retention capacitor wiring 18d and the pixel electrode 17D. A retention capacitor ChE is formed between the retention capacitor wiring 18e and the pixel electrode 17E. A retention capacitor ChF is formed between the retention capacitor wiring 18f and the pixel electrode 17F.

Figure 1:
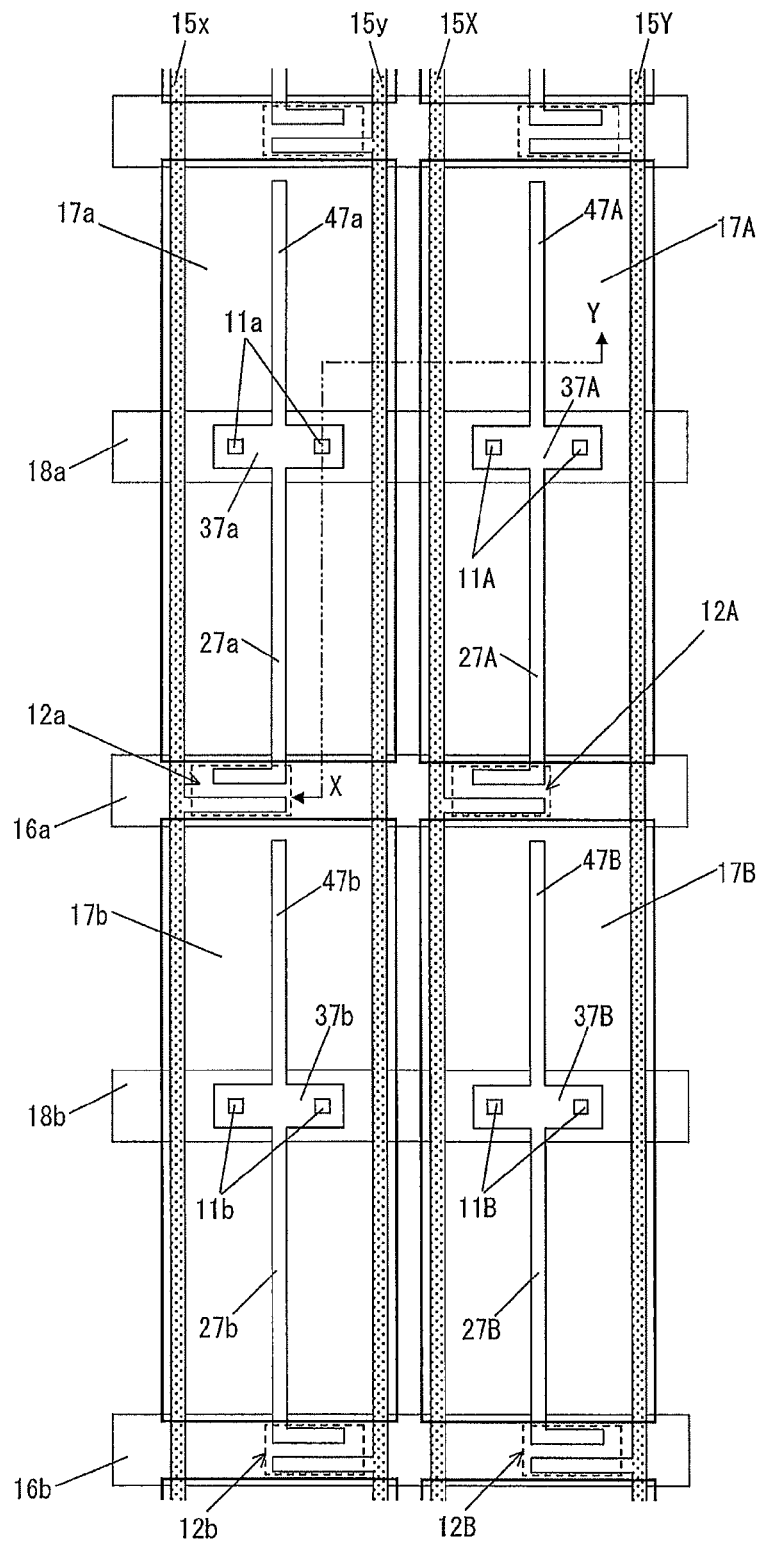
FIG. 1 is a plane view illustrating one example of a configuration of a liquid crystal panel according to Embodiment 1.
Figure 4:
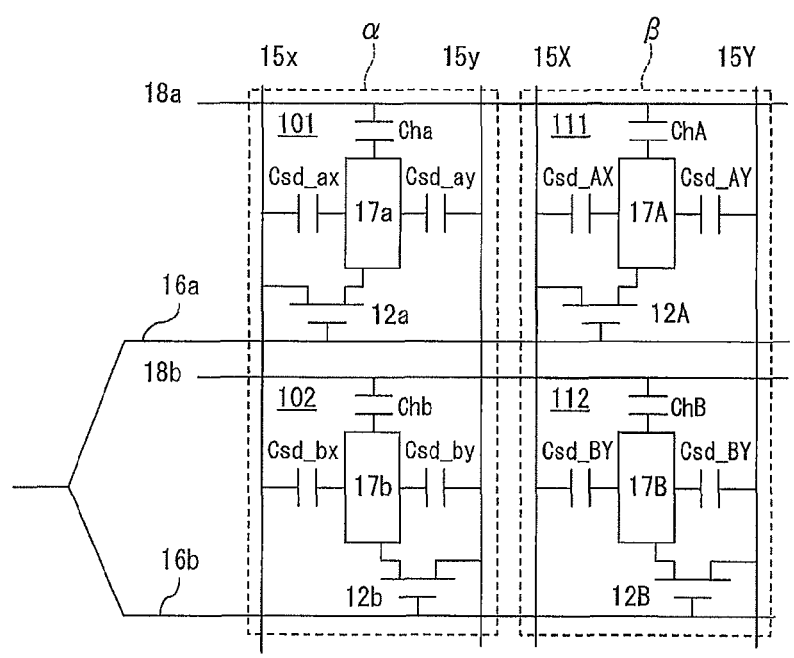
FIG. 4 is an equivalent circuit schematic illustrating how a parasite capacitance occurs in a pixel illustrated in FIG. 3.

Even though they are not so illustrated in FIG. 3, the pixel electrodes are provided to overlap with the data signal lines in order to improve transmittance (see FIG. 1). Due to this configuration, a parasite capacitance likely occur between the pixel electrodes and the data signal lines. FIG. 4 is an equivalent circuit schematic for illustrating how parasite capacitances in the pixels 101, 102, 111, and 112. As illustrated in FIG. 4, in the pixel 101, a parasite capacitance Csd_ax occurs between the pixel electrode 17a and the data signal line 15x, and a parasite capacitance Csd_ay occurs between the pixel electrode 17a and the data signal line 15y. In the pixel 102, a parasite capacitance Csd_bx occurs between the pixel electrode 17b and the data signal line 15x, and a parasite capacitance Csd_by occurs between the pixel electrode 17b and the data signal line 15y. In the pixel 111, a parasite capacitance Csd_AX occurs between the pixel electrode 17A and the data signal line 15X, and a parasite capacitance Csd_AY occurs between the pixel electrode 17A and the data signal line 15Y. In the pixel 112, a parasite capacitance Csd_BX occurs between the pixel electrode 17B and the data signal line 15X, and a parasite capacitance Csd_BY occurs between the pixel electrode 17B and the data signal line 15Y. In the later drawings again, the parasite capacitance is omitted from the illustration.

Figure 5:
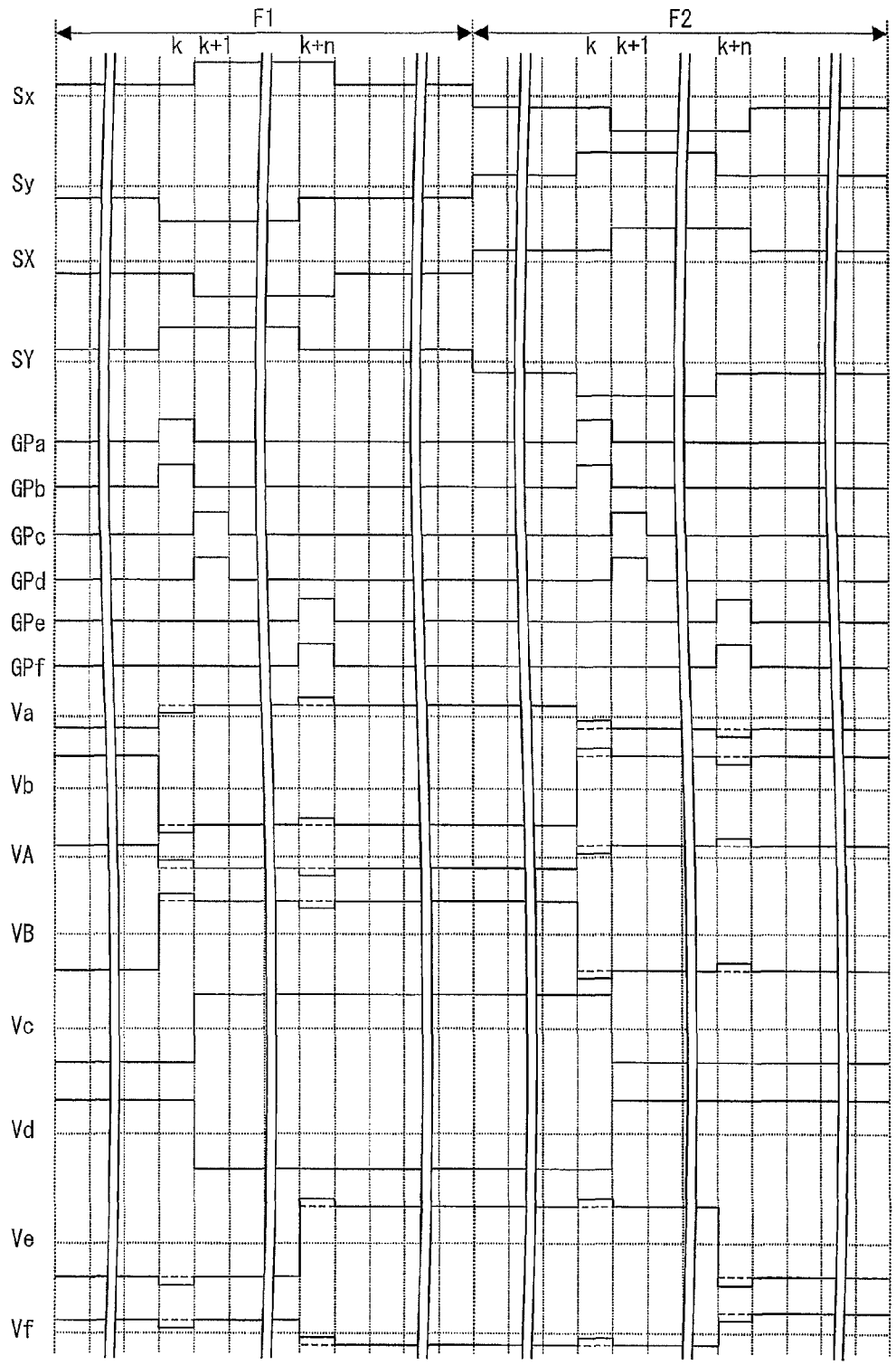
FIG. 5 is a timing chart illustrating a driving method for driving a liquid crystal panel provided with the active matrix substrate illustrated in FIG. 3.

FIG. 5 is a timing chart illustrating a driving method for driving a liquid crystal panel (normally black mode) provided with the active matrix substrate. Note that the reference characters Sx, Sy, SX, and SY indicate data signals to be supplied to the data signal lines 15x, 15y, 15X, and 15Y, respectively. The reference characters GPa, GPb, Gpc, GPd, Gpe, and GPf indicate gate signals (scanning signals) to be supplied to the scanning signal lines 16a, 16b, 16c, 16d, 16e, and 16f, respectively. The reference characters Va, Vb, VA, VB, Vc, Vd, Ve, and Vf indicate potentials of the pixel electrodes 17a, 17b, 17A, 17B, 17c, 17d, 17e, and 17f, respectively.

The driving method of the present embodiment is, as illustrated in FIG. 5, arranged such that (i) the scanning signal lines are driven by selecting two of the scanning signal lines concurrently at a time, (ii) the polarities of the data signals to be supplied to the data signals are reversed every frame period (1V), and (iii) in one horizontal scanning period (H), paired data signal lines (15x and 15y, or 15X and 15Y) provided for the same pixel array are supplied with data signals of opposite polarities while each of the pair of data signal lines and a data signal line adjacent thereto (15y and 15 X) are supplied with data signals of the same polarity.

More specifically, in F1, which is one of sequential frames F1 and F2, the data signal lines 15x and 15Y are supplied with positive data signals in a k-th horizontal scanning period (including a scanning period of the scanning signal lines 16a and 16b), and are supplied with positive data signals also in a (k+1)th horizontal scanning period (including a scanning period of the scanning signal lines 16c and 16d). Further, the data signal lines 15x and 15Y are supplied with positive data signals also in a (k+n)th horizontal scanning period (including a scanning period of the scanning signal lines 16e and 16f). Meanwhile, the data signal lines 15y and 15X are supplied with negative data signals in the k-th horizontal scanning period (including the scanning period of the scanning signal lines 16a and 16b), and are supplied with negative data signals also in the (k+1)th horizontal scanning period (including the scanning period of the scanning signal lines 16c and 16d). Further, the data signal lines 15y and 15X are supplied with negative data signals also in the (k+n)th horizontal scanning period (including the scanning period of the scanning signal lines 16e and 16f). At the timing of the start of the k-th horizontal scanning period, pulses of a gate pulse signal (gate-on pulse signal) GPa and a gate pulse signal GPb are risen. At the timing of the start of the (k+1)th horizontal scanning period (at the timing of the end of the k-th horizontal scanning period), the pulses of GPa and Gpb are fallen and pulses of a gate pulse signal GPc are risen.

Figure 6:
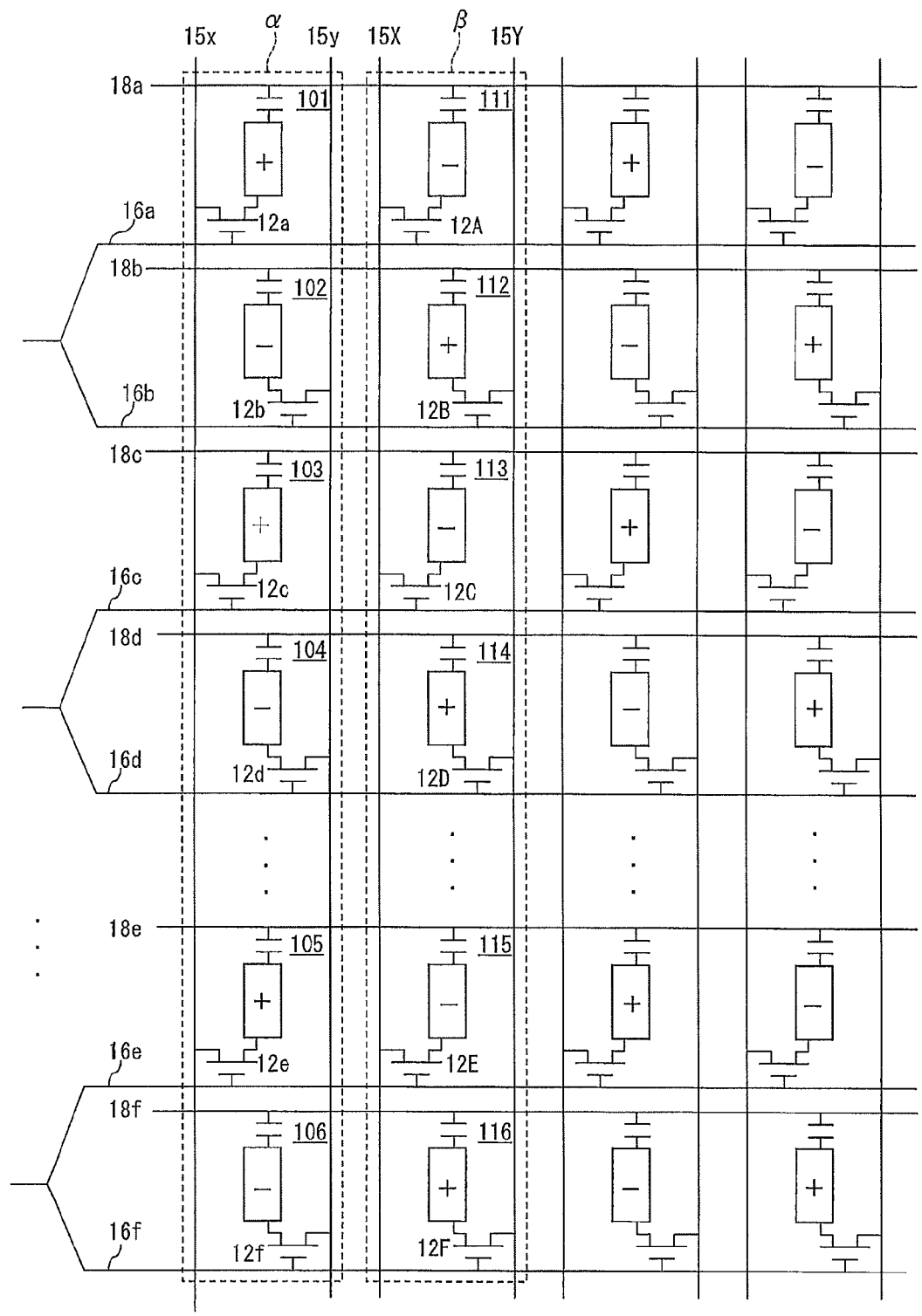
FIG. 6 is a schematic view illustrating how the liquid crystal panel performs its display operation according to the driving method of FIG. 5.

By this, as illustrated in FIGS. 5 and 6, the pixel electrode 17a of the pixel 101 is supplied with a positive data signal. The pixel electrode 17b of the pixel 102 is supplied with a negative data signal. The pixel electrode 17c of the pixel 103 is supplied with a positive data signal. The pixel electrode 17d of the pixel 104 is supplied with a negative data signal. The pixel electrode 17e of the pixel 105 is supplied with a positive data signal. The pixel electrode 17f of the pixel 106 is supplied with a negative data signal. The pixel electrode 17A of the pixel 111 is supplied with a negative data signal. The pixel electrode 17B of the pixel 112 is supplied with a positive data signal.

In F2, the data signal lines 15x and 15Y are supplied with negative data signals in the k-th horizontal scanning period (including the scanning period of the scanning signal lines 16a and 16b), and are supplied with negative data signals also in the (k+1)th horizontal scanning period (including the scanning period of the scanning signal lines 16c and 16d). Further, the data signal lines 15x and 15Y are supplied with negative data signals also in the (k+n)th horizontal scanning period (including the scanning period of the scanning signal lines 16e and 16f). Meanwhile, the data signal lines 15y and 15X are supplied with positive data signals in the k-th horizontal scanning period (including the scanning period of the scanning signal lines 16a and 16b), and are supplied with positive data signals also in the (k+1)th horizontal scanning period (including the scanning period of the scanning signal lines 16c and 16d). Further, the data signal lines 15y and 15X are supplied with positive data signals also in the (k+n)th horizontal scanning period (including the scanning period of the scanning signal lines 16e and 16f). At the timing of the start of the k-th horizontal scanning period, the pulses of the gate pulse signal GPa and the gate pulse signal GPb are risen. At the timing of the start of the (k+1)th horizontal scanning period (at the timing of the end of the k-th horizontal scanning period), the pulses of GPa and Gpb are fallen and the pulses of a gate pulse signal GPc are risen.

By this, as illustrated in FIG. 5, the pixel electrode 17a of the pixel 101 is supplied with a negative data signal. The pixel electrode 17b of the pixel 102 is supplied with a positive data signal. The pixel electrode 17c of the pixel 103 is supplied with a negative data signal. The pixel electrode 17d of the pixel 104 is supplied with a positive data signal. The pixel electrode 17e of the pixel 105 is supplied with a negative data signal. The pixel electrode 17ƒ of the pixel 106 is supplied with a positive data signal. The pixel electrode 17A of the pixel 111 is supplied with a positive data signal. The pixel electrode 17B of the pixel 112 is supplied with a negative data signal. The changes in the potentials (pixel potential) of the pixel electrodes in FIG. 5 will be explained later.

FIG. 1 is a plane view illustrating part of a liquid crystal display panel provided with the active matrix substrate of FIG. 3. In FIG. 1, for the sake of easy illustration, members on the color filter substrate (counter substrate) are not illustrated, while only members on the active matrix substrate are illustrated.

In the liquid crystal panel of the present embodiment, as illustrated in FIG. 1, the pair of (two) the data signal lines 15x and 15y and the pair of (two) the data signal lines 15X and 15Y are provided adjacent to each other. The scanning signal lines 16a and the scanning signal lines 16b are provided to cross the data signals lines perpendicularly. In the vicinity of an intersection between the data signal line 15x and the scanning signal line 16a, the transistor 12a is provided. In the vicinity of an intersection between the data signal line 15y and the scanning signal line 16b, the transistor 12b is provided. In the vicinity of an intersection between the data signal line 15X and the scanning signal line 16a, the transistor 12A is provided. In the vicinity of an intersection between the data signal line 15Y and the scanning signal line 16b, the transistor 12B is provided.

The pixel electrode 17a is provided to overlap the data signal lines 15x and 15y. Along the scanning direction, a downstream-side edge of the pixel electrode 17a overlaps with an upstream-side edge of the scanning signal line 16a. Moreover, the pixel electrode 17b is provided to overlap the data signal lines 15x and 15y. Along the scanning direction, a downstream-side edge of the pixel electrode 17b overlaps with an upstream-side edge of the scanning signal line 16b. Moreover, the pixel electrode 17A is provided to overlap the data signal lines 15X and 15Y. Along the scanning direction, a downstream-side edge of the pixel electrode 17A overlaps with an upstream-side edge of the scanning signal line 16a. The pixel electrode 17B is provided to overlap the data signal lines 15X and 15Y. Along the scanning direction, a downstream-side edge of the pixel electrode 17B overlaps with an upstream-side edge of the scanning signal line 16b.

The retention capacitor wiring 18a is provided to overlap center portions of the pixel electrode 17a and the pixel electrode 17A. The retention capacitor wiring 18b is provided to overlap center portions of the pixel electrode 17b and the pixel electrode 17B.

When viewed in a plane view, two edges of the pixel electrode 17a along a column direction are located outside the data signal line 15x and the data signal line 15y. Similarly, two edges of the pixel electrode 17b along the column direction are located outside the data signal line 15x and the data signal line 15y. Moreover, two edges of the pixel electrode 17A along the column direction are located outside the data signal line 15X and the data signal line 15Y. Similarly, two edges of the pixel electrode 17B along the column direction are located outside the data signal line 15X and the data signal line 15Y.

Moreover, the scanning signal line 16a functions as a gate electrode of the transistor 12a. A source electrode of the transistor 12a is connected to the data signal line 15x. A drain electrode of the transistor 12a is connected to a capacitor electrode 37a via a drain extraction electrode 27a. The capacitor electrode 37a is positioned above the retention capacitor wiring 18a, and connected with the pixel electrode 17a via two contact holes 11a. From the capacitor electrode 37a, an extension wiring 47a is extended to overlap with the pixel electrode 17a. Moreover, the scanning signal line 16b functions as a gate electrode of the transistor 12b. A source electrode of the transistor 12b is connected to the data signal line 15y. A drain electrode of the transistor 12b is connected to a capacitor electrode 37b via a drain extraction electrode 27b. The capacitor electrode 37b is positioned above the retention capacitor wiring 18b, and connected with the pixel electrode 17b via two contact holes 11b. From the capacitor electrode 37b, an extension wiring 47b is extended to overlap with the pixel electrode 17b.

Similarly, the scanning signal line 16a functions as a gate electrode of the transistor 12A. A source electrode of the transistor 12A is connected to the data signal line 15X. A drain electrode of the transistor 12A is connected to a capacitor electrode 37A via a drain extraction electrode 27A. The capacitor electrode 37A is positioned above the retention capacitor wiring 18a, and connected with the pixel electrode 17A via two contact holes 11A. From the capacitor electrode 37A, an extension wiring 47A is extended to overlap with the pixel electrode 17A. Moreover, the scanning signal line 16b functions as a gate electrode of the transistor 12B. A source electrode of the transistor 12B is connected to the data signal line 15Y. A drain electrode of the transistor 12B is connected to a capacitor electrode 37B via a drain extraction electrode 27B. The capacitor electrode 37B is positioned above the retention capacitor wiring 18b, and connected with the pixel electrode 17B via two contact holes 11B. From the capacitor electrode 37B, an extension wiring 47B is extended to overlap with the pixel electrode 17B.

In the liquid crystal panel of the present invention, the retention capacitor Cha (see FIG. 3) is formed at a position in which the retention capacitor wiring 18a and the retention electrode 37a overlap each other with a gate insulating film interposed therebetween. The retention capacitor Chb (see FIG. 3) is formed at a position in which the retention capacitor wiring 18b and the retention electrode 37b overlap each other with a gate insulating film interposed therebetween. The retention capacitor ChA (see FIG. 3) is formed at a position in which the retention capacitor wiring 18a and the retention electrode 37A overlap each other with a gate insulating film interposed therebetween. The retention capacitor ChB (see FIG. 3) is formed at a position in which the retention capacitor wiring 18b and the retention electrode 37B overlap each other with a gate insulating film interposed therebetween.

Figure 2:
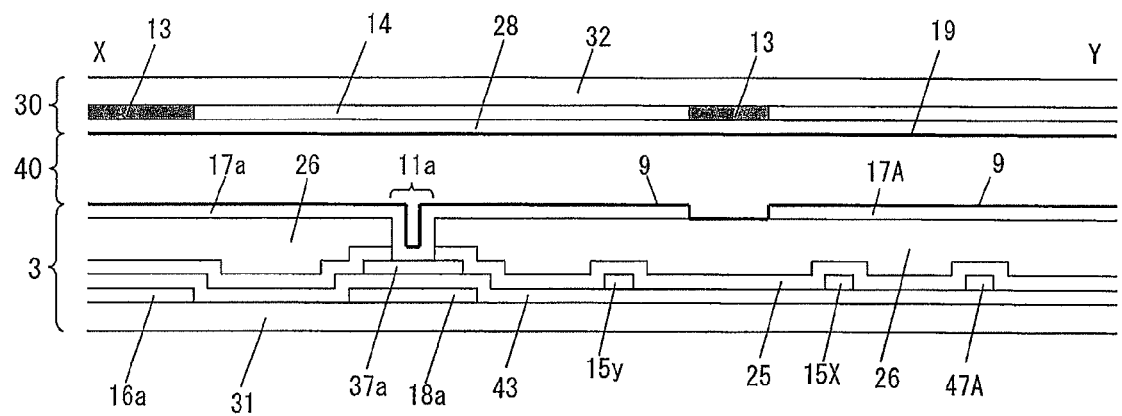
FIG. 2 is a cross sectional view of the liquid crystal panel of FIG. 1, taken along the arrow X-Y.

FIG. 2 is a cross sectional view of the liquid crystal panel of FIG. 1, taken along the arrow X-Y. As illustrated in FIG. 2, the liquid crystal panel includes an active matrix substrate 3, a color filter substrate 30 facing the active matrix substrate 3, and a liquid crystal layer 40 provided between the substrates 3 and 30. The active matrix substrate 3 is configured such that the scanning signal lines 16a and the retention capacitor wirings 18a are formed on the glass substrate 31, and a gate insulating film 43 are provided over the scanning signal lines 16a and the retention capacitor wirings 18a. On the gate insulating film 43, the capacitor electrode 37a, the data signal lines 15y, the data signal lines 15X, and the extension wiring 47A are provided. Even though they are not illustrated on the cross section, a semiconductor layer (i layer and n+ layer) of each transistor, and the source electrodes and the drain electrodes adjacent to the n+ layer are provided on the gate insulating film 43.

Further, an inorganic interlayer insulating film 25 is formed over a metal film including the data signal lines. On the inorganic interlayer insulating film 25, an organic interlayer insulating film 26, which is thicker than the inorganic interlayer insulating film 25, is formed. On the organic interlayer insulating film 26, the pixel electrodes 17a and 17A are formed. Further, an alignment film 9 is formed over the pixel electrodes 17a and 17A. A contact hole 11a is formed through the inorganic interlayer insulating film 25 and the organic interlayer insulating film 26, so as to cause the pixel electrode 17a to be in contact with the capacitor electrode 37a. Moreover, as described above, the retention capacitor Cha (see FIG. 3) is formed in the position where the retention capacitor wiring 18a and the capacitor electrode 37a overlap each other with the gate insulating film 43 interposed therebetween.

On the other hand, the color filter substrate 30 is configured such that a black matrix 13 and a color layer (color filter layer) 14 are formed on the glass substrate 32, and a common electrode (coin) 28 is formed over the black matrix 13 and the color layer 14. Further, an alignment film 19 is formed over these members.

Next, a method for manufacturing the liquid crystal panel according to the present invention is explained below. The method for manufacturing the liquid crystal panel includes producing the active matrix substrate, producing the color filter substrate, and assembling the active matrix substrate and the color filter substrate together and filling a liquid crystal therebetween.

Firstly, on a substrate made from glass, plastic or the like, a metal film made from titanium, chrome, aluminum, molybdenum, tantalum, tungsten, copper, or the like, an alloy film of any of these metals, or a laminate film of any of these films is formed by sputtering with a thickness in a range of 1000 Å to 3000 Å. After that, the film or films are patterned by photolithography (photo engraving process, hereinafter referred to as "PEP", and includes a step of etching), so as to form the scanning signal lines (gate electrodes of the transistors) and the retention capacitor wirings.

Next, an inorganic insulating film (about 3000 Å to 5000 Å in thickness) made from silicon nitride, silicon oxide, or the like is formed by CVD (Chemical Vapor Deposition) over the entire substrate on which the scanning signal lines are formed. Then, a photo resist is removed, thereby forming a gate insulating film.

Next, over the gate insulating film (over the entire substrate), an intrinsic amorphous silicon film (1000 Å to 3000 Å in thickness) and an n+ amorphous silicon film (400 Å to 700 Å in thickness) doped with phosphor are formed consequently by CVD. Then, these films are patterned by PEP, and after that, a photo resist is removed, whereby, a silicon laminate structure including the intrinsic amorphous silicon layer and the n+ amorphous silicon layer is formed in an insular shape on the gate electrode.

Subsequently, over the entire substrate on which the silicon laminate structure is formed, a metal film made from titanium, chrome, aluminum, molybdenum, tantalum, tungsten, copper, or the like, an alloy film of any of these metals, or a laminate film of any of these films is formed by sputtering with a thickness in a range of 1000 Å to 3000 Å. After that, the film or films are patterned by PEP, thereby forming the data signal lines, the source electrodes and drain electrodes of the transistors, the drain extraction electrodes, capacitor electrodes, and extension wirings (forming metal films). Here, a resist is removed if necessary.

Further, the n+ amorphous layer constituting the silicon laminate structure is etched away by using the photo resist used in the metal wiring formation as a mask or by using the source electrode or the drain electrode as a mask. After that the photo resist is removed. In this way channels of the transistors are formed. In this configuration, the semiconductor layer may be formed from the amorphous silicon layer, as described above, but may be a polysilicon layer. Moreover, the amorphous silicon film and the polysilicon film may be laser-annealed to have a greater crystallinity. This allows electrons to move faster inside the semiconductor layer, thereby improving characteristics of the transistors (TFT).

Next, an interlayer insulating film is formed over the entire substrate on which the data signal lines etc. are formed. More specifically, CVD was carried out with a mixture gas of $SiH_4$ gas, $NH_3$ gas, and $N_2$ gas, in order to form an inorganic interlayer insulating film (passivation film) with a thickness of about 3000 Å from SiNx. Further, an organic interlayer semiconductor film is formed with a thickness of about 3 μm from a positive type photosensitive acrylic resin by spin coating, die coating, or the like.

After that, PEP patterning is conducted to the organic interlayer insulating film to make a pattern of the contact holes thereon. Then, the organic interlayer insulating film is baked. Further, by utilizing the pattern of the organic interlayer insulating film, the inorganic interlayer insulating film, or the inorganic interlayer insulating film and the gate insulating film are etched away, thereby forming the contact holes.

Subsequently, over the interlayer insulating film with contact holes on the substrate, a transparent conductive film (thickness 1000 Å to 2000 Å) is formed from ITO (Indium Tin Oxide), IZO (Indium Zinc Oxide), zinc oxide, tin oxide or the like by sputtering. Then, the transparent conductive film is patterned by PEP. After that, a resist is removed. In this way, the pixel electrodes are formed.

Finally, over the entire substrate on which the pixel electrodes are formed, a polyimide resin is printed with a thickness of 500 Å to 1000 Å, and then baked. After that, by using a rotating cloth, the polyimide resin is rubbed in one direction, thereby forming an alignment film. In this way, the active matrix substrate is formed.

In the following, a method for producing a color filter substrate is explained.

To begin with, all over a substrate made from glass, plastic, or the like, a chrome thin film or a film of a resin containing a black pigment is formed. Then, the film is patterned by PEP, thereby forming a black matrix. Then, in intervals of the black matrix, a color filter layer of red, green, and blue (thickness about 2 μm) is formed in pattern by using a pigment dispersing method.

Then, over the entire substrate on which the color filter layer is formed, a transparent conductive film (thickness about 1000 Å) is formed from ITO, IZO, zinc oxide, tin oxide or the like, thereby forming a common electrode (com).

Finally, a polyimide resin is printed with thickness of 500 Å to 1000 Å over the entire substrate on which the common electrode is formed. After that, the polyimide resin is baked. Then, the polyimide resin is rubbed in one direction, thereby forming an alignment film. In this way, a color filter substrate is formed.

In the following, an assembling process is explained.

To begin with, to one of the active matrix substrate and the color filter substrate, a sealing material (made from a thermal curing epoxy resin or the like) is applied in a frame-like pattern by screen printing. The frame-like pattern has a portion in which the pattern is discontinued for inlet of the liquid crystal. Then, spherical spacers having a diameter equivalent to a thickness of a liquid crystal layer and made from plastic or silica are scattered on the other one of the active matrix substrate and the color filter substrate. Note that instead of scattering the spacers, spacers may be provided on the black matrix on the color filter substrate or the metal wirings on the active matrix substrate by PEP.

Next, the active matrix substrate and the color filter substrate are assembled. Then, the sealing material is cured.

Finally, into a space defined by the active matrix substrate, the color filter substrate, and the sealing material, a liquid crystal material is introduced by a vacuuming method. Next, a UV curing resin is applied to the inlet of the liquid crystal. Then, UV is radiated thereto so as to seal the liquid crystal material inside the space, thereby forming a liquid crystal layer. In this way, the liquid crystal panel is produced.

In the active matrix substrate and the liquid crystal panel, the scanning signal lines are provided to independently for the corresponding pixels. Thus, the active matrix substrate and the liquid crystal panel has a greater freedom in pixel configuration. Thus, for example, the liquid crystal panel may be configured such that pixels are further divided into sub pixels. This type of the liquid crystal panel will be described later (Modification 1).

(Configuration of Liquid Crystal Device)

In the liquid crystal display device, the liquid crystal panel with the above-described configuration, is configured as illustrated in (b) of FIG. 40 so as to be able to solve the display unevenness caused by the potential change in the pixel electrodes.

Figure 7:
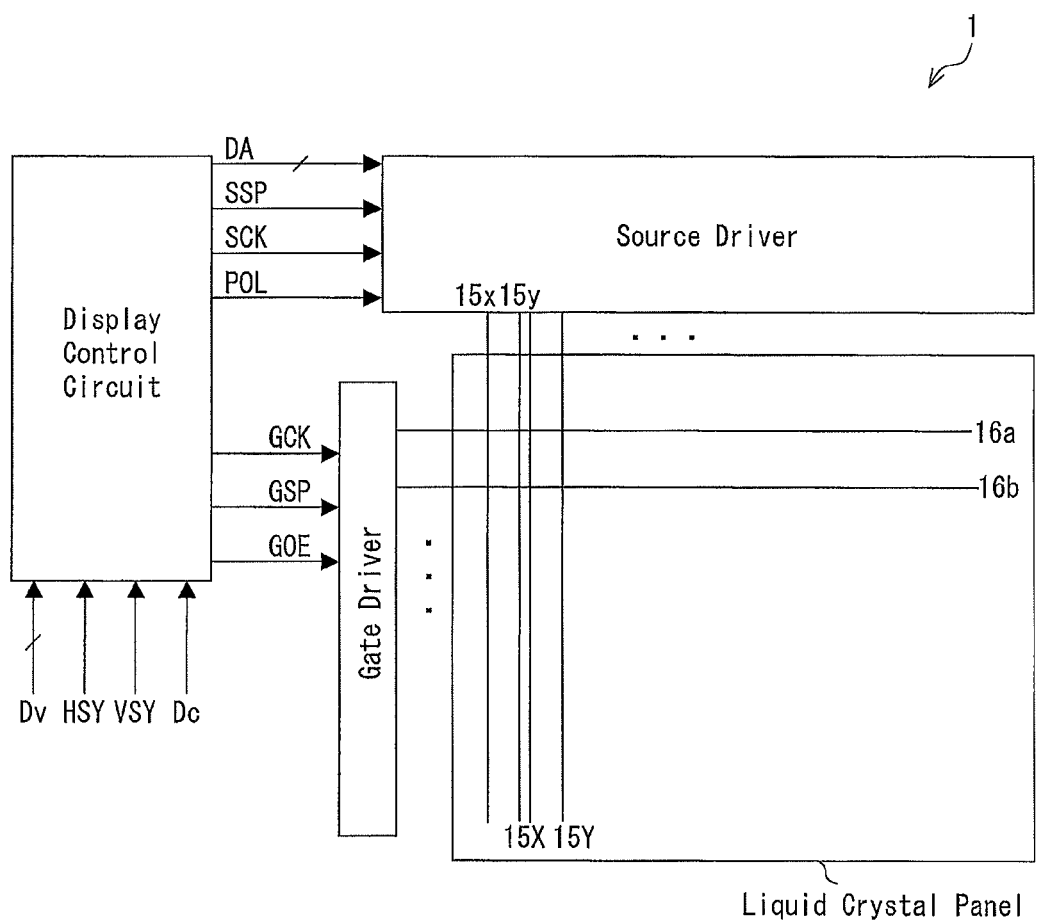
FIG. 7 is a block diagram for explaining a whole configuration of the liquid crystal display device of the present invention.

FIG. 7 is a block diagram schematically illustrating a configuration of the liquid crystal display device according to the present invention. As illustrated in FIG. 7, a liquid crystal display device 1 according to the present invention includes a liquid crystal panel (display panel), a source driver, a gate driver, and a display control circuit. The source driver is configured to drive the data signal lines. The gate driver is configured to drive the scanning signal lines. The display control circuit is configured to control the source driver and the gate driver. If necessary, the liquid crystal display device 1 may include a retention capacitor wiring driving circuit for driving the retention capacitor wirings.

The display control circuit receives a digital video signal Dv, a horizontal sync signal HSY, a vertical sync signal VSY, a control signal Dc from a signal source (for example, tuner) provided externally. The digital video signal Dv is a signal indicative of an image to be displayed. The horizontal sync signal HSY and the vertical sync signal VSY are signals for the digital video signal Dv. The control signal Dc is a signal for controlling display operation. Based on the signals D HSY, VSY, and Dc thus received, the display control circuit generates and outputs signals for displaying the image that the digital video signal Dv indicates, namely, a data start pulse signal SSP, a data clock signal SCk, a digital image signal DA indicative of the image to be displayed (i.e., corresponding to the video signal Dv), a gate start pulse signal GSP, a gate clock signal GCK, and a gate driver output control signal (scanning signal output control signal) GOE.

Figure 8:
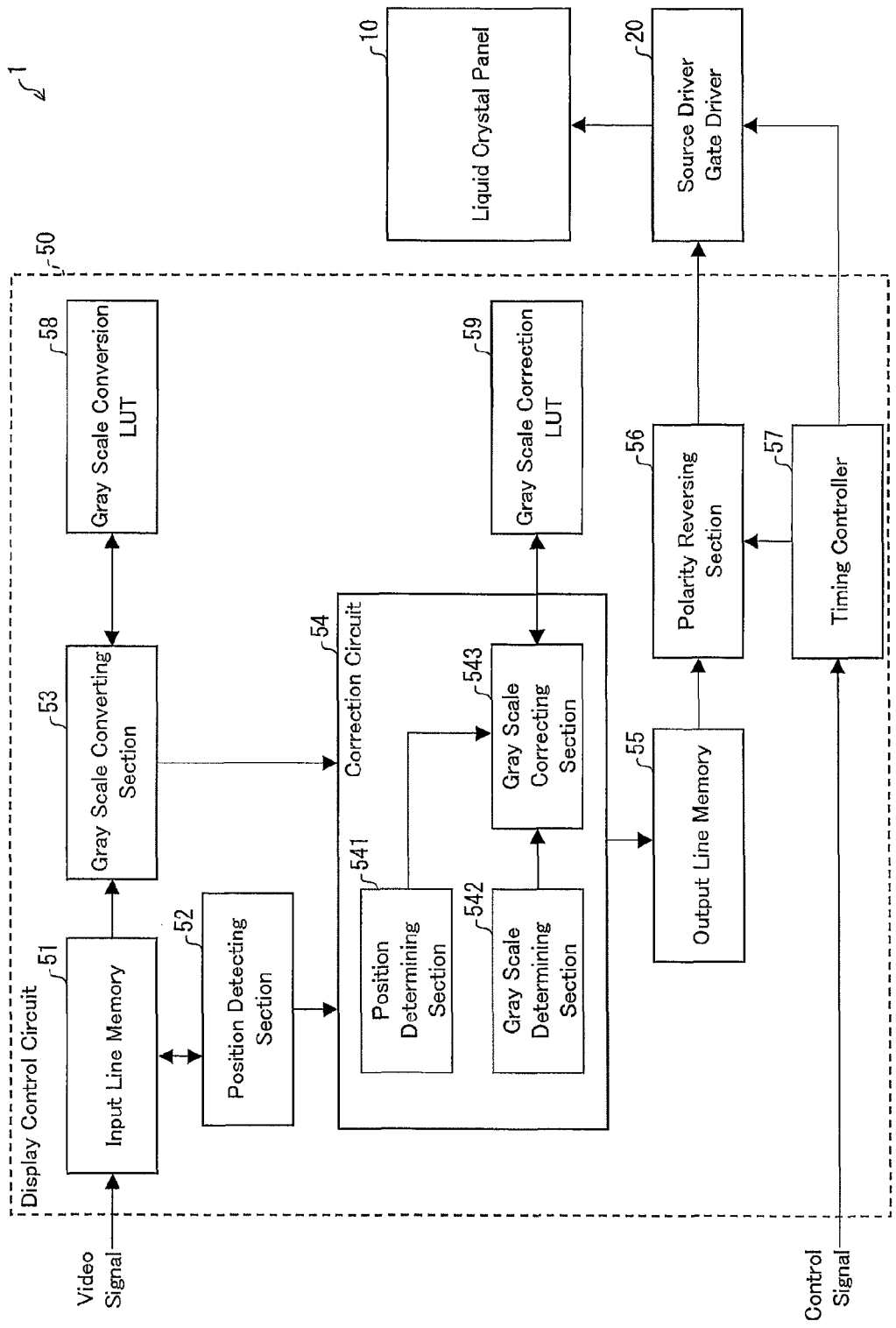
FIG. 8 is a block diagram for explaining a configuration of a display control circuit in the liquid crystal display device of the present invention.

In addition to the above configuration, the display control circuit is further configured such that the received digital video signal Dv is converted into a desired data signal, so as to solve the display unevenness (see (b) of FIG. 40) that would occur on the liquid crystal panel. FIG. 8 is a block diagram illustrating a configuration of the liquid crystal display device 1 and explaining details of the display control circuit.

As illustrated in FIG. 8, the display control circuit includes an input line memory 51, a position detecting section 52, a gray scale converting section 53, a correction circuit 54, an output line memory 55, a polarity reversing section 56, and a timing controller 57.

The input line memory 51 temporally stores therein image data for n line(s) (where n is an integer of 2 or more) from among the image data (video signal Dv of FIG. 7) received from the signal source (for example, a tuner) provided externally. Then, the input line memory 51 outputs the image data for n lines at once. When the input line memory 51 receives another image data from outside, the input line memory 51 deletes image data of one line that has been stored therein longer than any other image data of lines, in order to store the another image data instead.

For example, in a configuration in which the input line memory 51 is capable of storing image data of two lines, the input line memory 51 receives and stores image data (first image data) for a first horizontal scanning period, and then receives and stores image data (second image data) for a second horizontal scanning period. Then, the input line memory 51 outputs the first and second image data at once. After that, when the input line memory 51 receives third image data, the input line memory 51 deletes the first image data and stores the third image data instead. Then, the input line memory 51 outputs the second and third image data at once.

Moreover, for example, in a configuration in which the input line memory 51 is capable of storing image data of three lines, the input line memory 51 receives and stores first image data, receives and stores second image data, and then receives and stores third image data. Then, the input line memory 51 outputs the first to third image data at once. After that, when the input line memory 51 receives fourth image data, the input line memory 51 deletes the first image data and stores the fourth image data instead. Then, the input line memory 51 outputs the second to fourth image data at once.

The position detecting section 52 is configured to detect image data of which line the image data stored in the input line memory 51 is. The detection may be carried out, for example, counting the horizontal sync signal received from the signal source provided externally. By this, display positions of the image data stored in the input line memory 51 and the image data newly received by the input line memory 51 can be identified.

The gray scale converting section 53 is configured to receive the image data from the input line memory 51 and convert the image data into gray scale levels. The conversion may be carried out by, for example, determining the gray scale levels by referring to a table (gray scale conversion LUT 58) in which signal potentials (voltage values) of the image data are associated with the gray scale levels. As one alternative, the conversion may be carried out by, for example, determining the gray scale levels by using a calculation formula.

The correction circuit 54 includes a position determining section 541, a gray scale determining section 542, and a gray scale correcting section 543.

Based on a result of detection performed by the position detecting section 52, the position determining section 541 determines which one of a pair of pixels to which the data signal is to be supplied concurrently (i.e., the upstream one or the downstream one of the pixels along the column direction) the image data is to be supplied. More specifically, the position determining section 541 may be configured to determine which one of the odd-numbered line or the even-numbered line the image data is for. By this, for example, among the image data sequentially inputted to the input line memory 51, the firstly inputted image data (first image data) and the secondly inputted image data (second image data) can be identified such that the first image data is to be supplied to an upper one of the pair of pixels (i.e., odd-numbered line, pixel 101 of FIG. 3) and the second image data is to be supplied to a lower one of the pair of pixels (i.e., even-numbered line, pixel 102 of FIG. 3). In another example, second and third image data stored in the input line memory 51 can be identified such that the second image data is to be supplied to a lower one of the pair of pixels (even-numbered line, the pixel 102 of FIG. 3), and the third image data is to be supplied to an upper one of the next pair of pixel (odd-numbered line, pixel 103 of FIG. 3).

The gray scale determining section 542 is configured to receive the image data of n line(s) from the gray scale converting section 53, and compares the gray scale levels of the image data of n line(s), so as to determine whether the gray scale level are equal to each other or not.

The gray scale level correction section 543 is configured to perform gray scale level correction according to a result of the determination performed by the position determining section 541 and the gray scale determining section 542. For example, in case where image data of 2 lines in the input line memory 51 are to be supplied to the pair of pixels (for example, the pixel 101 and the pixel 102 in FIG. 3) respectively, the gray scale level correction section 543 performs gray scale level correction to correct the inputted gray scale levels to a predetermined gray scale level (post-correction gray scale level) if the inputted gray scale levels are different from each other. If the inputted gray scale levels are equal with each other, the gray scale level correction section 543 outputs the inputted gray scale levels as they are. Moreover, if the two pieces of image data are to be supplied to one of a pair of pixels (for example, the pixel 102 of FIG. 3) and one of another pair of pixels (for example, the pixel 103 of FIG. 3), the gray scale level correction section 543 does not perform the gray scale level correction, and outputs the inputted gray scale levels as they are. How to perform the gray scale level correction will be described later. The gray scale determining section 542 may be configured to determine whether or not a difference between the gray scale levels is greater than a predetermined threshold.

The output line memory 55 stores the image data with grays scale levels informed from the correction circuit 54. The output line memory 55 concurrently outputs the image data of 2 lines to the pixels associated with two scanning lines to be concurrently selected.

Based on the image data obtained from the output line memory 55, the polarity reversing section 56 is configured to determine writing voltage signals (analog data) to be supplied to pixels in the liquid crystal panel 10.

Based on the horizontal sync signal HSY, the vertical sync signal VSY, and the control signal Dc supplied from the signal source (e.g., tuner) provided externally, the timing controller 57 generates a source driver timing signal (data start pulse signal SSP, data clock signal SCK) for driving the display driving circuit 20 (source driver and gate driver), and gate driver timing signal (gate start pulse signal GSP, gate clock signal GSC, and gate driver output control signal (scanning signal output control signal) GOE). The source driver timing signal is inputted to the source driver via the polarity reversing section 56.

The source driver is configured to drive the data signal lines correspondingly connected to the pixels via transistors in the liquid crystal panel 10, thereby to supply to each pixel a writing voltage determined by the polarity reversing section 56. The source driver may be integrated with the polarity reversing section 56. Moreover, the gate driver is configured to drive the scanning signal lines correspondingly connected to the pixels via transistors in the liquid crystal panel 10.

The input line memory 51 may be configured to store the image data of an n number of lines (where n is an integer of 1 or more) out of the image data (video signal Dv in FIG. 7) inputted from the signal source (e.g., tuner) provided externally, and to output the image data and the image data of the number of lines at once.

For example, in case where the input line memory 51 is configured to store image data of one line, the input line memory 51 receives and stores image data (first image data) for a first horizontal scanning period, and then receives image data (second image data) for a second horizontal scanning period. Then, the input line memory 51 outputs the first and second image data at once, and deletes the first image data and stores the second image data instead of the first image data. After that, when the input line memory 51 receives third image data, the input line memory 51 outputs the second and third image data at once, and deletes the second image data and stores the third image data in replacement of the second image data.

In a case where the input line memory 51 is configured to store image data of two lines, the input line memory 51 receives and stores the first image data, then receives and stores the second image data. After that, when the input line memory 51 receives third image data, the input line memory 51 outputs the first to third image data at once, and deletes the first image data and stores the third image data instead. Next, when the input line memory 51 receives fourth image data, the input line memory 51 outputs the second to fourth image data at once, and deletes the second image data and stores the fourth image data in replacement of the second data.

As described above, when the input line memory 51 is configured to compare and correct image data of, for example, two lines, the input line memory 51 uses an FIFO (first in first out) memory for storing image data of one line. By this, the input line memory 51 stores the first image data in the FIFO memory. When the input line memory 51 receives the second image data, the input line memory 51 reads out and outputs the first image data, while the input line memory 51 stores the second image data in the FIFO memory and outputs the second image data, thereby doing "Through" of the second image data. The output of first image data and the second image data may be adjusted such that the pair of pixels for correction has the same timing. With this configuration, the input line memory 51 may have a smaller memory capacity, but the input image should be converted every time, thereby causing such a risk that error would be caused by gray scale conversion that could be aborted by using a through signal in this configuration even when correction is not necessary. On the other hand, if the input line memory 51 is configured to store image data of two line or more, the input lime memory should have a larger memory capacity, but the timing adjustment is not necessary, and the original data can be stored perfectly during the process, thereby reducing the risk of unnecessary errors. These configurations can be selected according to which kin of purpose the display device of the present invention is to be used.

(Correction Method of Gray Scale Levels)

As understood from FIGS. 39 and 40, the display unevenness occurs when the potentials (absolute values of the voltages) of the data signals are different from each other, which are supplied to the pixel electrodes (17a and 17b) respectively connected with the scanning signal lines 16a and 16b that are selected concurrently. That is, as illustrated in (b) of FIG. 36, when there is a gray scale difference between pixels a and b, which are connected respectively with such scanning lines that are selected concurrently, the display unevenness occurs at a boundary between the pixels a and b, because, as illustrated in FIG. 39, the potentials having been written in the pixel electrodes are changed due to influence from parasite capacitance caused by the data signals supplied thereto in the following horizontal scanning period.

In view of this, the liquid crystal display device 1 according to the present embodiment is configured such that the potentials of the data signals to be supplied to the pixel electrodes are set in consideration of an amount of the pixel potential changes expected to occur when the data signals are written in the pixel electrodes (see FIG. 5). The amount of the pixel potential changes (correction amount) may be predetermined based on gray level relationship between a pair of pixels (pixels a and b) respectively corresponding to the scanning signal lines (16a and 16b) that are concurrently selected.

Figure 9:
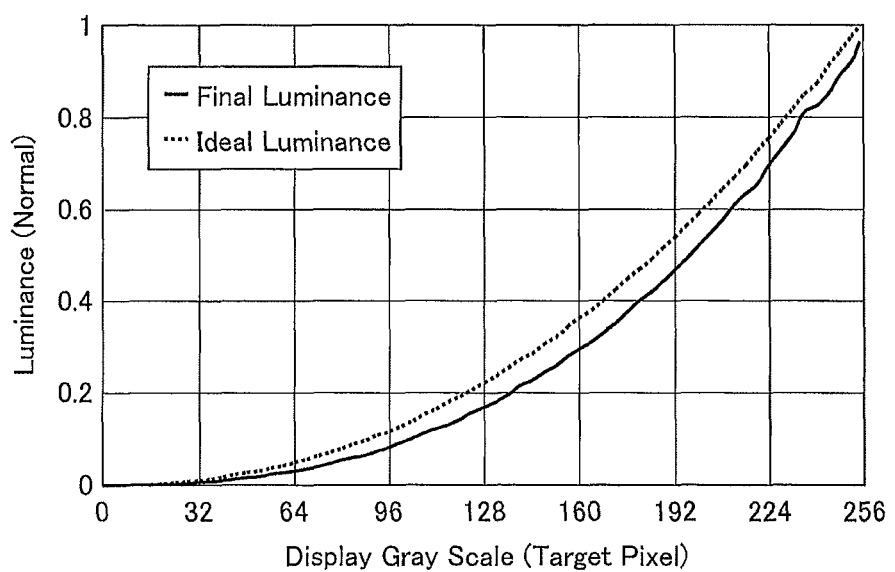
FIG. 9 is a graph illustrating a result of measurement of a luminance of a target pixel whose gray scale was changed from 0 gray scale level to 255 gray scale level, where a comparative pixel paired with the target pixel is set to 0 gray scale level.

FIG. 9 is a graph (gray scale-luminance characteristic diagram) illustrating a result of measurement of luminance of a target pixel whose gray scale was changed from 0 gray scale level to 255 gray scale level, where a comparative pixel paired with the target pixel is set to 0 gray scale level. The "target pixel" is that one of the pair of pixels to which correction is to be made. The "comparative pixel" is that one of the pair of pixels which is compared with the "target pixel" when performing the correction of the gray scale level of the "target pixel". The measurement was performed by using a VA-mode liquid crystal panel (which was a normally-black liquid crystal panel divided into four) using a black voltage of 0.5 V, a white voltage of 7 V, and a counter voltage of 7.5 V, displaying black luminance by alternatively supplying 7.0 V and 8.0 V every field, and displaying white luminance display by alternatively supplying 0.5 V and 14.5 V every field. Needless to say that the source voltages are adjusted to be symmetric with respect to the counter voltage in consideration of the gate voltage. Moreover, the luminance of the liquid crystal display device 1 is a time mean luminance obtained over a period of several frames or more. In FIG. 9, the dotted curve indicating the "ideal luminance" shows a luminance change that would occur formally in the target pixel when the gray scales of the target pixel and the comparative pixel are identical with each other. The solid curve indicating the "final luminance" shows the luminance change that occurred in the target pixel in the measurement performed under the aforementioned conditions (where the comparative pixel was set to 0 gray scale level fixedly).

FIG. 9 demonstrates that the cross talk between the target pixel and the comparative pixel caused the luminance in the target pixel to be lower than the ideal luminance, because the comparative pixel (0 gray scale level) was darker than the target pixel always. Further, FIG. 9 shows that there is a correlation between the luminance of the comparative pixel and the target pixel.

Thus, by adding the amount of the reduction to the ideal luminance in advance, the final luminance can be adjusted to the ideal luminance even if the luminance is reduced due to the potential change. This can solve the display unevenness caused by the reduction in luminance. In a case of a display device normally having a gamma of 2 or more (2.2 in most cases), the luminance change in the comparative pixel is relatively smaller than that in the target pixel at an initial stage of the luminance measurement, that is, while the luminance in the comparative pixel is black or at a low gray scale level of very dark. Thus, in this case, the observed luminance changes can be considered that the observed luminance changes are derived entirely from the target pixel, ignoring the change in the luminance in the comparative pixel. For the later stages (for halftones and higher), the luminance can be measured in a similar manner while the luminance in the comparative pixel is increased gradually, in order to determine the correction amounts to which the results obtained while the comparative pixel is still dark are fed back. It is preferable to determine a correction amount for a relatively brighter pixel and then determining a correction amount for a darker pixel by referring to a voltage level approximate to a voltage level corresponding to the correction amount.

By repeating the measurement, the voltages that cause the luminance differences are estimated and converted into gray scales to be corrected (post-correction gray scales). FIG. 10 is a table (correction amount LUT) in which the gray scales of the target pixel, gray scales of the comparative pixel, and the correction amounts are associated with each other. By referring to the correction amount LUT, for example, the output gray scale (post-correction gray scale) for target pixel is set to 174 gray scale level (=160+14), when the target pixel is at 160 gray scale level and the comparative pixel is 0 gray scale level. By setting the post-correction gray scale for target pixel as such, the gray scale level of the target pixel becomes 160 gray scale level after the potential change. This avoids the display unevenness.

Here, the post-correction gray scale may be calculated out from the following Equation (1):

Post-correction gray scale level of Target Pixel=Input Gray scale level of Target Pixel+$k$×(Input Gray scale level of Target pixel−Input Gray scale level of Comparative Pixel)    (1)

where k is a variable value changed according to the input gray scales and predetermined based on a table or the like. The gray scale correction section 543 may be configured to determine the post-correction gray scale level of the target pixel by suing the above formula without referring to the gray scale correction LUT 59.

Here, factors that should be considered to formulate the correction amount are explained. When the source voltage changes by $\Delta Vs$, the voltage $\Delta V$ influencing the pixel electrode is expressed as follows:

$$\Delta V = \Delta Vs \cdot Csd/C\text{total}.$$

To begin with, $\Delta Vs$ is discussed here. A source (A) voltage is changed as V1, V2, V3, V4, . . . , from the actually written voltage V0, and then reversed in polarity at a certain point and changed as −V-2, −V-1, . . . (where the character "−1" indicates a voltage for scanning one line). $\Delta Vs$ is repeated as V1-V0, V2-V1, V3-V2, . . . , and then reversed at a certain point and finally becomes (−V-1)−(−V-2). These changes can be concluded as being equivalent to a voltage change of (−V-1)-V0 at the end.

An accurate change in effective value for $\Delta Vs$ in consideration of time component cannot be determined because $\Delta Vs$ is changed in the range of the voltages over time according to appropriate gray scale display. However, there should be an intermediate voltage. Thus, $\Delta Vs$ can be expressed as below:

$$\Delta Vs = (V0 - Va)$$

where Va is the intermediate voltage.

On the other hand, influence from the other source (B) voltage can be expressed as:

$$\Delta Vs = (V0 - Vb)$$

when it is also considered in the same way. Here, the two conditions, that is, the source and the other source are opposite to each other in polarity, thereby canceling out the voltage changes of each other. And the source and another source are voltages of pixels provided on adjacent lines in display. Thus, it can be considered that the voltage changes in the source and the other source behave in a substantially same manner in a general natural image.

Thus, it is possible to assume that Va=−Vb. Then, the voltage change in the pixel electrode can be expressed as follow:

$$\Delta V = \Delta Vs(A) \cdot Csd/Ctotal + \Delta Vs(B) \cdot Ctotal$$
$$= (V0(A) + V0(B)) \cdot Csd/Ctotal$$

Therefore, when the gray scales of the target pixel and the comparative pixel are equal to each other, the voltage change due to source voltage can be ignored. Note that V0(A) and V0(b) are opposite in polarity. In displaying what is called "non-general image", which is a high-frequency image in which, for example, black and white reversion occurs every line, it is not necessary to consider the edge unevenness that dealt with the present invention.

Therefore, when the voltage is expressed in absolute value in consideration of the polarity, the parameter of the voltage change is expressed as follows:

$k = Csd/Ctotal$.

Next, considered is whether k is a constant or not. The total capacitance components are constituted by (i) a component (such as Csd, Cgd, etc.) generated from the wiring capacitance, and (ii) liquid crystal capacitance. The wiring capacitance can be considered as a constant but the liquid crystal capacitance is variable depending on orientation of the liquid crystal, that is, depending of the gray scales. In normally-black and vertically-oriented liquid crystals that are widely used recently, the liquid crystal capacitance is increased for displaying at a brighter luminance. The liquid crystal capacitance affects Ctotal. Thus, the influence from the source voltage is smaller when the luminance is higher. Further, because the relationship between the gray scale voltage and the gray scales are not proportional to each other. This leads to a conclusion that k is not a constant. In the present invention, two modes exemplified here, in consideration of non-linearity of k.

A first mode is such that k is determined by appropriate interpolation of a value selected by referring to an LUT for giving a different value depending on the gray scale level of the target pixel. Here, k is a coefficient regarding voltage. Thus, k is calculated out by converting a gray scale to a voltage in reference to the LUT, calculating k, and then converting a correction voltage back to a gray scale in reference to the LUT. In this calculation method, the selecting k and the calculation using k involve many multiplications. This increases a calculation amount, thereby requiring the correction circuit to have a greater capacity. Especially, referring the LUT twice gives a large circuit load. Thus, the first mode is seldom adopted, except when highly accurate correction is necessary.

In a second mode, k is constant within a predetermined gray scale range and is set to 0 for any gray scales out of the gray scale range. For example, k=0.08 for the target pixels of not less than 64 gray scale level and less than 160 gray scale level, and k=0 for target pixels out of the range by 32 gray scale level or more. For target pixels out of the range by less than 32 gray scale level, k is linearly varied in order to attain continuity. In this way, for target pixels of less than 32 gray scale level and not less than 192 gray scale level, the correction coefficient is 0, and for gray scales for 32 gray scale level to 64 gray scale level, and 160 gray scale level and 192 gray scale level, the correction coefficient k is continuously changed. This is backed by the following concept. As described previously, the correction coefficient k of the voltage level is larger when the gray scale to be displayed is closer to 0 gray scale level. On the other hand, in the darker region, the change in the actual luminance is relatively smaller to the voltage change, whereby the observed change in the luminance is not so large compared with the amount of the voltage change. This effect is more noticeable in visually observing a display of approximately from 64 gray scale level to 128 gray scale level, but is hardly noticeable for in visually observing a display out of the range, even though how significantly the effect is noticeable or is not noticeable is dependent on the panel configuration. Moreover, this calculation per se contains statistical errors. A perfect stripe high-frequency pattern is too extreme and needless to consider. However, by containing a high-frequency pattern partially, a voltage change often occurs between the paired sources. Moreover, it is not preferable that the correction in the present invention is overdone, because such excessive correction would result in excess blackness or excess whiteness, and in halftones whose hues are changed toward the colors targeted by the excessive correction. Therefore, it is practical to set k values within the aforementioned range, thereby to perform such correction that (i) reduces the display unevenness to the extent that the display unevenness is noticeable, but (ii) the correction is not excessive. By allowing errors as such, it becomes possible to perform gray scale-based calculation, thereby making it possible to realize practical correction with a simpler circuit configuration.

It may be configured such that, in case where it is not possible to set minus gray scale for correcting black or to set a gray scale more than 255 gray scale level for correcting white, the correction amount is clipped at an appropriate value. The correction amount may be integrate in the correction circuit 54. However, it may be preferable that output gray scales (post-correction gray scales) are calculated out in advance, because this configuration is simpler and more accurate. In this case, the correction amount LUT of FIG. 10 is modified as in a table gray scale correction LUT 59) illustrated FIG. 11 for correlation of the output gray scales thus calculated in advance. By this, it is possible to easily cope with even a case in which the gray scale setting of the liquid crystal display device 1 is changed. Moreover, this configuration can easy cope with a liquid crystal panel design such that the characteristics of the comparative pixels and the target pixels are not symmetric with each other.

Moreover, the gray scale correction LUT 59 may be prepared to have all combinations of the gray scales (for example, 256×256 kinds for 8-bit configuration). However, in consideration of accuracy and circuit capacity, it may be preferable that the amounts of the changes are defined for every 32 gray scale levels or 16 gray scale levels in the 256 gray scale levels, and the amounts of the changes for other combinations are determined by calculation. Some liquid crystal display devices have configurations in which the gray scale can be corrected to a gray scale less than 0 or a over 255 by means of a special source driver or a compressed gray scale setting. In such liquid crystal display devices, needless to say, such clipping is not necessary, or the gray scales to be clipped is changed depending on the expanded gray scale expression ability.

Here, the correction process for correcting the gray scale level by the correction circuit 54 is explained referring to a specific example. FIG. 5 illustrates a pixel potential change in the liquid crystal display device apparatus 1 according to the present embodiment in a case where the liquid crystal display device apparatus 1 displays an image illustrated in (b) of FIG. 36. As in FIG. 39, in the k-th horizontal scanning period, the pixels electrodes 17a and 17b respectively connected with the scanning signal lines 16a and 16b that are selected concurrently in the k-th horizontal scanning period are supplied respectively with data signals of opposite polarities with different sizes (absolute value of voltages) (i.e., the pixel electrode 17a is provided with a positive data signal for gray and the pixel electrode 17b is provided with a negative data signal for white). In the (k−1)th horizontal scanning period, the pixels electrodes 17c and 17d respectively connected with the scanning signal lines 16c and 16d that are selected concurrently in the (k−1)th horizontal scanning period are supplied respectively with data signals of opposite polarities with the same size (absolute value of voltages) (i.e., the pixel electrode 17c is provided with a positive data signal for white and the pixel electrode 17d is provided with a negative data signal for white).

Here, when two image data for a pair of pixels a and b are inputted in the correction circuit 54, the gray scale level of the pixel a is determined by treating the pixel a as the "target pixel" and treating the pixel b as "comparative pixel". On the other hand, the gray scale level of the pixel b is determined by treating the pixel b as the "target pixel" and treating the pixel a as "comparative pixel".

The gray scale level of the pixel a as the "target pixel" is determined in the following manner. In the k-th horizontal scanning period, the pixel electrode 17a in the pixel a is supplied with the data signal of a lower gray scale level than the gray scale level for the externally-inputted image data (gray) in accordance with the gray scale correction LUT 59 illustrated in FIG. 11. By this, in the k-th horizontal scanning period, the potential Va (absolute value of voltage) of the pixel electrode 17a is lower than the pixel potential (dotted line Va in FIG. 5) that the pixel electrode 17a supposed to have according to the image data. Next, in the (k+1)th horizontal scanning period, the positive data signal for white is supplied to the data signal line 15x. This causes a potential change due to a parasite capacitance, thereby increasing the potential Va (absolute value of voltage) of the pixel electrode 17a. As a result, the potential Va after the change becomes equal to the pixel potential (dotted line Va in FIG. 5) that the pixel electrode 17a supposed to have according to the image data. This potential Va is maintained until the next frame (F2), thereby preventing the display unevenness as illustrated in (b) of FIG. 40.

On the other hand, the gray scale level of the pixel b as the "target pixel" is determined in the following manner. In the k-th horizontal scanning period, the pixel electrode 17b in the pixel b is supplied with the data signal of a higher gray scale level than the gray scale level for the externally-inputted image data (white) in accordance with the gray scale correction LUT 59 illustrated in FIG. 11. By this, in the k-th horizontal scanning period, the potential Vb (absolute value of voltage) of the pixel electrode 17a is lower than the pixel potential (dotted line Vb in FIG. 5) that the pixel electrode 17b supposed to have according to the image data. Next, in the (k+1)th horizontal scanning period, the positive data signal for white is supplied to the data signal line 15x. This causes a potential change due to a parasite capacitance, thereby decreasing the potential Vb (absolute value of voltage) of the pixel electrode 17b. As a result, the potential Vb after the change becomes equal to the pixel potential (dotted line Vb in FIG. 5) that the pixel electrode 17b supposed to have according to the image data. This potential Vb is maintained until the next frame (F2), thereby preventing the display unevenness as illustrated in (b) of FIG. 40.

For the pixels e and f, the display unevenness can be solved by performing a similar process.

It should be noted that the present invention is not limited to the scanning direction of the scanning signal lines that is exemplified as being downward in the illustration of the FIG. 3. For example, the scanning direction may be upward. The same is true in the later described embodiments.

In the configuration described above, if data signals being supplied to the liquid crystal display device 1 externally and being to be supplied to the respective pixel electrodes of two adjacent pixels have different input gray scales, both of the input gray scales of the data signals are corrected to increase a gray scale difference therebetween. The present invention is not limited to this configuration. As one alternative, it may be configured that, if the input gray scales are different from each other, the input gray scale for a pixel to display at a greater luminance is corrected to increase a gray scale difference between the input gray scales. In the following, this configuration is briefly described.

Regarding visibility of the display unevenness that the present invention deals with, it is known that a minimum luminance change detectable for human visual perception is changed proportional to the ⅓ power of display luminance. That is, in case where a luminance change from L0 to L1 occurs in a display of even luminance of L0, a formula $K \times (L1/L0)^{(1/3)}$ can be used to determine whether the luminance change is detectable or not. That is, the luminance change $\Delta L = L1 - L0$ is smaller when the original luminance is smaller. Thus, it can be generally ruled that a luminance change in a dark display is more detectable. This rule, however, is not applicable to the present invention, in which the bright luminance Lb and the dark luminance Ld exist at the same time around the display unevenness. Human eyes can adapt to brightness of surroundings. Thus, the minimum detectable luminance change can be determined based on an average luminance of surroundings of an observation spot, for example, La=(Lb+Ld)/2. Most liquid crystal display devices are designed such that larger luminance changes are caused in brighter portions of a display in response to voltage changes of the same level. Thus, there is a risk that the human eyes adopted to the luminance La can detect display unevenness in a bright portion of the display but not that in a darker portion of the display. Therefore, the present invention may be configured such that, if the gray scale levels of the pixels are different, the gray scale level of the pixel for greater luminance (brighter) is corrected. In this configuration, the correction LUT (gray scale correction LUT 59) is only required to have data for the cases where the target pixel is greater in luminance (brighter) than the comparative pixel. Furthermore, the correction LUT (gray scale correction LUT 59) may be so configured to output only one piece of correction data in response to two pieces of data, so that the gray scale of the pixel of smaller luminance (darker) is outputted without correction. As a result, the required memory capacity can be reduced, and a highly accurate correction can be performed without increasing the memory capacity.

The active matrix substrate illustrated in FIG. 3 and the liquid crystal panel provided with the active matrix substrate can be modified as follows. In the following, other configurations of the active matrix substrate and the liquid crystal panel according to the present invention. For the sake of easy explanation, the like members in the active matrix substrate and the liquid crystal panel described above are not described again below, where appropriate.

(Modification 1)

Figure 12:
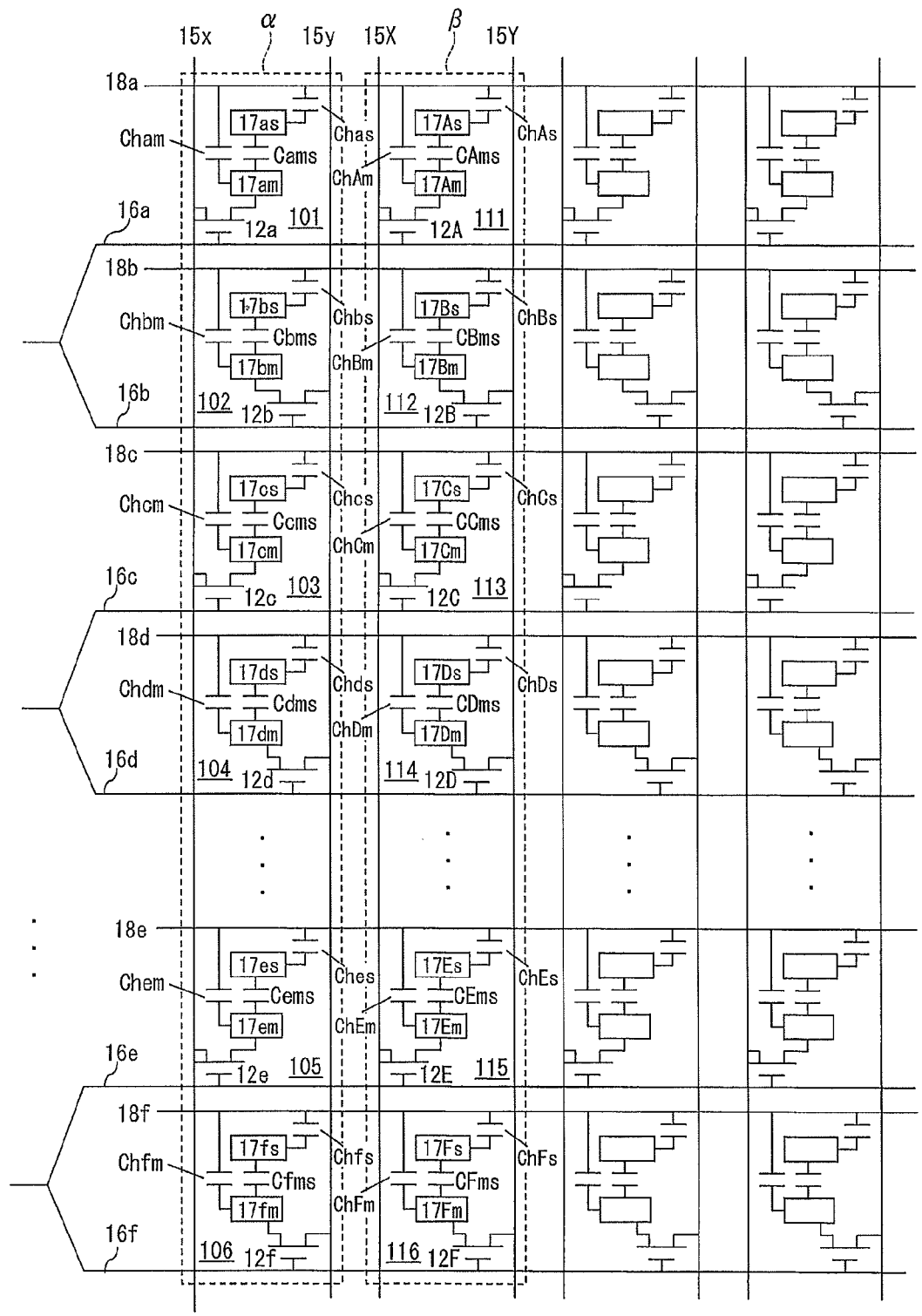
FIG. 12 is an equivalent circuit schematic illustrating Modification 1 of the active matrix substrate of FIG. 3.

FIG. 12 is an equivalent circuit diagram illustrating part of a configuration of an active matrix substrate according to Modification 1. The active matrix substrate of FIG. 12 is identical to the active matrix of FIG. 3 in terms of data signal lines, scanning signal lines, retention capacitor wirings, and pixel configurations.

Each pixel has two pixel electrodes. A pixel electrode 17am of a pixel 101 is connected to a data signal line 15x via a transistor 12a connected with a scanning signal line 16a. A pixel electrode 17*as* of the pixel 101 is connected with a pixel electrode 17*am* via capacitance. A pixel electrode 17*bm* of a pixel 102 is connected to a data signal line 15*y* via a transistor 12*b* connected with a scanning signal line 16*b*. A pixel electrode 17*bs* of the pixel 102 is connected with a pixel electrode 17*bm* via capacitance. A pixel electrode 17*cm* of a pixel 103 is connected to a data signal line 15*x* via a transistor 12*c* connected with a scanning signal line 16*c*. A pixel electrode 17*cs* of the pixel 103 is connected with a pixel electrode 17*cm* via capacitance. A pixel electrode 17*dm* of a pixel 104 is connected to a data signal line 15*y* via a transistor 12*d* connected with a scanning signal line 16*d*. A pixel electrode 17*ds* of the pixel 104 is connected with a pixel electrode 17*dm* via capacitance. A pixel electrode 17*em* of a pixel 105 is connected to a data signal line 15*x* via a transistor 12*e* connected with a scanning signal line 16*e*. A pixel electrode 17*es* of the pixel 105 is connected with a pixel electrode 17*em* via capacitance. A pixel electrode 17*fm* of a pixel 106 is connected to a data signal line 15*y* via a transistor 12*f* connected with a scanning signal line 16*f*. A pixel electrode 17*fs* of the pixel 106 is connected with a pixel electrode 17*fm* via capacitance. A pixel electrode 17Am of a pixel 111 is connected to a data signal line 15X via a transistor 12A connected with a scanning signal line 16*a*. A pixel electrode 17As of the pixel 111 is connected with a pixel electrode 17Am via capacitance. A pixel electrode 17Bm of a pixel 112 is connected to a data signal line 15Y via a transistor 12B connected with a scanning signal line 16*b*. A pixel electrode 17Bs of the pixel 112 is connected with a pixel electrode 17Bm via capacitance. Pixels 113 to 116 have similar configurations.

Moreover, a retention capacitor Cham is formed between the pixel electrode 17*am* and the retention capacitor wiring 18*a*. A retention capacitor Chas is formed between the pixel electrode 17*as* and the retention capacitor wiring 18*a*. A combined capacitor Cams is formed between the pixel electrode 17*am* and the pixel electrode 17*as*. A retention capacitor Chbm is formed between the pixel electrode 17*bm* and the retention capacitor wiring 18*b*. A retention capacitor Chbs is formed between the pixel electrode 17*bs* and the retention capacitor wiring 18*b*. A combined capacitor Cbms is formed between the pixel electrode 17*bm* and the pixel electrode 17*bs*. A retention capacitor Chcm is formed between the pixel electrode 17*cm* and the retention capacitor wiring 18*c*. A retention capacitor Chcs is formed between the pixel electrode 17*cs* and the retention capacitor wiring 18*c*. A combined capacitor Ccms is formed between the pixel electrode 17*cm* and the pixel electrode 17*cs*. A retention capacitor Chdm is formed between the pixel electrode 17*dm* and the retention capacitor wiring 18*d*. A retention capacitor Chds is formed between the pixel electrode 17*ds* and the retention capacitor wiring 18*d*. A combined capacitor Cdms is formed between the pixel electrode 17*dm* and the pixel electrode 17*ds*. A retention capacitor Chem is formed between the pixel electrode 17*em* and the retention capacitor wiring 18*e*. A retention capacitor Ches is formed between the pixel electrode 17*es* and the retention capacitor wiring 18*e*. A combined capacitor Cems is formed between the pixel electrode 17*em* and the pixel electrode 17*es*. A retention capacitor Chfm is formed between the pixel electrode 17*fm* and the retention capacitor wiring 18*f*. A retention capacitor Chfs is formed between the pixel electrode 17*fs* and the retention capacitor wiring 18*f*. A combined capacitor Cfms is formed between the pixel electrode 17*fm* and the pixel electrode 17*fs*. A retention capacitor ChAm is formed between the pixel electrode 17Am and the retention capacitor wiring 18A. A retention capacitor ChAs is formed between the pixel electrode 17As and the retention capacitor wiring 18A. A combined capacitor CAms is formed between the pixel electrode 17Am and the pixel electrode 17As. A retention capacitor ChBm is formed between the pixel electrode 17Bm and the retention capacitor wiring 18B. A retention capacitor ChBs is formed between the pixel electrode 17Bs and the retention capacitor wiring 18B. A combined capacitor CBms is formed between the pixel electrode 17Bm and the pixel electrode 17Bs. Retention capacitors and combined capacitors in pixels 113 to 116 have similar configurations.

When the liquid crystal panel provided with the active matrix substrate as described above is driven as illustrated in FIG. 5, the pixel electrode 17*am* receives a potential positive and equal to the data signal, while the pixel electrode 17*as* receives a potential positive but equal to or smaller than the data signal in absolute value than because the pixel electrode 17*as* is connected to the pixel electrode 17*am* via capacitance. Moreover, the pixel electrode 17*bm* receives a potential negative and equal to the data signal, while the pixel electrode 17*bs* receives a potential negative but equal to or smaller than the data signal in absolute value than because the pixel electrode 17*bs* is connected to the pixel electrode 17*bm* via capacitance. Moreover, the pixel electrode 17*cm* receives a potential positive and equal to the data signal, while the pixel electrode 17*cs* receives a potential positive but equal to or smaller than the data signal in absolute value than because the pixel electrode 17*cs* is connected to the pixel electrode 17*cm* via capacitance. Moreover, the pixel electrode 17*dm* receives a potential negative and equal to the data signal, while the pixel electrode 17*ds* receives a potential negative but equal to or smaller than the data signal in absolute value than because the pixel electrode 17*ds* is connected to the pixel electrode 17*dm* via capacitance. Moreover, the pixel electrode 17*em* receives a potential positive and equal to the data signal, while the pixel electrode 17*es* receives a potential positive but equal to or smaller than the data signal in absolute value than because the pixel electrode 17*es* is connected to the pixel electrode 17*em* via capacitance. Moreover, the pixel electrode 17*fm* receives a potential negative and equal to the data signal, while the pixel electrode 17*fs* receives a potential negative but equal to or smaller than the data signal in absolute value than because the pixel electrode 17*fs* is connected to the pixel electrode 17*fm* via capacitance. Moreover, the pixel electrode 17Am receives a potential negative and equal to the data signal, while the pixel electrode 17As receives a potential negative but equal to or smaller than the data signal in absolute value than because the pixel electrode 17As is connected to the pixel electrode 17Am via capacitance. Moreover, the pixel electrode 17Bm receives a potential positive and equal to the data signal, while the pixel electrode 17Bs receives a potential positive but equal to or smaller than the data signal in absolute value than because the pixel electrode 17Bs is connected to the pixel electrode 17Bm via capacitance.

Figure 13:
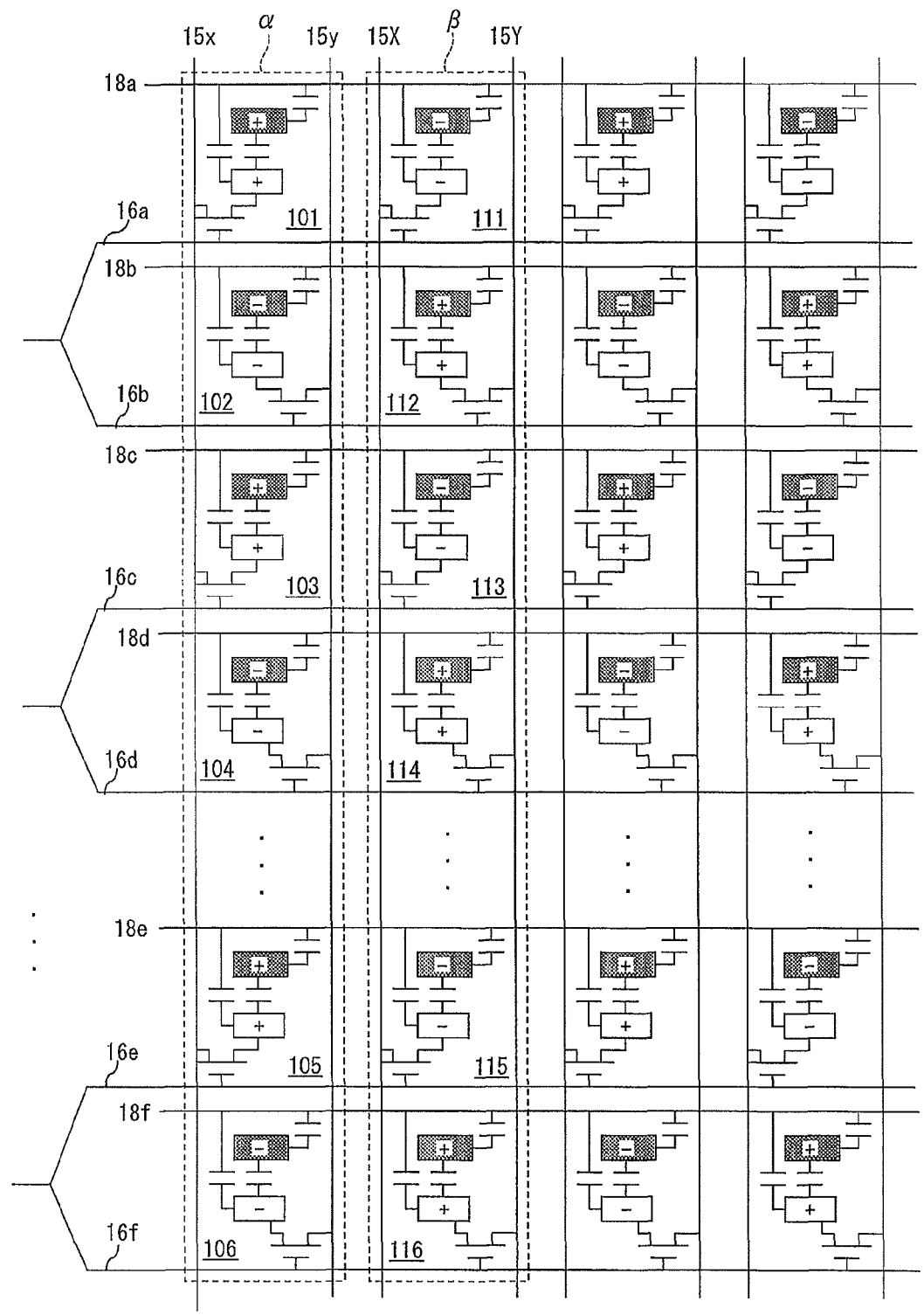
FIG. 13 is a schematic view illustrating how the liquid crystal panel provided with the active matrix substrate of FIG. 12 performs its display operation according to the driving method of FIG. 5.

In this way, in F1, sub pixels of the pixels electrodes become as illustrated in FIG. 13: A sub pixel containing the pixel electrode 17*am* becomes positive bright sub pixel; A sub pixel containing the pixel electrode 17*as* becomes positive dark sub pixel; A sub pixel containing the pixel electrode 17*bm* becomes negative bright sub pixel; A sub pixel containing the pixel electrode 17*bs* becomes negative dark sub pixel; sub pixel containing the pixel electrode 17*cm* becomes positive bright sub pixel; A sub pixel containing the pixel electrode 17*cs* becomes positive dark sub pixel; A sub pixel containing the pixel electrode 17*dm* becomes negative bright sub pixel; A sub pixel containing the pixel electrode 17*ds* becomes negative dark sub pixel; A sub pixel containing the pixel electrode 17*em* becomes positive bright sub pixel; A sub pixel containing the pixel electrode 17es becomes positive dark sub pixel; A sub pixel containing the pixel electrode 17fm becomes negative bright sub pixel; A sub pixel containing the pixel electrode 17fs becomes negative dark sub pixel; A sub pixel containing the pixel electrode 17Am becomes negative bright sub pixel; A sub pixel containing the pixel electrode 17As becomes negative dark sub pixel; and A sub pixel containing the pixel electrode 17Bm becomes positive bright sub pixel; A sub pixel containing the pixel electrode 17Bs becomes positive dark sub pixel. In F2, the sub pixels have polarities reversed from their polarities in F1.

The liquid crystal panel as described above is capable of displaying halftones by using the bright and dark sub pixels, thereby to improve viewing angle characteristics.

Figure 14:
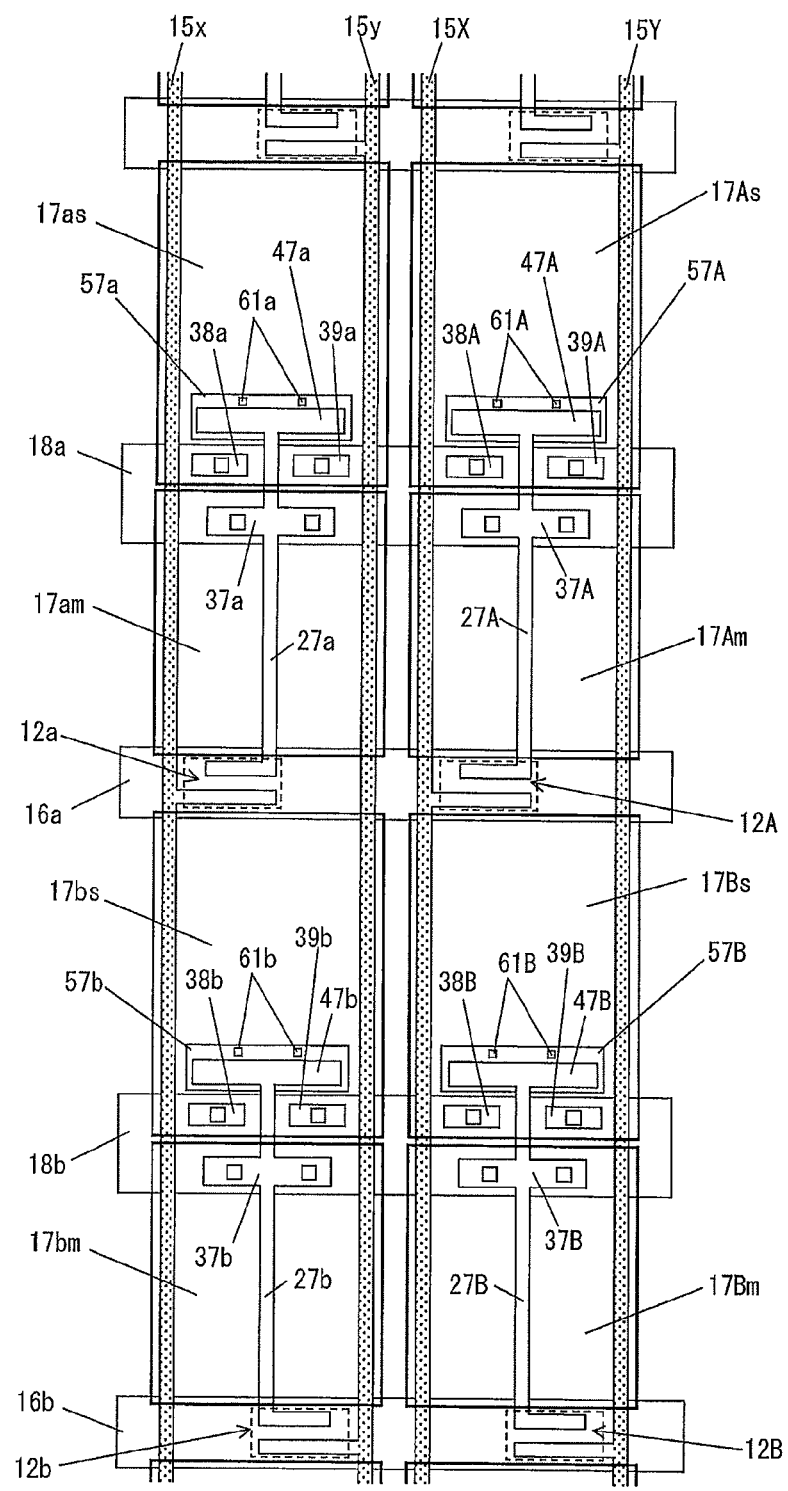
FIG. 14 is a plane view illustrating one example of a configuration of a liquid crystal panel provided with the active matrix substrate of FIG. 12.

FIG. 14 is a plane view illustrating an exemplary configuration of a liquid crystal panel provided with the active matrix substrate illustrated in FIG. 12. For easy illustration, FIG. 14 illustrates only the members of the active matrix substrate, and omits the members of the color filter substrate (counter substrate).

The liquid crystal panel herein is identical with the liquid crystal panel of FIG. 1 in terms of configurations of data signal lines, scanning signal lines, retention capacitor wirings, and transistors.

The pixel electrode 17am is provided to overlap with an upstream-side edge of the scanning signal line 16a along the scanning direction and with the data signal lines 15x and 15y. The pixel electrode 17as is provided on the upstream of the pixel electrode 17am along the scanning direction. The pixel electrode 17bm is provided to overlap with an upstream-side edge of the scanning signal line 16b along the scanning direction and with the data signal lines 15x and 15y. The pixel electrode 17bs is provided on the upstream of the pixel electrode 17bm along the scanning direction. The pixel electrode 17Am is provided to overlap with an upstream-side edge of the scanning signal line 16a along the scanning direction and with the data signal lines 15X and 15Y. The pixel electrode 17As is provided on the upstream of the pixel electrode 17Am along the scanning direction. The pixel electrode 17Bm is provided to overlap with an upstream-side edge of the scanning signal line 16b along the scanning direction and with the data signal lines 15X and 15Y. The pixel electrode 17Bs is provided on the upstream of the pixel electrode 17Bm along the scanning direction.

Moreover, the retention capacitor wiring 18a is provided to overlap the pixel electrodes 17am, 17as, 17Am, and 17As. The retention capacitor wiring 18b is provided to overlap the pixel electrodes 17bm, 17bs, 17Bm, and 17Bs.

In plane view, either edges of the pixel electrode 17am along the column direction are located outside of the data signal line 15x and the data signal line 15y. Either edges of the pixel electrode 17as along the column direction are located outside of the data signal line 15x and the data signal line 15y. Either edges of the pixel electrode 17bm along the column direction are located outside of the data signal line 15x and the data signal line 15y. Either edges of the pixel electrode 17bs along the column direction are located outside of the data signal line 15x and the data signal line 15y. Either edges of the pixel electrode 17Am along the column direction are located outside of the data signal line 15X and the data signal line 15Y. Either edges of the pixel electrode 17As along the column direction are located outside of the data signal line 15X and the data signal line 15Y. Either edges of the pixel electrode 17Bm along the column direction are located outside of the data signal line 15X and the data signal line 15Y. Either edges of the pixel electrode 17Bs along the column direction are located outside of the data signal line 15X and the data signal line 15Y.

Moreover, the scanning signal line 16a functions as a gate electrode of the transistor 12a. A source electrode of the transistor 12a is connected to the data signal line 15x. A drain electrode of the transistor 12a is connected to a capacitor electrode 37a via a drain extraction electrode 27a. The capacitor electrode 37a is positioned above the retention capacitor wiring 18a, and connected with the pixel electrode 17am via two contact holes. Moreover, a capacitor electrodes 38a and 39a are provided on the retention capacitor, wiring 18a. The capacitor electrodes 38a and 39a are connected to the pixel electrode 17as via the contact holes, respectively. Under the pixel electrode 17as, a capacitor electrode 57a formed on the same layer as the scanning signal lines, and capacitor electrode 47a (connected with the capacitor electrode 37a on the same layer) and the capacitor electrode 57a overlap each other. Moreover, the scanning signal line 16b functions as a gate electrode of the transistor 12b. A source electrode of the transistor 12b is connected to the data signal line 15y. A drain electrode of the transistor 12b is connected to a capacitor electrode 37b via a drain extraction electrode 27b. The capacitor electrode 37b is positioned above the retention capacitor wiring 18b, and connected with the pixel electrode 17bm via two contact holes. Moreover, a capacitor electrodes 38b and 39b are provided on the retention capacitor wiring 18b. The capacitor electrodes 38b and 39b are connected to the pixel electrode 17bs via the contact holes, respectively. Under the pixel electrode 17bs, a capacitor electrode 57b formed on the same layer as the scanning signal lines, and capacitor electrode 47b (connected with the capacitor electrode 37b on the same layer) and the capacitor electrode 57b overlap each other. The pixels 111 and 112 have similar configurations.

In the liquid crystal panel of the present invention, the retention capacitor Cham (see FIG. 12) is formed at a position in which the retention capacitor wiring 18a and the retention electrode 37a overlap each other with a gate insulating film interposed therebetween. The retention capacitor Chas (see FIG. 12) is formed at a position in which the retention capacitor wiring 18a and the retention electrodes 38a and 39a overlap each other with a gate insulating film interposed therebetween. The retention capacitor Cams (see FIG. 12) is formed at a position in which the capacitor electrode 47a and the retention electrode 57a overlap each other with a gate insulating film interposed therebetween. The retention capacitor Chbm (see FIG. 12) is formed at a position in which the retention capacitor wiring 18b and the retention electrode 37b overlap each other with a gate insulating film interposed therebetween. The retention capacitor Chbs (see FIG. 12) is formed at a position in which the retention capacitor wiring 18b and the retention electrodes 38b and 39b overlap each other with a gate insulating film interposed therebetween. The retention capacitor Cbms (see FIG. 12) is formed at a position in which the capacitor electrode 47b and the retention electrode 57b overlap each other with a gate insulating film interposed therebetween. The retention capacitor ChAm (see FIG. 12) is formed at a position in which the retention capacitor wiring 18a and the retention electrode 37A overlap each other with a gate insulating film interposed therebetween. The retention capacitor ChAs (see FIG. 12) is formed at a position in which the retention capacitor wiring 18a and the retention electrodes 38A and 39A overlap each other with a gate insulating film interposed therebetween. The retention capacitor CAms (see FIG. 12) is formed at a position in which the capacitor electrode 47A and the retention electrode 57A overlap each other with a gate insulating film interposed therebetween. The retention capacitor ChBm (see FIG. 12) is formed at a position in which the retention capacitor wiring 18*b* and the retention electrode 37B overlap each other with a gate insulating film interposed therebetween. The retention capacitor ChBs (see FIG. 12) is formed at a position in which the retention capacitor wiring 18*b* and the retention electrodes 38B and 39B overlap each other with a gate insulating film interposed therebetween. The retention capacitor CBms (see FIG. 12) is formed at a position in which the capacitor electrode 47*b* and the retention electrode 57*b* overlap each other with a gate insulating film interposed therebetween.

(Modification 2)

Figure 15:
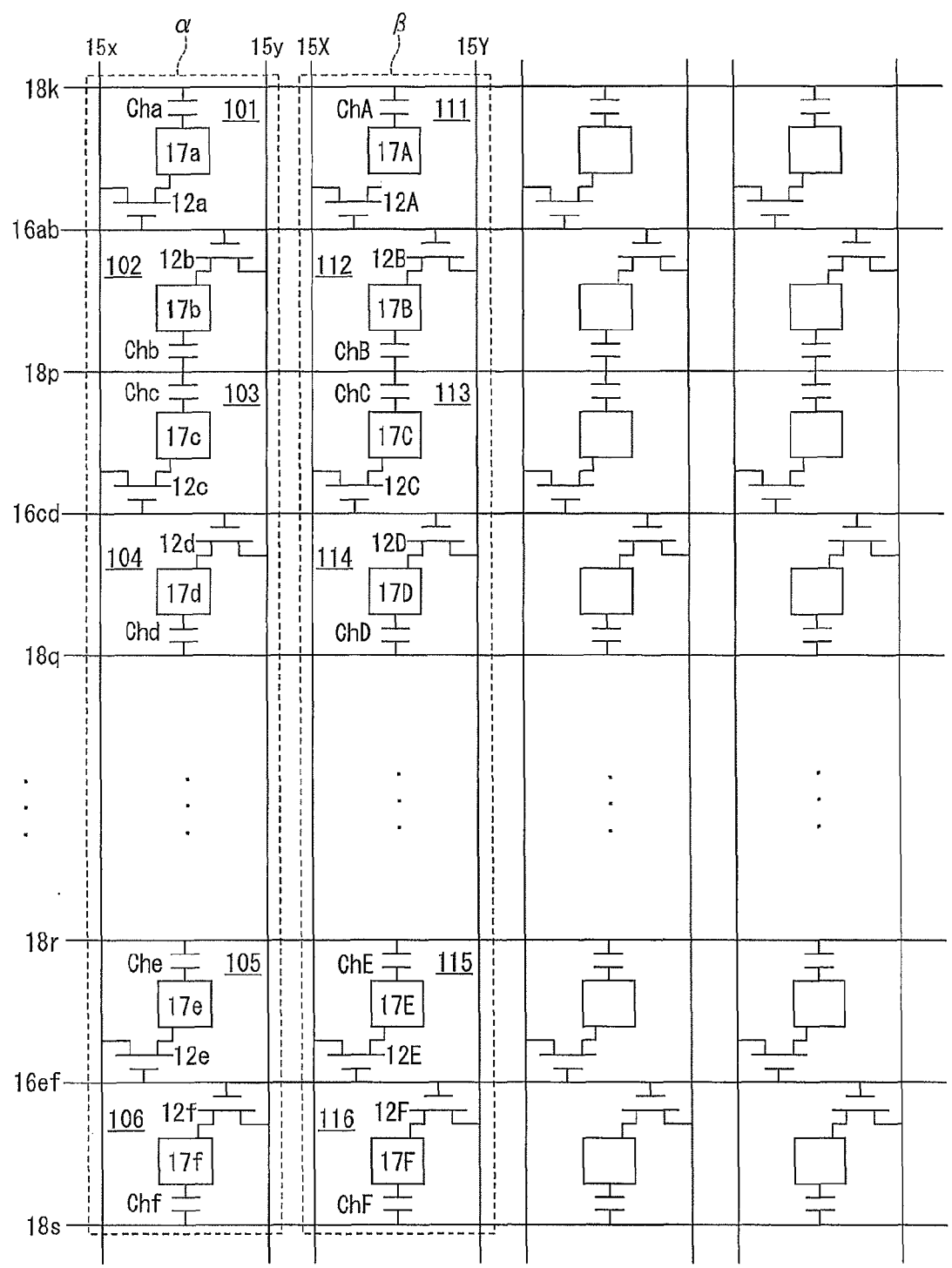
FIG. 15 is an equivalent circuit schematic illustrating Modification 2 of the active matrix substrate of FIG. 3.

FIG. 15 is an equivalent circuit schematic illustrating part of an active matrix substrate according to Modification 2. As illustrated in FIG. 15, the active matrix substrate is configured such that data signals lines 15*x*, 15*y*, 15X, and 15Y are aligned in this order, and the scanning signal lines 16*ab*, 16*cb*, . . . , 16*ef* are aligned in this order along the row direction (lateral direction in FIG. 15). Pixels 101 and 102 are provided in association with an intersection of the data signal line 15*x* and the scanning signal line 16*ab*, and with an intersection of the data signal line 15*y* and the scanning signal line 16*ab*, respectively. Pixels 103 and 104 are provided in association with an intersection of the data signal line 15*x* and the scanning signal line 16*cb*, and with an intersection of the data signal line 15*y* and the scanning signal line 16*cb*, respectively. Pixel 105 and 106 are provided in association with an intersection of the data signal line 15*x* and the scanning signal line 16*ef*, and with an intersection of the data signal line 15*y* and the scanning signal line 16*ef*, respectively. Similarly, pixels 111 and 112 are provided in association with an intersection of the data signal line 15X and the scanning signal line 16*ab*, and with an intersection of the data signal line 15Y and the scanning signal line 16*ab*, respectively. Pixels 113 and 114 are provided in association with an intersection of the data signal line 15X and the scanning signal line 16*cd*, and with an intersection of the data signal line 15Y and the scanning signal line 16*ef*. Pixels 115 and 116 are provided in association with an intersection of the data signal line 15X and the scanning signal line 16*ef*, and with an intersection of the data signal line 15Y and the scanning signal line 16*ef*.

A retention capacitor wiring 18*k* is provided for the pixels 101 and 111. A retention capacitor wiring 18*p* is provided for the pixels 102, 112, 103, and 113. A retention capacitor wiring 18*q* is provided for the pixels 104 and 114. A retention capacitor wiring 18*r* is provided for the pixels 105 and 115. A retention capacitor wiring 18*s* is provided for the pixels 106 and 116.

Moreover, a retention capacitance Cha is formed between the retention capacitor wiring 18*k* and the pixel electrode 17*a*. A retention capacitance Chb is formed between the retention capacitor wiring 18*p* and the pixel electrode 17*b*. A retention capacitance Chc is formed between the retention capacitor wiring 18*p* and the pixel electrode 17*c*. A retention capacitance Chd is formed between the retention capacitor wiring 18*q* and the pixel electrode 17*d*. A retention capacitance Che is formed between the retention capacitor wiring 18*r* and the pixel electrode 17*e*. A retention capacitance Chf is formed between the retention capacitor wiring 18*s* and the pixel electrode 17*f*. Similarly, a retention capacitance ChA is formed between the retention capacitor wiring 18*k* and the pixel electrode 17A. A retention capacitance ChB is formed between the retention capacitor wiring 18*p* and the pixel electrode 1713. A retention capacitance ChC is formed between the retention capacitor wiring 18*p* and the pixel electrode 17C. A retention capacitance ChD is formed between the retention capacitor wiring 18*q* and the pixel electrode 17D. A retention capacitance ChE is formed between the retention capacitor wiring 18*r* and the pixel electrode 17E. A retention capacitance ChF is formed between the retention capacitor wiring 18*s* and the pixel electrode 17F.

Figure 16:
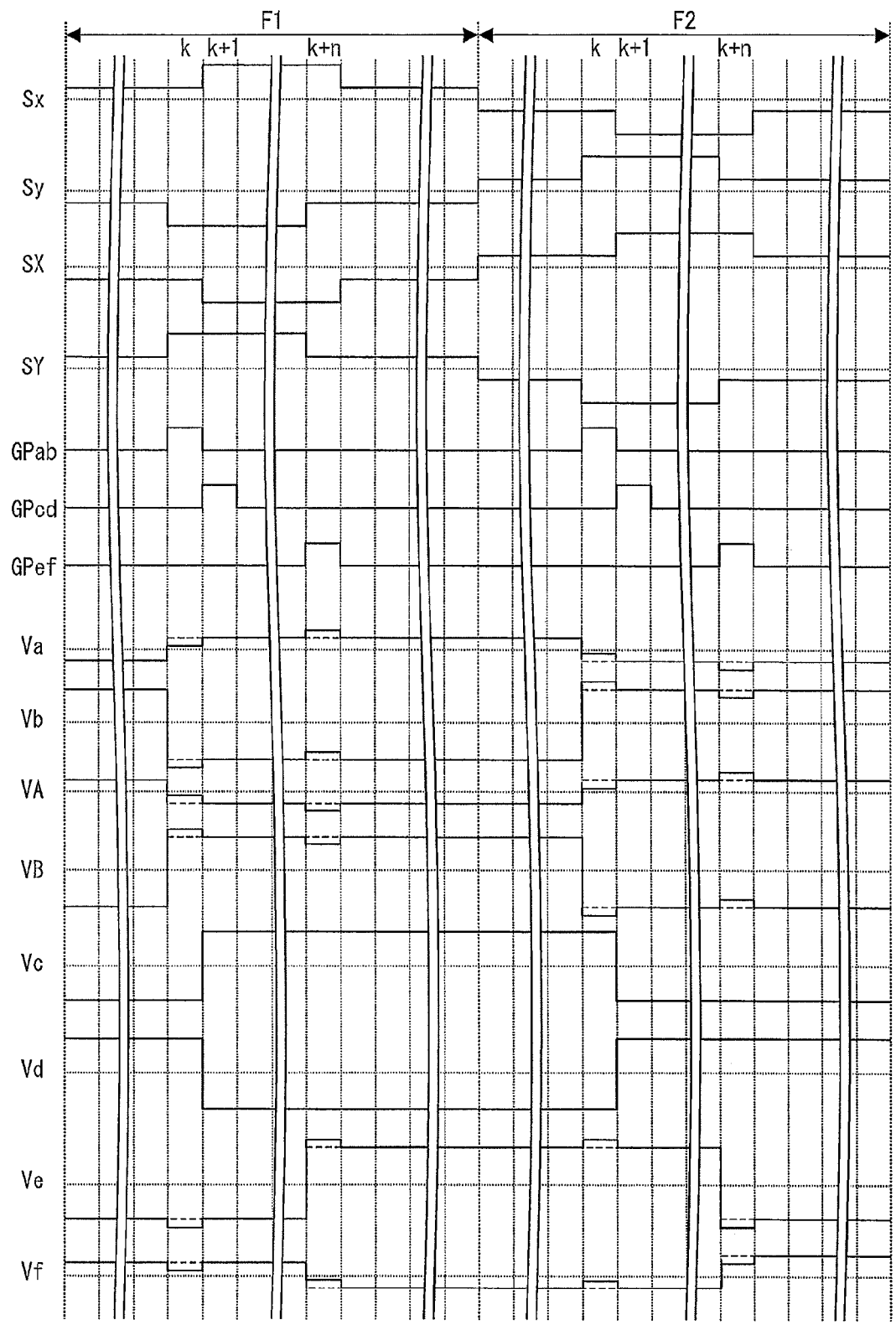
FIG. 16 is a timing chart illustrating a driving method for driving a liquid crystal panel provided with the active matrix substrate of FIG. 15.

FIG. 16 is a timing charge illustrating a driving method (normally black mode) of the liquid crystal panel provided with the active matrix substrate described above. The reference characters GPab, GPcd, and GPef indicates gate signals to be supplied to the scanning signal lines 16*ab*, 16*cd*, and 16*ef*.

In the driving method, as illustrated in FIG. 16, the scanning lines are selected one by one. Polarities of the data signals to be supplied to the data signals are reversed every frame period (1V). In the same horizontal scanning period (H), paired data signal lines (a pair of 15*x* and 15*y*, or a pair of 15X and 15Y) provided for a pixel array are supplied with data signals of opposite polarities, while each of the pair of data signal lines and a data signal line adjacent thereto (15*y* and 15 X) are supplied with data signals of the same polarity. Changes in pixel potentials are same as those illustrated in the timing charge illustrated in FIG. 5, and therefore, the changes in pixel potential are not explained again here.

Figure 17:
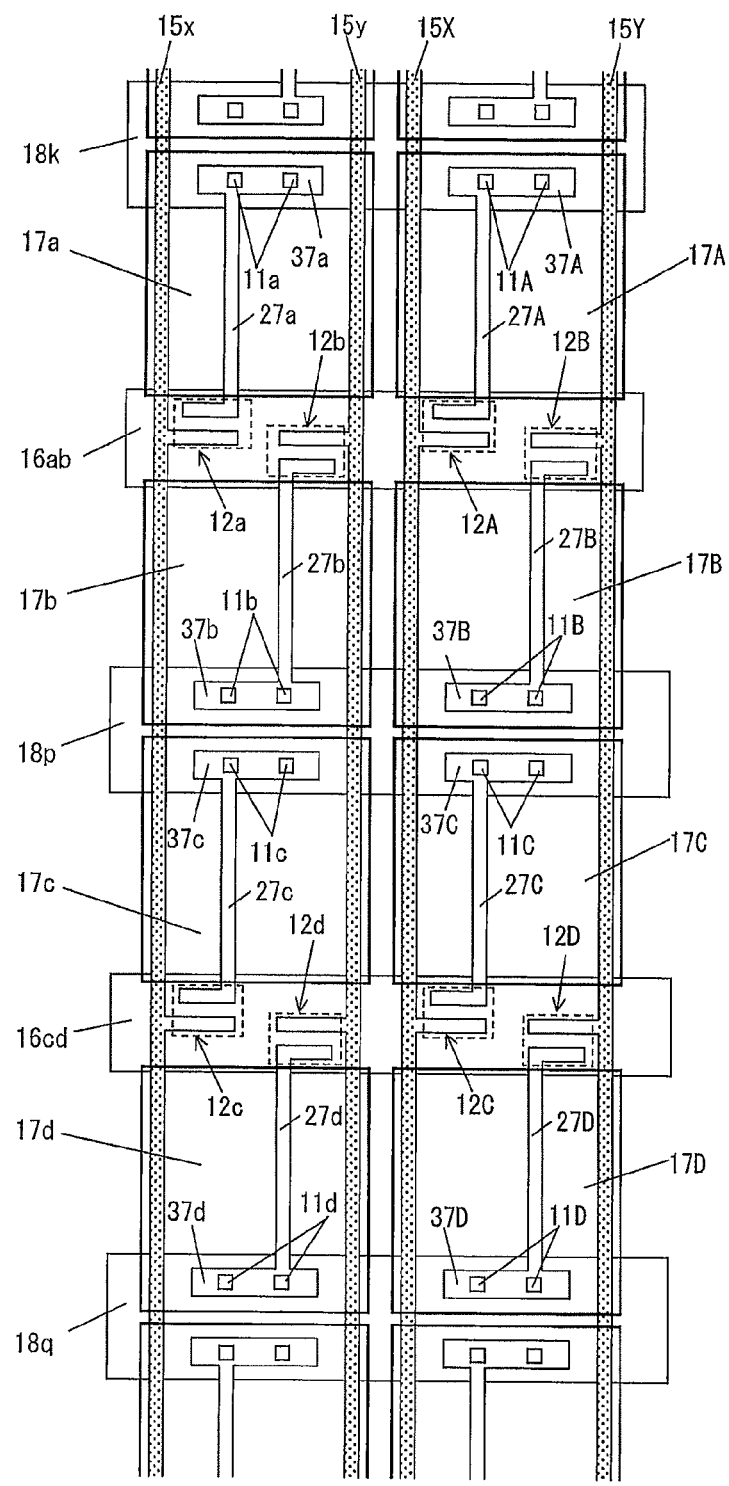
FIG. 17 is a plane view illustrating one example of a liquid crystal panel provided with the active matrix substrate of FIG. 15.

FIG. 17 is a plane view illustrating part of a liquid crystal panel provided with the active matrix substrate illustrated in FIG. 15. In FIG. 17, for the sake of easy illustration, members on the color filter substrate (counter substrate) are not illustrated, while only members on the active matrix substrate are illustrated.

In this liquid crystal panel, a pair of (two) data signal lines 15*x* and 15*y*, a pair of (two) data signal lines 15X and 15Y are provided in such a manner the data signal line 15*y* and the data signal line 15X are adjacent to each other. The scanning signal lines 16*ab* and 16*cd* are provided to cross the data signal lines perpendicularly. In the vicinity of an intersection between the data signal line 15*x* and the scanning signal line 16*ab*, the transistor 12*a* is provided. In the vicinity of an intersection between the data signal line 15*y* and the scanning signal line 16*ab*, the transistor 12*b* is provided. In the vicinity of an intersection between the data signal line 15X and the scanning signal line 16*ab*, the transistor 12A is provided. In the vicinity of an intersection between the data signal line 15Y and the scanning signal line 16*ab*, the transistor 12B is provided. In the vicinity of an intersection between the data signal line 15*x* and the scanning signal line 16*cd*, the transistor 12*c* is provided. In the vicinity of an intersection between the data signal line 15*y* and the scanning signal line 16*cd*, the transistor 12*d* is provided. In the vicinity of an intersection between the data signal line 15X and the scanning signal line 16*cd*, the transistor 12C is provided. In the vicinity of an intersection between the data signal line 15Y and the scanning signal line 16*cd*, the transistor 12D is provided.

Moreover, the pixel electrode 17*a* is provided to overlap with an upstream-side edge of the scanning signal line 16*ab* along the scanning direction and with the data signal lines 15*x* and 15*y*. The pixel electrode 17*b* is provided to overlap with a downstream-side edge of the scanning signal line 16*ab* along the scanning direction and with the data signal lines 15*x* and 15*y*. The pixel electrode 17*c* is provided to overlap with an upstream-side edge of the scanning signal line 16*cd* along the scanning direction and with the data signal lines 15*x* and 15*y*. The pixel electrode 17*d* is provided to overlap with a downstream-side edge of the scanning signal line 16*cd* along the scanning direction and with the data signal lines 15*x* and 15*y*. The pixel electrode 17A is provided to overlap with an upstream-side edge of the scanning signal line 16*ab* along the scanning direction and with the data signal lines 15X and 15Y. The pixel electrode 17B is provided to overlap with a downstream-side edge of the scanning signal line 16ab along the scanning direction and with the data signal lines 15X and 15Y.

Moreover, a retention capacitor wiring 18k is provided to overlap the pixel electrodes 17a and 17A. A retention capacitor wiring 18p is provided to overlap the pixel electrode 17b, 17B, 17c, and 17C. A retention capacitor wiring 18q is provided to overlap the pixel electrodes 17d and 17D.

Moreover, the scanning signal line 16ab functions as a gate electrode of the transistor 12a. A source electrode of the transistor 12a is connected to the data signal line 15x. A drain electrode of the transistor 12a is connected to a capacitor electrode 37a via a drain extraction electrode 27a. The capacitor electrode 37a is positioned above the retention capacitor wiring 18k, and connected with the pixel electrode 17a via two contact holes 11a. Moreover, the scanning signal line 16ab functions as a gate electrode of the transistor 12b. A source electrode of the transistor 12b is connected to the data signal line 15y. A drain electrode of the transistor 12b is connected to a capacitor electrode 37b via a drain extraction electrode 27b. The capacitor electrode 37b is positioned above the retention capacitor wiring 18p, and connected with the pixel electrode 17b via two contact holes 11b.

Moreover, the scanning signal line 16cd functions as a gate electrode of the transistor 12c. A source electrode of the transistor 12c is connected to the data signal line 15x. A drain electrode of the transistor 12c is connected to a capacitor electrode 37c via a drain extraction electrode 27c. The capacitor electrode 37c is positioned above the retention capacitor wiring 18p, and connected with the pixel electrode 17c via two contact holes 11c. Moreover, the scanning signal line 16cd functions as a gate electrode of the transistor 12d. A source electrode of the transistor 12d is connected to the data signal line 15y. A drain electrode of the transistor 12d is connected to a capacitor electrode 37d via a drain extraction electrode 27d. The capacitor electrode 37d is positioned above the retention capacitor wiring 18q, and connected with the pixel electrode 17d via two contact holes 11d.

Similarly, the scanning signal line 16ab functions as a gate electrode of the transistor 12A. A source electrode of the transistor 12A is connected to the data signal line 15X. A drain electrode of the transistor 12A is connected to a capacitor electrode 37A via a drain extraction electrode 27A. The capacitor electrode 37A is positioned above the retention capacitor wiring 18k, and connected with the pixel electrode 17A via two contact holes 11A. Moreover, the scanning signal line 16ab functions as a gate electrode of the transistor 12B. A source electrode of the transistor 12b is connected to the data signal line 15Y. A drain electrode of the transistor 12B is connected to a capacitor electrode 37B via a drain extraction electrode 27B. The capacitor electrode 37B is positioned above the retention capacitor wiring 18p, and connected with the pixel electrode 17B via two contact holes 11B.

Moreover, the scanning signal line 16cd functions as a gate electrode of the transistor 12C. A source electrode of the transistor 12A is connected to the data signal line 15X. A drain electrode of the transistor 12C is connected to a capacitor electrode 37C via a drain extraction electrode 27C. The capacitor electrode 37C is positioned above the retention capacitor wiring 18p, and connected with the pixel electrode 17C via two contact holes 110. Moreover, the scanning signal line 16cd functions as a gate electrode of the transistor 12D. A source electrode of the transistor 12D is connected to the data signal line 15Y. A drain electrode of the transistor 12D is connected to a capacitor electrode 37D via a drain extraction electrode 27D. The capacitor electrode 37D is positioned above the retention capacitor wiring 18q, and connected with the pixel electrode 17D via two contact holes 11D.

In the liquid crystal panel of the present invention, the retention capacitor Cha (see FIG. 15) is formed at a position in which the retention capacitor wiring 18k and the retention electrode 37a overlap each other with gate insulating film interposed therebetween. The retention capacitor Chb (see FIG. 15) is formed at a position in which the retention capacitor wiring 18p and the retention electrode 37b overlap each other with a gate insulating film interposed therebetween. The retention capacitor Chc (see FIG. 15) is formed at a position in which the retention capacitor wiring 18p and the retention electrode 37c overlap each other with a gate insulating film interposed therebetween. The retention capacitor Chd (see FIG. 15) is formed at a position in which the retention capacitor wiring 18q and the retention electrode 37d overlap each other with a gate insulating film interposed therebetween.

This liquid crystal panel is configured such that one scanning signal is provided for two pixels. Thus, the number of the scanning signal lines can be smaller in this liquid crystal panel than in the liquid crystal panel illustrated in FIG. 1. This gives this liquid crystal panel a greater aperture ratio, thereby improving light use efficiency. The number and positions of the scanning signal lines can be determined as appropriate, depending on the purpose of the use of the active matrix substrate and the liquid crystal panel.

(Modification 3)

Figure 18:
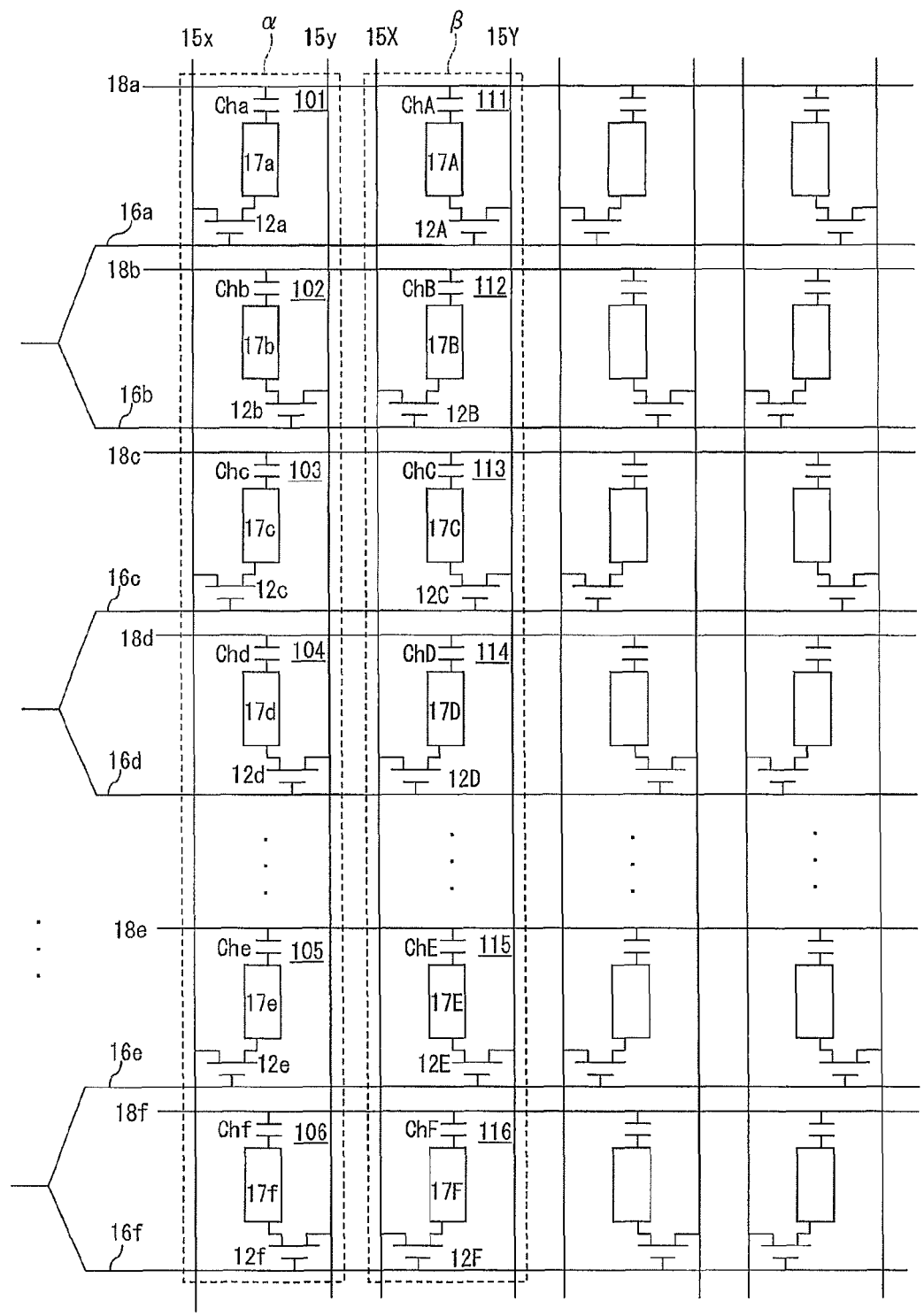
FIG. 18 is an equivalent circuit schematic illustrating Modification 3 of the active matrix substrate of FIG. 3.

FIG. 18 is an equivalent circuit schematic illustrating part of an active matrix substrate according to Modification 3. The active matrix substrate of FIG. 18 is identical with the active matrix substrate of FIG. 3 in terms of configurations of data signal lines, scanning signal lines, retention capacitor wirings, and pixels.

Each pixels is provided with one pixel electrode. The pixel electrode 17a of the pixel 101 is connected to the data signal line 15x via a transistor 12a connected to the scanning signal line 16a. The pixel electrode 17b of the pixel 102 is connected to the data signal line 15y via a transistor 12b connected to the scanning signal line 16b. The pixel electrode 17c of the pixel 103 is connected to the data signal line 15x via a transistor 12c connected to the scanning signal line 16c. The pixel electrode 17d of the pixel 104 is connected to the data signal line 15y via a transistor 12d connected to the scanning signal line 16d. The pixel electrode 17e of the pixel 101 is connected to the data signal line 15x via a transistor 12e connected to the scanning signal line 16e. The pixel electrode 17f of the pixel 106 is connected to the data signal line 15y via a transistor 12f connected to the scanning signal line 16f. Meanwhile, the pixel electrode 17A of the pixel 111 is connected to the data signal line 15Y via a transistor 12A connected to the scanning signal line 16a. The pixel electrode 17B of the pixel 112 is connected to the data signal line 15X via a transistor 12B connected to the scanning signal line 16b. The pixel electrode 17C of the pixel 113 is connected to the data signal line 15Y via a transistor 12C connected to the scanning signal line 16c. The pixel electrode 17D of the pixel 114 is connected to the data signal line 15X via a transistor 12D connected to the scanning signal line 16d. The pixel electrode 17E of the pixel 115 is connected to the data signal line 15Y via a transistor 12E connected to the scanning signal line 16e. The pixel electrode 17F of the pixel 116 is connected to the data signal line 15X via a transistor 12F connected to the scanning signal line 16f.

That is, unlike the configuration of the active matrix of FIG. 3, the data signal line 15y to which the pixel electrodes (17b, 17*d*, 17*f*) of the even-numbered pixels (102, 104, 106) in the pixel α are connected is adjacent to the data signal line 15X to which the pixel electrodes (17B, 17D, 17F) of the even-numbered pixels (112, 114, 116) in the pixel β are connected.

Figure 19:
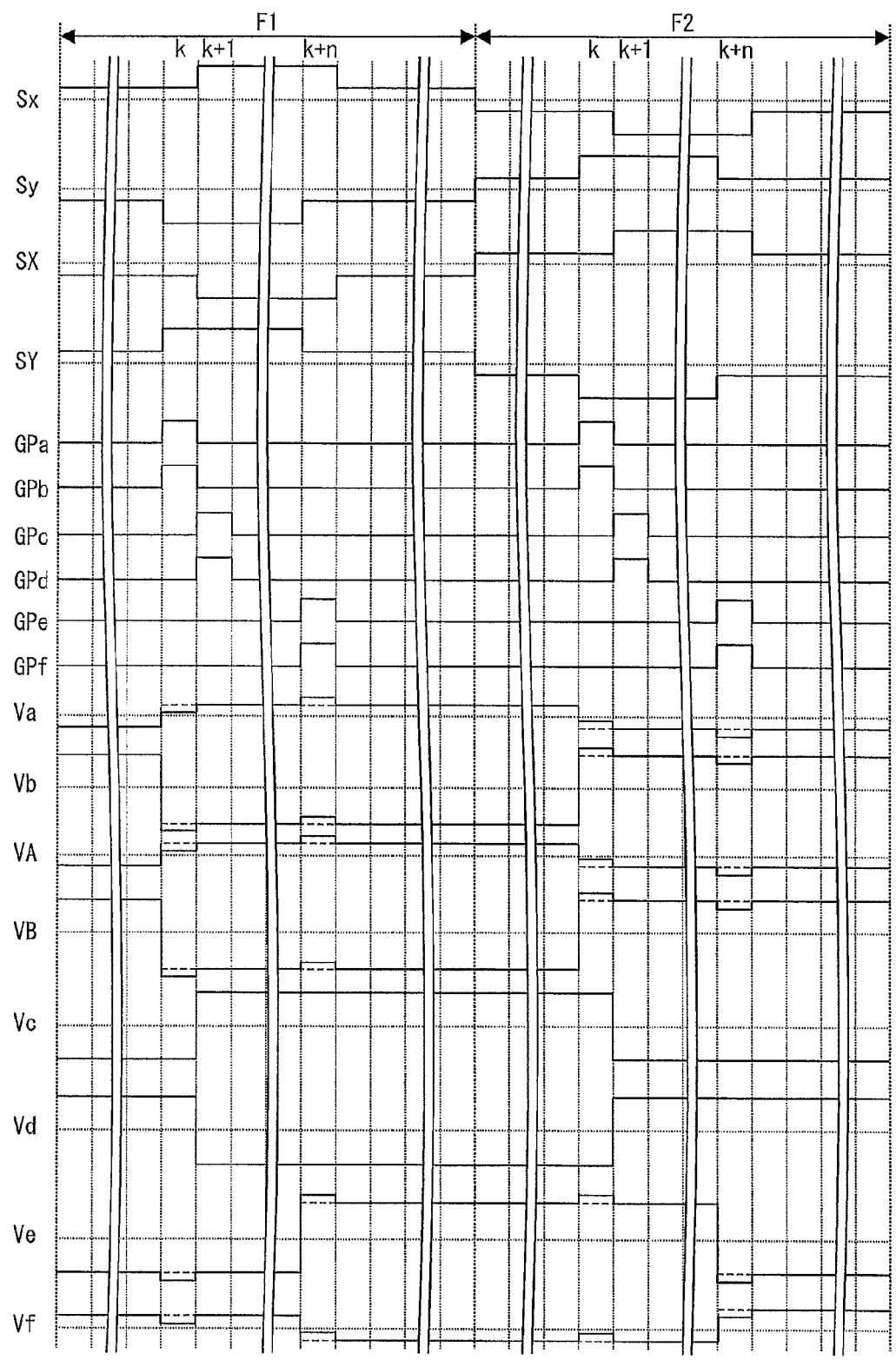
FIG. 19 is a timing chart illustrating a driving method for driving a liquid crystal panel provided with the active matrix substrate of FIG. 18.

FIG. 19 is a timing chart illustrating a driving method (normally black mode) of a liquid crystal panel provided with the active matrix substrate described above.

Similarly to the driving illustrated in FIG. 5, the driving method of the present modification is arranged such that (i) the scanning signal lines are driven by selecting two of the scanning signal lines concurrently at a time, (ii) the polarities of the data signals to be supplied to the data signals are reversed every frame period (1V), and (iii) in one horizontal scanning period (H), paired data signal lines (15*x* and 15*y*, or 15X and 15Y) provided for the same pixel array are supplied with data signals of opposite polarities while each of the pair of data signal lines and a data signal line adjacent thereto (15*y* and 15 X) are supplied with data signals of the same polarity.

By this, the pixel potentials (Va, Vb, Vc, Vd, Ve, and Vf) in the pixels in the pixel array α change in the same manner as those illustrated in FIG. 5, but the pixel potentials (VA and VB in FIG. 19) of the pixels in the pixel array β change with polarities opposite to those illustrated in FIG. 5.

Figure 20:
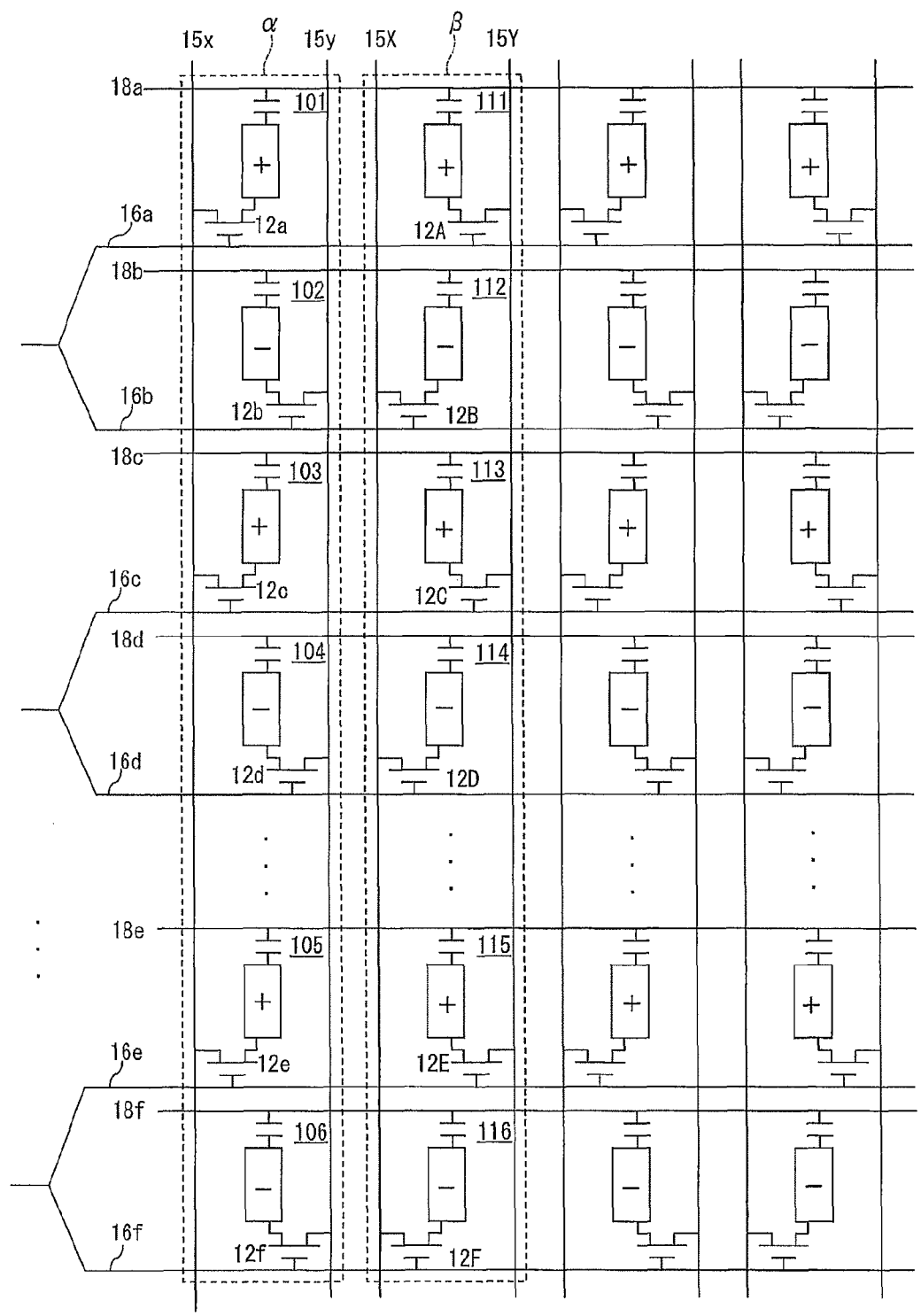
FIG. 20 is a schematic view illustrating how the liquid crystal panel provided with the active matrix substrate of FIG. 18 operates its display operation according to the driving method of FIG. 19.

By this, as illustrated in FIG. 20, the pixel electrode 17*a* of the pixel 101 is supplied with a positive data signal. The pixel electrode 17*b* of the pixel 102 is supplied with a negative data signal. The pixel electrode 17*c* of the pixel 103 is supplied with a positive data signal. The pixel electrode 17*d* of the pixel 104 is supplied with a negative data signal. The pixel electrode 17*e* of the pixel 105 is supplied with a positive data signal. The pixel electrode 17*f* of the pixel 106 is supplied with a negative data signal. The pixel electrode 17A of the pixel 111 is supplied with a positive data signal. The pixel electrode 17B of the pixel 112 is supplied with a negative data signal. The pixel electrode 17C of the pixel 113 is supplied with a positive data signal. The pixel electrode 17D of the pixel 114 is supplied with a negative data signal. The pixel electrode 17E of the pixel 115 is supplied with a positive data signal. The pixel electrode 17F of the pixel 116 is supplied with a negative data signal.

Figure 21:
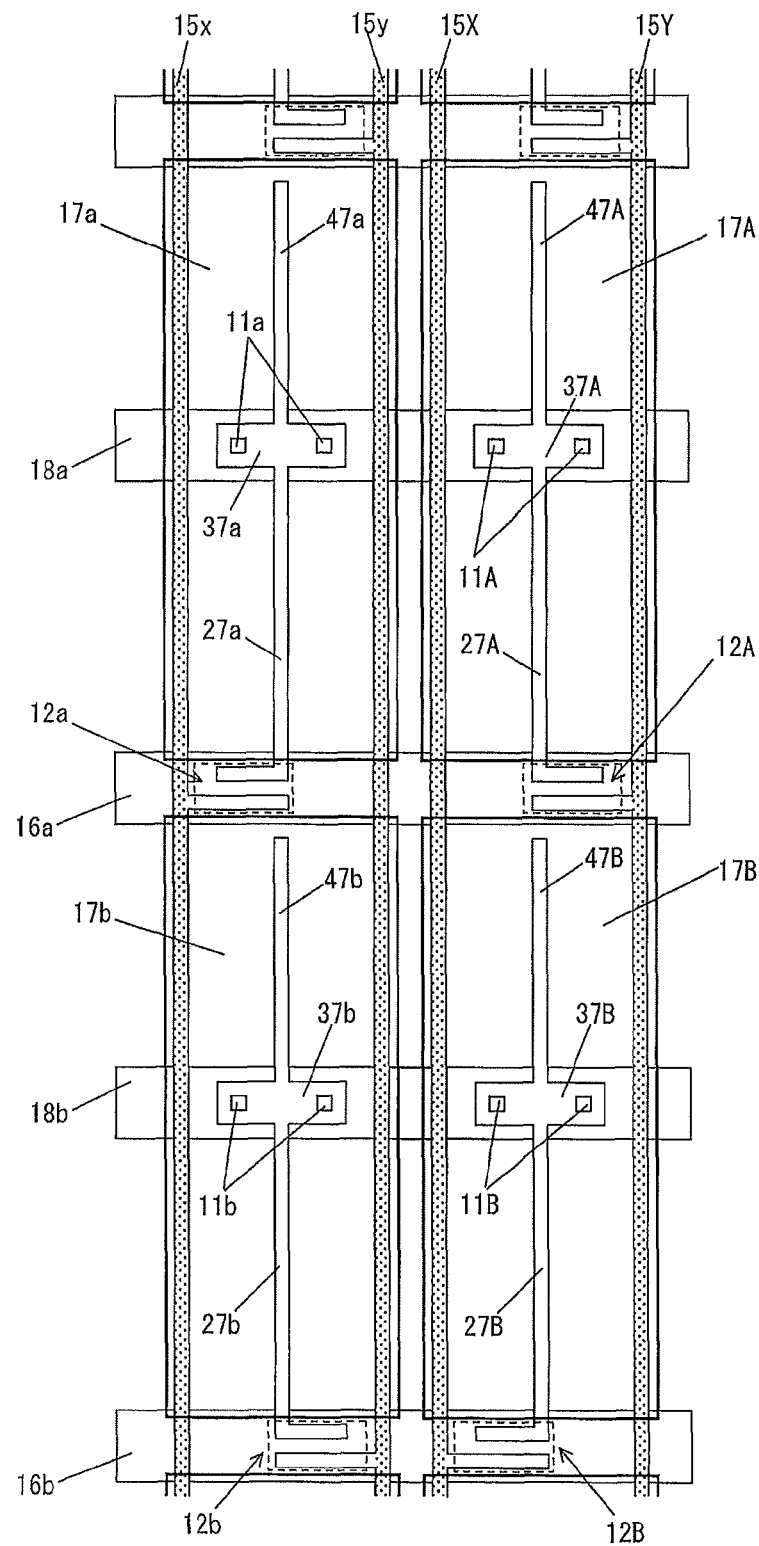
FIG. 21 is a plane view illustrating one example of a configuration of a liquid crystal panel provided with the active matrix substrate of FIG. 18.

FIG. 21 is a plane view illustrating part of a liquid crystal display panel provided with the active matrix substrate of FIG. 18. The liquid crystal panel of the present embodiment is configured similarly to the liquid crystal panel of FIG. 1, except that, in the vicinity of an intersection between the data signal line 15*x* and the scanning signal line 16*a*, the transistor 12*a* is provided. In the vicinity of an intersection between the data signal line 15*y* and the scanning signal line 16*b*, the transistor 12*b* is provided. In the vicinity of an intersection between the data signal line 15Y and the scanning signal line 16*a*, the transistor 12A is provided. In the vicinity of an intersection between the data signal line 15*x* and the scanning signal line 16*b*, the transistor 12B is provided.

In the configuration of this liquid crystal panel, pixels adjacent to each other along the row direction is supplied with data signals of the same polarity. This can prevent horizontal strip display unevenness and flickers.

Figure 22:
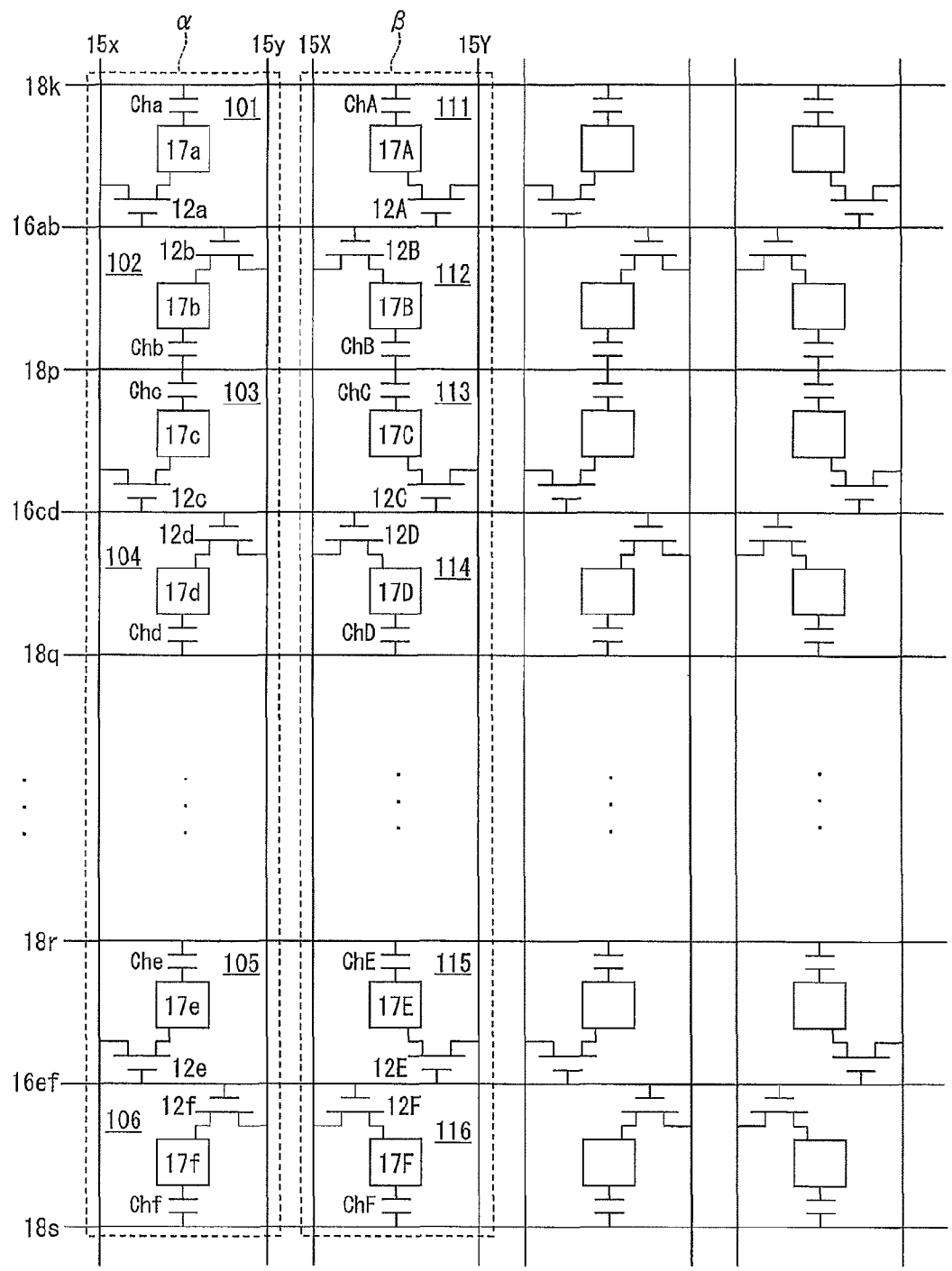
FIG. 22 is an equivalent circuit schematic in which the configuration of the active matrix substrate of Modification 3 of FIG. 18 is applied to the active matrix substrate of Modification 2 of FIG. 15.
Figure 23:
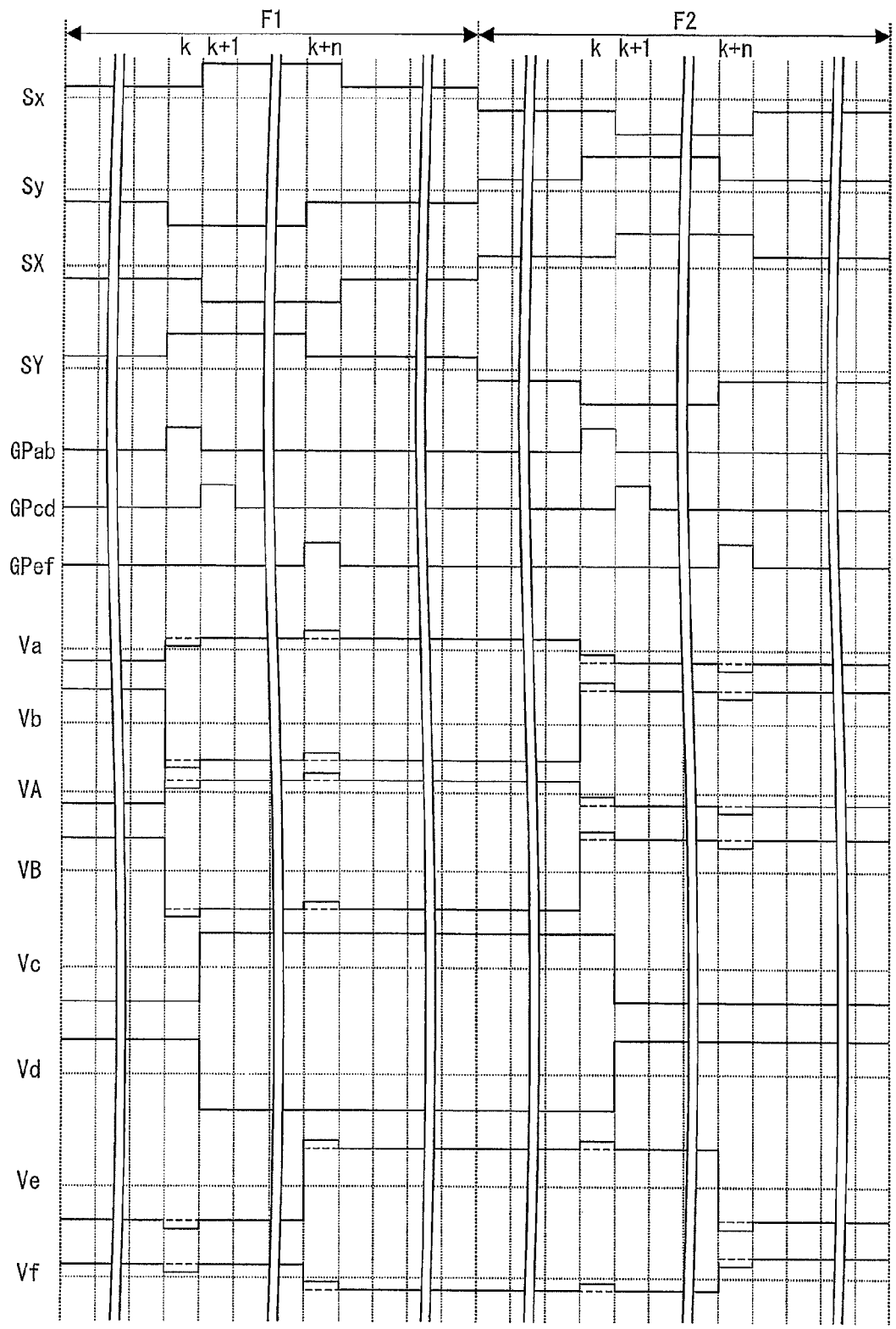
FIG. 23 is a timing charge illustrating a driving method for driving a liquid crystal panel provided with the active matrix substrate of FIG. 22.

Needless to say, the configuration of Modification can be applied to the liquid crystal panels of Modifications 1 and 2. For example, FIG. 22 illustrates an equivalent circuit schematic a case in which the configuration of Modification 3 is applied to the active matrix substrate of Modification 2. FIG. 23 is a timing charge illustrating a driving method of the liquid crystal panel in this case.

Embodiment 2

Embodiment 2 of the present invention is described below referring to drawings. For the sake of easy explanation, the like members having the like functions identical with those in Embodiment 1 are labeled in the same manner and their explanation is not repeated here. The wordings defined in Embodiment 1 are used with the same definition in the present embodiment unless otherwise specified.

FIG. 24 is an equivalent circuit schematic illustrating part of the active matrix substrate according to Embodiment 2. For providing a longer charging time for the liquid crystal display device, one possible configuration is such that pre-charging is performed right before a frame is switched to another. The following describes this more specifically, based on a pixel 103 in FIG. 24 for example. For pixel electrodes 17*c* and 17*d*, scanning signal lines 16*c* and 16*d* are selected at a timing of one horizontal scanning period (1H) prior to a horizontal scanning period in which data signals are formally supplied to the pixel electrodes 17*c* and 17*d*. By this, the pixel electrodes 17*c* and 17*d* are supplied with signals whose potentials are equal to the data signals to be formally supplied to the pixel electrodes 17*c* and 17*d*. In this way, each pixel electrode is supplied with the data signal for two horizontal scanning periods (2H). By this, the liquid crystal display device 2 according to Embodiment 2 can have a longer charging time than the liquid crystal display device 1 according to Embodiment 1.

The liquid crystal display device with such a configuration is associated with a problem that an image as illustrated in (a) of FIG. 25, that is, an image in which pixels a and b (corresponding to pixels 101 and 102 in FIG. 24) display gray while pixels c and d (corresponding to pixels 103 and 104) display white cannot be displayed without display unevenness. The reason why such a problem occurs is as follows. Consider the pixel electrode 17*a* of the pixel 101 and the pixel electrode 17*c* of the pixel 103, for example. In this configuration, the pixel electrode 17*a* of the pixel 101 and the pixel electrode 17*c* of the pixel 103 are supplied with data signals in the same horizontal scanning period in the liquid crystal display device. As a result, if gray scales to be displayed in the pixels 101 and 103 are equal to each other, the display can be normal. But, if gray scales to be displayed in the pixels 101 and 103 are different from each other, the gray scales displayed in the pixels 101 and 103 would possible be different from what are supposed to be. More specifically, for example, in case where an image illustrated in (a) of FIG. 25 is to be displayed, a pixel c is supplied with a data signal for gray at a timing of 1 H prior to the writing period in which the pixel c is to be formally supplied with data signal for white. In other words, the pixel c is supplied with a data signal for gray in the writing period in which a pixel a is supplied with a data signal for gray. After that, the pixel c is supplied with the data signal for white in the formal writing period after the pixel c is supplied with the data signal for gray. As a result, the pixel c displays a color darker than white that the pixel c is supposed to display. Thus, the display image as a whole becomes as illustrated in (b) of FIG. 25.

In the configuration in which a plurality of pixels each connected to a data signal line are supplied with data signal signals concurrently, there is a risk that an image display is displayed with visible unevenness if the signal potential supplied formally and the signal potential supplied preliminarily for the image display are different from each other, as illustrated in (a) of FIG. 25.

FIG. 26 is a timing chart illustrating a driving method (normally black mode) of a liquid crystal panel in case where the liquid crystal display device as described above displays the image illustrated in (a) of FIG. 25. The reference characters Sx, Sy, SX, SY indicate data signals to be supplied to the data signal lines 15*x*, 15*y*, 15X, and 15Y, respectively. The reference characters GPa, GPb, PGc, GPd, GPc', GPd', GPe, and GPf indicate gate signals (scanning signals) supplied to scanning signal lines 16a, 16b, 16c, 16d, 16c', 16d', 16e, and 16f, respectively. The reference characters Va, Vb, VA, VB, Vc, Vd, Vc', Vd', Ve, and Vf indicate potentials of pixel electrodes 17a, 17b, 17A, 17B, 17c, 17d, 17c', 17d', 17e, and 7f.

This driving method, as in Embodiment 1, is arranged such that (i) the scanning signal lines are driven by selecting two of the scanning signal lines concurrently at a time, (ii) the polarities of the data signals to be supplied to the data signals are reversed every frame period (1V), and (iii) in one horizontal scanning period (H), paired data signal lines (a pair of 15x and 15y, or a pair of 15X and 15Y) provided for the same pixel array are supplied with data signals of opposite polarities while each of the pair of data signal lines and a data signal line adjacent thereto (15y and 15 X) are supplied with data signals of the same polarity. Unlike Embodiment 1, the driving method is arranged such that a scanning signal line to which a data signal is to be supplied formally is selected at a timing of 1 H prior to the timing at which the data signal is to be supplied formally.

More specifically, in F1, which is one of sequential frames F1 and F2, the data signal lines 15x and 15Y are supplied with positive data signals in a (k−1)th horizontal scanning period and a k-th horizontal scanning period (including a scanning period of the scanning signal lines 16a and 16b), and are supplied with positive data signals also in the k-th horizontal scanning period and a (k+1)th horizontal scanning period (including a scanning period of the scanning signal lines 16c and 16d). Further, the data signal lines 15x and 15Y are supplied with positive data signals also in the (k+1)th horizontal scanning period and a (k+2)th horizontal scanning period (including a scanning period of the scanning signal lines 16c' and 16d'). the data signal lines 15x and 15Y are supplied with positive data signals also in a (k+n−1)th horizontal scanning period and a (k+n)th horizontal scanning period (including a scanning period of the scanning signal lines 16e and 16f). Meanwhile, the data signal lines 15y and 15X are supplied with negative data signals in the (k−1)th horizontal scanning period and the k-th horizontal scanning period (including the scanning period of the scanning signal lines 16a and 16b), and are supplied with negative data signals also in the k-th horizontal scanning period and the (k+1)th horizontal scanning period (including the scanning period of the scanning signal lines 16c and 16d). Further, the data signal lines 15y and 15X are supplied with negative data signals also in the (k+1)th horizontal scanning period and the (k+2)th horizontal scanning period (including the scanning period of the scanning signal lines 16c' and 16d'). Further, the data signal lines 15y and 15X are supplied with negative data signals also in the (k+n−1)th horizontal scanning period and the (k+n)th horizontal scanning period (including the scanning period of the scanning signal lines 16e and 16f).

At the timing of the start of the (k−1)th horizontal scanning period, pulses of a gate pulse signal GPa and a gate pulse signal GPb are risen. At the timing of the start of the k-th horizontal scanning period, pulses of a gate pulse signal GPc and a gate pulse signal GPd are risen. At the timing of the start of the (k+1)th horizontal scanning period (at the timing of the end of the (k−1)th horizontal scanning period), pulses of a gate pulse signal GPc' and a gate pulse signal GPd' are risen. The gate pulse signals GPa, GPb, GPc, Gpd, GPc', and GPd' are fallen when two horizontal scanning periods (2H) are passed after their respective risings.

In F2, the data signal lines 15x and 15Y are supplied with negative data signals in the (k−1)th horizontal scanning period and the k-th horizontal scanning period (including the scanning period of the scanning signal lines 16a and 16b), and are supplied with negative data signals also in the k-th horizontal scanning period and the (k+1)th horizontal scanning period (including the scanning period of the scanning signal lines 16c and 16d). Further, the data signal lines 15x and 15Y are supplied with negative data signals also in the (k+1)th horizontal scanning period and the (k+2)th horizontal scanning period (including the scanning period of the scanning signal lines 16c' and 16d'). Further, the data signal lines 15x and 15Y are supplied with negative data signals also in the (k+n−1)th horizontal scanning period and the (k+n)th horizontal scanning period (including the scanning period of the scanning signal lines 16e and 16f). Meanwhile, the data signal lines 15y and 15X are supplied with positive data signals in the (k−1)th horizontal scanning period and the k-th horizontal scanning period (including the scanning period of the scanning signal lines 16a and 16b), and are supplied with positive data signals also in the k-th horizontal scanning period and the (k+1)th horizontal scanning period (including the scanning period of the scanning signal lines 16c and 16d). Further, the data signal lines 15y and 15X are supplied with positive data signals also in the (k+1)th horizontal scanning period and the (k+2)th horizontal scanning period (including the scanning period of the scanning signal lines 16c' and 16d'). Further, the data signal lines 15y and 15X are supplied with positive data signals also in the (k+n−1)th horizontal scanning period and the (k+n)th horizontal scanning period (including the scanning period of the scanning signal lines 16e and 16f).

At the timing of the start of the (k−1)th horizontal scanning period, pulses of a gate pulse signal GPa and a gate pulse signal GPb are risen. At the timing of the start of the k-th horizontal scanning period, pulses of a gate pulse signal GPc and a gate pulse signal GPd are risen. At the timing of the start of the (k+1)th horizontal scanning period (at the timing of the end of the (k−1)th horizontal scanning period), pulses of a gate pulse signal GPc' and a gate pulse signal GPd' are risen. The gate pulse signals GPa, GPb, GPc, Gpd, GPc', and GPd' are fallen when two horizontal scanning periods (2H) are passed after their respective risings.

In this driving method, the pixel electrodes 17a and 17b respectively connected to the scanning lines 16a and 16b selected concurrently in the (k−1)th and k-th horizontal scanning periods are supplied with data signals identical in size (having voltage absolute value) but opposite in polarity (a positive data signal for gray is supplied to the pixel electrode 17a, and a negative data signal for gray is supplied to the pixel electrode 17b) in the (k−1)th and k-th horizontal scanning periods. Moreover, the pixel electrodes 17c and 17d respectively connected to the scanning lines 16d and 16d selected concurrently in the k-th horizontal scanning period are supplied with data signals identical in size (having voltage absolute value) but opposite in polarity (a positive data signal for gray is supplied to the pixel electrode 17c, and a negative data signal for gray is supplied to the pixel electrode 17d) in the k-th horizontal scanning period. Next, the pixel electrodes 17c and 17d are formally supplied with data signals identical in size (having voltage absolute value) but opposite in polarity (a positive data signal for white is supplied to the pixel electrode 17c, and a negative data signal for white is supplied to the pixel electrode 17d) in the (k+1)th horizontal scanning period.

In this way, from the (k−1)th horizontal scanning period which is 1 H before the k-th horizontal scanning period in which the formal writing is to be performed, the pixel electrodes 17a and 17b are supplied with data signals for gray, which has the same potential with the data signal that is to be supplied in the k-th horizontal scanning period. This causes no display unevenness in the display image. However, in the k-th horizontal scanning period that is 1H before the (k+1)th horizontal scanning period, which the formal writing period for the pixel electrodes 17c and 17d, the pixel electrodes 17c and 17d are supplied with data signals for gray, which is different from the data signal for white, which are to be formally supplied in the (k+1)th horizontal scanning period. As a result, the signal potentials in the pixel electrodes 17c and 17d become lower than the signal potentials the pixel electrodes 17c and 17d supposed to have formally (the potentials indicated by the dotted lines of Vc and Vd in FIG. 26). Consequently, this causes display unevenness in the display image (see (b) of FIG. 25).

Moreover, in the (k+1)th horizontal scanning period that is 1H before the (k+2)th horizontal scanning period that is the formal writing period for the pixel electrodes 17c' and 17d', the pixel electrodes 17c' and 17d' are supplied with data signals whose potentials are equal to the data signals supplied to the pixel electrodes 17c and 17d but are lower than the signal potentials that the pixel electrodes 17c' and 17d' supposed to have formally. As a result, this causes display unevenness in the display image. However, the signal potentials in the pixel electrodes 17c' and 17d' are not so different from the signal potentials that the pixel electrodes 17c' and 17d' are supposed to have formally, compared with the case of the pixel electrodes 17c and 17d. Thus, influence of the display unevenness in the pixel electrodes 17c' and 17d' is smaller than that in the pixel electrodes 17c and 17d.

(Configuration of Liquid Crystal Display Device)

In view of this, a liquid crystal display device 1 according to Embodiment 2 has a configuration for performing the pre-charging and a configuration for solving the display unevenness of the display image. In the following, the liquid crystal display device 1 according to Embodiment 2 is described mainly on what is different from Embodiment 1.

The liquid crystal display device 1, and a liquid crystal panel and an active matrix substrate constituting the liquid crystal display device 1 are schematically identical with those described in Embodiment 1. Therefore, Embodiment 2 is described referring to the drawings referred in Embodiment 1.

An input line memory 51 temporally stores therein image data for n line(s) (where n is an integer of 3 or more) from among the image data (video signal Dv of FIG. 7) received from the signal source (for example, a tuner) provided externally. Then, the input line memory 51 outputs the image data for n lines at once. When the input line memory 51 receives another image data from outside, the input line memory 51 deletes image data of one line that has been stored therein longer than any other image data of lines, in order to store the another image data instead.

For example, in a configuration in which the input line memory 51 is capable of storing image data of three lines, the input line memory 51 receives and stores first image data, receives and stores second image data, and then receives and stores third image data. Then, the input line memory 51 outputs the first to third image data at once. After that, when the input line memory 51 receives fourth image data, the input line memory 51 deletes the first image data and stores the fourth image data instead. Then, the input line memory 51 outputs the second to fourth image data at once.

Moreover, for example, in a configuration in which the input line memory 51 is capable of storing image data of four lines, the input line memory 51 receives and stores first image data, receives and stores second image data, receives and stores third image data, and then receives and stores fourth image data. Then, the input line memory 51 outputs the first to fourth image data at once. After that, when the input line memory 51 receives fifth image data, the input line memory 51 deletes the first image data and stores the fifth image data instead. Then, the input line memory 51 outputs the second to fifth image data at once.

The position detecting section 52 is configured to detect image data of which line the image data stored in the input line memory 51 is. The detection may be carried out, for example, counting the horizontal sync signal received from the signal source provided externally. By this, display positions of the image data stored in the input line memory 51 and the image data newly received by the input line memory 51 can be identified.

The gray scale converting section 53 is configured to receive the image data from the input line memory 51 and convert the image data into gray scale levels. The conversion may be carried out by, for example, determining the gray scale levels by referring to a table (gray scale conversion LUT 58) in which signal potentials (voltage values) of the image data are associated with the gray scale levels. As one alternative, the conversion may be carried out by, for example, determining the gray scale levels by using a calculation formula.

The correction circuit 54 includes a position determining section 541, a gray scale determining section 542, and a gray scale correcting section 543.

Based on a result of detection performed by the position detecting section 52, the position determining section 541 determines which one of a pair of pixels to which the data signal is to be supplied concurrently the image data is to be supplied (i.e., the position determining section 541 determines whether the image data is to be supplied to the upstream one or downstream one of the pixels). More specifically, the position determining section 541 may be configured to determine which one of the odd-numbered line or the even-numbered line the image data is for. By this, for example, the first to third image data stored in the input line memory 51 can be identified such that the first image data is to be supplied to an upper one of the pair of pixels (i.e., odd-numbered line, pixel 101 of FIG. 24), the second image data is to be supplied to a lower one of the pair of pixels (i.e., even-numbered line, pixel 102 of FIG. 24), and the third image data is to be supplied to an upper one of the next pair of pixels (i.e., odd-numbered line, pixel 103 of FIG. 24). In another example, the second to fourth image data stored in the input line memory 51 can be identified such that the second image data is to be supplied to a lower one of the pair of pixels (i.e., even-numbered line, pixel 102 of FIG. 24), the third image data is to be supplied to an upper one of the next pair of pixels (i.e., odd-numbered line, pixel 103 of FIG. 24), and the fourth image data is to be supplied to a lower one of the next pair of pixels (i.e., even-numbered line, pixel 104 of FIG. 24).

The gray scale determining section 542 is configured to receive the image data of n line(s) from the gray scale converting section 53, and compares the gray scale levels of the image data of n line(s), so as to determine whether the gray scale level are equal to each other or not.

The gray scale level correction section 543 is configured to perform gray scale level correction according to a result of the determination performed by the position determining section 541 and the gray scale determining section 542. For example, among the image data sequentially inputted to the input line memory 51, the firstly inputted image data (first image data) and the secondly inputted image data (second image data), and the thirdly inputted image data (third image data) that is newly inputted to the input line memory 51 externally, the gray scale level of the third image data is corrected to a predetermined gray scale level (post-correction gray scale level) if the first image data and the third image data are different from each other in gray scale level, wherein the first image data and the third image data are to be supplied respectively to a first pixel (for example, the pixel 101 in FIG. 24) and the third pixel (pixel 103 in FIG. 24) from the same data signal line in the same horizontal scanning period. On the other hand, if the first image data and the third image data are equal to each other in gray scale level, the third image data is outputted with uncorrected gray scale level. How to perform the gray scale level correction will be described later. The gray scale determining section 542 may be configured to determine whether or not a difference between the gray scale levels is greater than a predetermined threshold.

(Correction Method of Gray Scale Levels)

As understood from FIGS. 25 and 26, the display unevenness occurs when the potential (absolute value of the voltage) of the data signal supplied prior to (e.g. 1H before) the formal writing is different from the potential (absolute value of the voltage) of the data signal supplied in the formal writing. That is, display unevenness occurs at a boundary between pixels each containing a pixel electrode connected to the same data signal line, if the pixels are supposed to display different gray scales (input gray scale). This is because, as illustrated in FIG. 26, the charging to the pixel electrode in response to the data signal cannot be carried out sufficiently.

In view of this, the liquid crystal display device 1 according to the present embodiment is configured such that the potential of the data signal to be supplied to the pixel electrode in the formal writing is set in consideration of an amount of change in the pixel potential that is expected to be lower than the potential supposed to be (see FIG. 27). The amount of the change (correction amount) in the pixel potential can be preset based on a relationship between gray scale levels of pixel electrodes (pixel electrode 17a and pixel electrode 17c) which are connected with the same data signal line (e.g., data signal line 15x) and are to be supplied with data signals concurrently.

FIG. 28 is a table (gray scale correction LUT 59) in which gray scales of a target pixel, gray scales of a comparative pixel, and output gray scales (post-correction gray scales) are associated with each other. The association can be worked out by measurement (see FIG. 9) described in Embodiment 1. The "Target Pixel" is a pixel whose gray scale is to be corrected. The "comparative pixel" is a pixel which is compared with the "target pixel" in order to perform the correction of the gray scale level of the "target pixel". In the present embodiment, a gray scale difference between the pixels connected to the same data signal line. If there is a gray scale difference between the pixels, that one of the pixels whose formal writing is later than the other is subjected to the gray scale correction. For example, in case of the pixels a and c, the gray scale of the pixel c is corrected if there is a difference in the input gray scales of the pixels a and c. Thus, the pixel a whose formal writing is earlier is the "comparative pixel", and the pixel c whose formal writing is later is the "target pixel".

By referring to the gray scale correction LUT 59, for example, the output gray scale (post-correction gray scale) for the pixel c is set to 174 gray scale level (=160+14), when the target pixel (pixel c) is at 160 gray scale level and the comparative pixel (comparative pixel a) is 0 gray scale level. By setting the post-correction gray scale for pixel c as such, the gray scale level of the pixel c becomes 160 gray scale level. This avoids the display unevenness. Here, the post-correction gray scale may be calculated out from the aforementioned Equation (1).

Here, the process for correcting the gray scale level by using the correction circuit 54 is described based on a concrete example. FIG. 27 illustrates a change in the pixel potential in the liquid crystal display device 1 according to the present embodiment which display an image illustrated in (a) of FIG. 25.

The pixel a outputs the input gray scale without gray scale correction, because (i) the input gray scale of the pixel a and (ii) an input gray scale of a preceding pixel of the pixel a (which preceding pixel is connected to the data signal line 15x and whose formal writing is carried out in the (k−1)th horizontal scanning period are equal (gray)). By this, the pixel electrode 17a is supplied with data signals of the same potential in 1H prior to the formal writing (the (k−1)th horizontal scanning period) and the formal writing period (k-th horizontal scanning period). The potential Va (absolute value of voltage) of the pixel electrode 17a is maintained at, until the next frame (F2), the potential that the potential 17a is supposed to have. Thus, no display unevenness occurs in the pixel a. In the pixel b, the display unevenness is avoided by carrying out a similar process carried out for the pixel a.

On the other hand, the pixel c display with the input gray scale corrected by gray scale correction performed based on the gray scale correction LUT 59 of FIG. 28, because (i) the input gray scale of the pixel c and (ii) an input gray scale of a preceding pixel of the pixel c (which preceding pixel is the pixel a connected to the data signal line 15x and whose formal writing is carried out in the k-th horizontal scanning period are different (gray for the pixel a and white for the pixel c)). That is, in the (k+1)th horizontal scanning period, the pixel electrode 17c in the pixel c is supplied with a data signal of a gray scale level higher than that of the image data (white) inputted externally. By this, in the k-th horizontal scanning period, the potential Vc (absolute value of voltage) of the pixel electrode 17c is lower than the pixel potential that the pixel electrode 17c is supposed to have. However, in the (k+1)th horizontal scanning period, the data signal line 15x is supplied with a positive data signal for the post-correction gray scale level. Due to the potential reduction described above, the potential c (absolute value of voltage) of the pixel electrode 17c becomes equal to the pixel potential (dotted line of Vc in FIG. 26) that the pixel electrode 17c is supposed to have. The potential Vc (absolute value of voltage) of the pixel electrode 17c is maintained at, until the next frame (F2), the potential that the potential 17a is supposed to have. Consequently, the display unevenness illustrated in (b) of FIG. 25 will not occur.

The display unevenness can be avoided in the pixels e and f by performing similar process.

For the pixel c', whose input gray scale is equal to that of the pixel c that is the comparative pixel for the pixel c', the gray scale correction is not performed as in the case of the pixel a. This would lead to a risk that reduction in the pixel potential Vc' as illustrated in FIG. 26 would cause display unevenness in the pixel c'. However, no display unevenness occur actually in the pixel c' due to the correction process for the pixel c preceding the pixel c'. This is because in the (k+1) horizontal scanning period that is 1H before the formal writing of the pixel c', the gray scale correction for the pixel c supplies the pixel c' with a data signal whose gray scale level is higher than the due gray scale level that the pixel c' is supposed to have, and in the formal writing period ((k+2)th horizontal scanning period), the pixel c' is supplied with the data signal of the due gray scale, thereby to cause the potential Vc' (absolute value of voltage) of the pixel electrode 17c' to be maintained, until the next frame (F2), to the due potential or to a potential not so different from the due potential that the potential causes influence on the display quality.

The present invention is not limited to the above-described example in which the data signal is supplied to the pixel electrodes 1H before the formal writing thereof. The data signal may be supplied 2H before the formal writing, or earlier. In the configuration in which the data signal may be supplied 2H before the formal writing, or earlier, the gray scale correction process for the pixel (c) is also carried out by comparing, as in the above-described process, the gray scale of the pixel (c) and that of the pixel a immediately preceding the pixel c, wherein the pixels a and c are connected to the same data signal line.

Moreover, needless to say, Modifications 1 to 3 described in Embodiment 1 can be adopted in the active matrix substrate constituting the liquid crystal display device 1 according to Embodiment 2.

Embodiment 3

Embodiment 3 according to the present invention is described below, referring to drawings. For the sake of easy explanation, the like members having the like functions identical with those in Embodiment 1 or 2 are labeled in the same manner and their explanation is not repeated here. The wordings defined in Embodiment 1 are used with the same definition in the present embodiment unless otherwise specified.

For the liquid crystal display device 1 according to Embodiment 2, it is possible to surely solve the display unevenness in displaying an image illustrated in (a) of FIG. 36 (an image as illustrated in (a) of FIG. 25), that is, with gray pixels a and b (corresponding to the pixel 101 and 102 in FIG. 24) and white pixels c and d (corresponding to pixels 103 and 104), but it is difficult to do so in displaying an image illustrated in (b) of FIG. 36 with a gray pixel a (the pixel 101 of FIG. 24) and a white pixel b (corresponding to pixel 102), wherein the pixels a and b are a pair of pixels respectively associated with scanning signal lines that are concurrently selected. This is because displaying the image as illustrated in (b) of FIG. 36 is easily affected by an influence from a potential change caused due to the parasite capacitance as described in Embodiment 1.

Suppose that, in the image illustrated in (b) of FIG. 36, the input gray scale of the pixel a is (R, G, B)=(32, 128, 192), and the input gray scale of the pixel b is (R, G, B)=(192, 128, 32). In this case, the post-correction gray scale is determined based on the gray scale correction LUT 59 of FIG. 11 such that the input gray scale of the pixel a is corrected as (R, G, B)=(11, 128, 201), and the input gray scale of the pixel b is (R, G, B)=(201, 128, 11). However, observation of the display image with the post-correction gray scales found that display unevenness occurred in pixel b. In order to analyze the display unevenness, displayed gray scales of the image displayed without gray scale correction were measured to find that the display gray scale of the pixel a was (R, G, B)=(52, 128, 183), and the input gray scale of the pixel b was (R, G, B)=(180, 128, 59). The display gray scale of the pixel b was supposed to be (R, G, B)=(183, 128, 53). From this, it can be understood that this error was the cause of the display unevenness. Furthermore, it can be deduced that the post-correction gray scale of the pixel b should have been (R, G, B)=(204, 128, 5), rather than (R, G, B)=(201, 128, 11) obtained based FIG. 11.

As described above, in the configuration in which adjacent two pixels are supplied with data signals concurrently by selecting subsequent two scanning signal lines concurrently and the pixels are supplied (pre-charged) with the data signals since a certain time (for example 1H) before the formal writing, it is difficult to solve the display unevenness completely if the gray scales of the paired pixels are different from each other.

(Configuration of Liquid Crystal Display Device)

A liquid crystal display device 1 according to Embodiment 3 has a configuration capable of solving the display unevenness in the display image in the above-mentioned configuration. In the following, the liquid crystal display device 1 according to Embodiment 3 is described as to what is different from Embodiments 1 and 2.

The liquid crystal display device 1 and a liquid crystal panel and an active matrix substrate constituting the liquid crystal display device 1 are schematically identical with those described in Embodiment 1 and 2. FIG. 29 is a block diagram for explaining details of a display control circuit of the liquid crystal display device 1. A display control circuit 50' of the liquid crystal display device 1 is identical with one in Embodiment 1 and 2 except that the display control circuit 50' includes a correction circuit 54' and a gray scale correction LUT 59', instead of the correction circuit 54 and the gray scale correction LUT 59 of FIG. 8. In the following, the display control circuit 50' is described by referring to FIG. 29 and the drawings referred in Embodiment 1 or 2, where appropriate.

An input line memory 51 temporally stores therein image data for n line(s) (where n is an integer of 3 or more) from among the image data (video signal Dv of FIG. 7) received from the signal source (for example, a tuner) provided externally. Then, the input line memory 51 outputs the image data for n lines at once. When the input line memory 51 receives another image data from outside, the input line memory 51 deletes image data of one line that has been stored therein longer than any other image data of lines, in order to store the another image data instead.

For example, in a configuration in which the input line memory 51 is capable of storing image data of three lines, the input line memory 51 receives and stores image data (first image data) for the first horizontal scanning period, receives and stores second image data, and then receives and stores third image data. Then, the input line memory 51 outputs the first to third image data at once. After that, when the input line memory 51 receives fourth image data, the input line memory 51 deletes the first image data and stores the fourth image data instead. Then, the input line memory 51 outputs the second to fourth image data at once.

Moreover, for example, in a configuration in which the input line memory 51 is capable of storing image data of four lines, the input line memory 51 receives and stores first image data, receives and stores second image data, receives and stores third image data, and then receives and stores fourth image data. Then, the input line memory 51 outputs the first to fourth image data at once. After that, when the input line memory 51 receives fifth image data, the input line memory 51 deletes the first image data and stores the fifth image data instead. Then, the input line memory 51 outputs the second to fifth image data at once.

The position detecting section 52 is configured to detect image data of which line the image data stored in the input line memory 51 is. The detection may be carried out, for example, counting the horizontal sync signal received from the signal source provided externally. By this, display positions of each image data stored in the input line memory 51 can be identified.

The gray scale converting section 53 is configured to receive the image data from the input line memory 51 and convert the image data into gray scale levels. The conversion may be carried out by, for example, determining the gray scale levels by referring to a table (gray scale conversion LUT 58) in which signal potentials (voltage values) of the image data are associated with the gray scale levels. As one alternative, the conversion may be carried out by, for example, determining the gray scale levels by using a calculation formula.

The correction circuit 54' includes a position determining section 541, a gray scale determining section 542, and a gray scale correcting section 543.

Based on a result of detection performed by the position detecting section 52, the position determining section 541 determines which one of a pair of pixels to which the data signal is to be supplied concurrently the image data is to be supplied (i.e., the position determining section 541 determines whether the image data is to be supplied to the upstream one or downstream one of the pixels). More specifically, the position determining section 541 may be configured to determine which one of the odd-numbered line or the even-numbered line the image data is for. By this, for example, among the image data sequentially inputted to the input line memory 51, the firstly inputted image data (first image data), the secondly inputted image data (second image data), and the thirdly inputted image data (third image data) can be identified such that the first image data is to be supplied to an upper one of the pair of pixels (i.e., odd-numbered line, pixel 101 of FIG. 24), the second image data is to be supplied to a lower one of the pair of pixels (i.e., even-numbered line, pixel 102 of FIG. 24), and the third image data is to be supplied to an upper one of the next pair of pixels (i.e., odd-numbered line, pixel 103 of FIG. 24). In another example, the second to fourth image data stored in the input line memory 51 can be identified such that the second image data is to be supplied to a lower one of the pair of pixels (i.e., even-numbered line, pixel 102 of FIG. 24), the third image data is to be supplied to an upper one of the next pair of pixels (i.e., odd-numbered line, pixel 103 of FIG. 24), and the fourth image data is to be supplied to a lower one of the next pair of pixels (i.e., even-numbered line, pixel 104 of FIG. 24).

Moreover, based on the above process, the position determining section 541 determines whether or not the second image data (second image data) and the third image data (third image data) are image data to be supplied to the pair of pixels that are to be selected concurrently.

The gray scale determining section 542 is configured to receive the image data of n line(s) from the gray scale converting section 53, and compares the gray scale levels of the image data of n line(s), so as to determine whether the gray scale level are equal to each other or not. More specifically, the gray scale determining section 542 performs the following determination processes (1) and (2) for the first imaged data, the second image data, and the third image data. Here, it is supposed that the data signals are supplied 1H before the formal writing. The first image data and the third image data are, therefore, to be supplied to the first pixel (for example, the pixel 101 of FIG. 24) and the third pixel (pixel 103) to which the data signals are supplied from the same data signal line in the same horizontal scanning period.

(1) Determine whether the gray scales for the second image data and the third image data are equal or not.

(2) Determine whether the gray scales for the first image data and the third image data are equal or not.

The gray scale correction section 543 performs gray scale correction based on results of the determinations performed by the position determining section 541 and the gray scale determining section 542. In the following, one concrete example of an operation of the correction circuit 54' is explained based on the operation flow diagram of FIG. 30.

To begin with, in Step 1 (hereinafter, abbreviated as S1), the correction circuit 54' is notified of the gray scale levels for the first to third image data from the gray scale converting section 53.

Then, the position determining section 541 determines whether or not the second image data and the third image data stored in the input line memory 51 are to be supplied respectively to the pair of pixels that are to be concurrently selected (S2).

If the second image data and the third image data stored in the input line memory 51 are to be supplied respectively to the pair of pixels that are to be concurrently selected (Yes in S2; for example, the second image data is to be supplied to the pixel 101, and the third image data is to be supplied to the pixel 102), the gray scale determining section 542 determines whether or not the gray scales of the second image data and the third image data are equal to each other (S3).

If the gray scales of the second image data and the third image data are equal to each other (yes in S3), the gray scale determining section 542 further determines whether or not the gray scale levels of the first image data and the third image data are equal to each other (S4). If No in S2, that is, if the second image data and the third image data stored in the input line memory 51 are not to be supplied respectively to the pair of pixels that are to be concurrently selected (for example, the second image data is to be supplied to the pixel 102, and the third image data is to be supplied to the pixel 103), the process goes to S4.

If the gray scale levels of the first image data and the third image data are equal to each other (Yes in S4), the correction circuit 54' outputs the third image data with the gray scale level (input gray scale level) uncorrected (S5). On the other hand, if the gray scale levels of the first image data and the third image data are not equal to each other (No in S4), the gray scale correction section 543 corrects the gray scale level of the third image data (input gray scale level) by referring to a first gray scale correction LUT (a first LUT 591 in FIG. 32), and outputs the third image data with the post-correction gray scale level (S6).

If No in S3, that is, if the gray scales of the second image data and the third image data are not equal to each other, the gray scale correcting section 543 corrects the gray scale level of the second image data by referring to the first gray scale correction LUT (the first LUT 591), and corrects the gray scale level of the third image data by referring to the second gray scale correction LUT (a second LUT 592 in FIG. 34), and outputs the second and third image data with the post-correction gray scale level (S7).

This is explained with one concrete example below. In case where the second image data and the third image data are respectively to be supplied to a pair of the pixels a and b in order to display an image as illustrated in (a) of FIG. 36, S2 to S4 in the flow diagram of FIG. 30 are Yes. Thus, the third image data for the pixel b is outputted with the input gray level uncorrected by the gray scale correction process (S5). Moreover, in case where the second image data and the third image data are respectively to be supplied to a pair of the pixels c and d in order to display an image as illustrated in (a) of FIG. 36, S2 and S3 are Yes but S4 is No in the flow diagram of FIG. 30. Accordingly, the third image data for the pixel d is corrected on the basis of the first LUT 591, and the third image data is outputted with the post-correction gray scale level (S6). In case where the second image data and the third image data are respectively to be supplied to a pair of the pixel a and the preceding pixel preceding the pixel a, S2 is No, and S4 is Yes in the flow diagram of FIG. 30. Accordingly, S5 is carried out. In case where the second image data and the third image data are respectively to be supplied to the pixels b and c, S2 is No, and S4 is No in the flow diagram of FIG. 30. Accordingly, S6 is carried out.

Moreover, in case where the second image data and the third image data are respectively to be supplied to a pair of the pixels a and b in order to display an image as illustrated in (b) of FIG. 36, S2 are Yes but S3 is No in the flow diagram of FIG. 30. Accordingly, the second image data for the pixel a is corrected on the basis of the first LUT 591, and the third image data for the pixel b is corrected on the basis of the second LUT 592, and the image data for the pixels and b are outputted with the post-correction gray scale levels (S7). In case where the second image data and the third image data are respectively to be supplied to a pair of the pixels b and c in order to display an image as illustrated in (b) of FIG. 36, S2 are No but S4 is No in the flow diagram of FIG. 30. Accordingly, S6 is carried out.

Here, in the operations in S5 and S6, the third image data inputted latest among the image data is the pixel (target pixel) for which it is determined whether to perform the gray scale correction. That is, at the time these operations are performed for the third image data, the output gray scales for the first image data and the second image data have been inputted in the output line memory 55 from the correction circuit 54. On the other hand, in the operation in S7, any of the pixels for the second image data and third image data stored in the input line memory 51 can be the target pixel. That is, when the gray scale level of the second image data for the pixel a is to be determined, the pixel a is the "target pixel" while the pixel b is the "comparative pixel". When the gray scale level of the third image data for the pixel b is to be determined, the pixel b is the "target pixel" while the pixel a is the "comparative pixel". Moreover, when the gray scale level of the second image data for the pixel a is to be determined, the first LUT 591 is referred. When the gray scale level of the third image data for the pixel b is to be determined, the second LUT 592 is referred. Therefore, the operation in S7 is carried out for image data of two lines (second and third image data) for a pair of pixels, and both of output gray scales thus worked out are outputted to the output line memory 55. Moreover, when gray scales of the image data of next two lines (third and fourth image data) are determined after output gray scales of the image data of two lines (second and third image data) are stored in the output line memory 55, only the output gray scale of the fourth image data is stored in the output line memory 55.

Here, concrete examples of the first LUT 591 and the second LUT 592 are described. FIG. 31 is a table (first correction amount LUT) in which gray scales of a target pixel, gray scales of a comparative pixel, and correction amounts are associated as determined based on the measurement of FIG. 9. FIG. 32 is a table (first gray scale correction LUT: First LUT 591) in which the gray scales of a target pixel, the gray scales of a comparative pixel, and output grays scales (post-correction gray scales) are associated based on the first correction amount LUT. The values on the tables of FIGS. 31 and 32 are equal to those on the tables FIGS. 10 and 11.

Moreover, FIG. 33 is a table (second correction amount LUT) in which gray scales of a target pixel, gray scales of a comparative pixel, and correction amounts are associated. FIG. 34 is a table (second gray scale correction LUT: Second LUT 592) in which the gray scales of a target pixel, the gray scales of a comparative pixel, and output grays scales (post-correction gray scales) are associated based on the second correction amount LUT. The correction amount in FIG. 33 can be also worked out based on the measurement of FIG. 9. As described above, the amount of change in the pixel potential is greater in the pixel b than in the pixel a. Thus, the second LUT 592 is set such that the post-correction gray scales are greater than those in the first LUT 591.

According to the liquid crystal display device 1 of Embodiment 3, for example, in case where the input gray scale of the pixel a is (R, G, B)=(32, 128, 192) and the input gray scale of the pixel b is (R, G, B)=(192, 128, 32) in the image illustrated in (b) of FIG. 36, the output gray scales (post-correction gray scales) for the pixel a is set to (R, G, B)=(11, 128, 201) on the basis of the first LUT 591 of FIG. 32, and the output gray scales (post-correction gray scales) for the pixel a is set to (R, G, B)=(204, 128, 5) on the basis of the first LUT 592 of FIG. 34. By this, the pixel potentials in the pixels a and b after the potential change becomes more faithful to the input gray scales, thereby solving the display unevenness in the display image.

Moreover, needless to say, Modifications 1 to 3 described in Embodiment 1 can be adopted in the active matrix substrate constituting the liquid crystal display device 1 according to Embodiment 3.

The liquid crystal devices 1 according to the aforementioned embodiments may be configured as the configurations (1) to (8) described below.

(1) Gate lines and source lines are provided in matrix, and each pixel is provided with a TFT. The TFTs are connected to the gate lines in such a manner that two arrays of TFTs along a scanning line (a vertical direction) are connected with gate lines having identical timings. The pixels arrayed along the scanning directions are provided with different ones of the source lines on either sides of each array, and every one pixel in the array is connected alternatively with one or the other of the source lines provided on either sides of the array. Potentials of the source lines connected with the same array are different from each other in polarity, and reversed every scanning period. With this configuration, the inputted image is inputted in a correction circuit. The correction circuit compares a target pixel and a comparative pixel, so as to cause a gray scale difference between post-correction gray scales to be greater than a gray scale difference between the input gray scales. Moreover, a position detecting circuit (position detecting section) for finding out a position of the target pixel along the scanning direction is provided. Which pixel is the comparative pixel is determined according to the coordinal position of the target pixel. The comparative pixel is a pixel on an upstream or downstream of the target pixel. Edge reinforcement is carried out by selectively using, as the comparative pixel, the pixel on the upstream or downstream of the target pixel. By this, ghost (unclear edge) due to cross talk can be avoided selectively.

(2) The position detecting circuit counts the vertical position of the target pixels. For the even-numbered target pixels, a pixel on the downstream thereof is selected as the comparative pixel. For the odd-numbered target pixels, a pixel on the upstream thereof is selected as the comparative pixel. By using the position detecting circuit as a line counter, the determination on whether the target pixel is odd-numbered or even numbered can be performed with least significant bit. Further, counter resetting may be offset based on panel information (for example, a contradiction amount between gate lines and display positions), thereby realizing a control circuit that can be easily adopted to various conditions. Further, this makes it possible for the control circuit to deal with a non-display timing area specially.

(3) The position detecting circuit sends a signal that is alternated every horizontal period. A pixel on the downstream of the target pixel is selected as the comparative pixel when the signal is high. A pixel on the upstream of the target pixel is selected as the comparative pixel when the signal is low. In general, it is rare that the presence of a non-display period or the like worsens the cross talk problem. Thus, this configuration makes it possible to the reversing with respect to the odd-numbered and the even-numbered by using a circuit of a smaller size.

(4) The position detecting circuit has a circuit for selecting another one of the pixels for comparison by referring to a detected positional signal.

Depending on different panel driving conditions, the same panel configuration would perform display shifted by one line, would have a dummy line, would have an extra wiring for the gate driver, or would have the other change. Thus, there are many cases the predetermined timings for the even-numbered and for odd-numbered should be exchanged to cope with the change. Thus, it is preferable to have a mechanism for responding in an alternative way as appropriate.

(5) The correction circuit comprises a correction circuit 1 for performing the correction in which the comparative pixel is the downstream pixel, and a correction circuit 2 for performing the correction in which the comparative pixel is the upstream pixel, wherein the correction circuit outputs a correction value that is one of outputs of the correction circuit 1 and correction circuit 2 depending on a detection position signal outputted from the position detecting circuit. The correction circuit with this configuration has a larger circuit size than the correction circuit in which the comparative pixel is determined. However, the correction circuit with this configuration can cope with a case where there is a difference in cross talk on the upstream and the downstream.

(6) The correction circuit is configured to perform the correction of the input gray scales on the basis of an LUT which is referred with the input gray scales and comparative pixel gray scales. Among three pixels, only the comparative pixel is inputted in referring the LUT. This allows the LUT to be smaller in size.

(7) The correction circuit 1 and the correction circuit 2 are configured to output the same post correction value for the same combination of the gray scales. By this, it is possible to refer to the same LUT for the correction circuit 1 and the correction circuit 2, thereby saving resources.

(8) In some cases the correction circuit 1 and the correction circuit 2 output the post correction values different in correction amount, wherein the correction amount of the post correction value of the correction circuit 1 is at least not less than that of the correction circuit 2. This makes it possible to absorb a difference between asymmetric cross talks on the upstream and the downstream. Further, this makes it possible to deduce a mode thereof and defines in such a way to avoid that only one of the upstream and the downstream is always smaller.

Blocks of the liquid crystal display devices 1, especially the correction circuit 54, 54', may be realized by way of hardware or software as executed by a CPU as follows:

The liquid crystal display device 1 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The object of the present invention can also be achieved by mounting to liquid crystal display device 1 a computer-readable storage medium containing control program code (executable program, intermediate code program, or source program) for the liquid crystal display device 1, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The liquid crystal display device 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a carrier wave or data signal transmission in which the program code is embodied electronically.

Finally, an exemplary configuration of a liquid crystal display unit according to the present invention is explained here. In the embodiments described above, the liquid crystal display unit is configured in the following way. On either sides of the liquid crystal panel, two polarizers A and B are attached in such a way that a polarization axis of the polarizer A crosses that of the polarizer B perpendicularly. If necessary, the polarizers A and B may be provided with an optical compensation sheet or the like limited thereon. Next, as illustrated in (a) of FIG. 41, drivers (gate drivers 202 and source driver 201) are connected to the liquid crystal panel. Here, TCP (Tape Career Package) method is described as an example of the connecting the drivers to the liquid crystal panel. To begin with, an ACF (Anisotropic Conductive Film) is adhered to a terminal section of the liquid crystal panel by temporal pressure bonding. Then, a TCP on which a driver is mounted is punched out. The TCP is placed on the ACF by positioning the TCP with respect to panel terminal electrodes. Then, non-temporal pressure bonding is carried out for the driver TCP. After that, an input terminal of the TCP is connected, via the ACF, with a circuit substrate 203 (PWB: Printed Wiring Board) via which the TCPs are connected with one another. In this way, the liquid crystal display unit 200 is prepared. After that, as illustrated in (b) of FIG. 41, each driver (201 and 202) of the liquid crystal display unit is connected with a display control circuit 209 via the circuit substrate 203. Then, the liquid crystal display unit 200 is integrated with an illuminating device (backlight unit) 204. Thereby, a liquid crystal display device 210 is prepared.

What is meant by the term "polarity of a potential" in the present application is that the potential is equal to or greater than a reference potential, or that the potential is equal to or less than the reference potential. Here, the reference potential may be Vcom (common potential), which is a potential of a common electrode (counter electrode), or any other arbitrary potential.

Next, an exemplary configuration in which the liquid crystal display device 1 is applied to a television receiver. FIG. 42 is a block diagram illustrating a configuration of a liquid crystal display device 800 for a television receiver. The liquid crystal display device 800 includes a liquid crystal display unit 84, a Y/C separation circuit 80, a video chroma circuit 81, an A/D converter 82, a liquid crystal controller 83, a backlight driving circuit 85, a backlight 86, a microcomputer 87, and a gray scale circuit 88. The liquid crystal display unit 84 includes a liquid crystal panel, and a source driver and a gate driver for driving the liquid crystal panel.

In the liquid crystal display device 800 with the configuration, firstly, a composite picture signal Scv (television signal) is inputted to a Y/C separation circuit from outside. The Y/C separation circuit separates the composite picture signal Scv into a luminance signal and a color signal. The video chroma circuits 81 converts the luminance signal and the color signal into an analog RGB signals corresponding to the three primary color of light. The A/D converter 82 converts the analog RGB signal into a digital RGB signal. The digital RGB signal is inputted to the liquid crystal controller 83. Moreover, the Y/C separation circuit 80 extracts horizontal and vertical sync signals from the composite picture signal Scv. These sync signals are inputted to the liquid crystal controller 83 via the microcomputer 87.

The liquid crystal controller 83 inputs the digital RGB signal to the liquid crystal display unit 84 at a predetermined timing together with a timing signal based on the sync signals. Moreover, the gray scale circuit 88 generates gray scale potentials for the primary colors R, G, B for color display. These gray scale potentials are also supplied to the liquid crystal display unit 84. The liquid crystal display unit 84 generates a driving signal (data signal=signal potential, scanning signal etc.) on the basis of the RGB signal, the timing signal, and the gray scale potentials by the source driver and the gate driver provided in the liquid crystal display unit 84. Based on the driving signal, the liquid crystal panel displays a color image. In order to display with the liquid crystal display unit 84, it is necessary to backlight the liquid crystal panel inside the liquid crystal display unit. In the liquid crystal display device 800, the backlight driving circuit 85 drives the backlight 86 under the control of the microcomputer 87, thereby backlighting the liquid crystal panel. The control of the whole system, including this process, is carried out by the microcomputer 87. The video signal (composite picture signal) is not limited to the video signal for television broadcast, and may be a video signal recorded by a camera, or a video signal supplied via the Internet. The liquid crystal display device 800 is capable of performing image display based on various video signals.

In case where the liquid crystal display device 800 is used to display an image based on the television broadcast, the liquid crystal display device 800 is connected with a tuner section 90, as illustrated in FIG. 43. By this, a television receiver 601 according to the present invention is constituted. From a receiving wave (high-frequency signal) received via an antenna (not illustrated), the tuner section 90 extracts a signal of a channel that the tuner section 90 should receive. Then, the tuner 90 converts the signal to an intermediate frequency signal. The tuner 90 detects the intermediate frequency signal, thereby extracting a composite picture signal Scv as the television signal. The composite picture signal Scv is inputted into the liquid crystal display device 800, as described above. The liquid crystal display device 800 displays an image based on the composite picture signal Scv.

FIG. 44 is an exploded perspective view illustrating an exemplary configuration of the television receiver according to the present invention. As illustrated in FIG. 44, the television receiver 601 includes, as its constituent elements, a first housing 801 and a second housing 806, in addition to the liquid crystal display device 800. The television receiver 601 is configured such that the liquid crystal display device 800 is housed between the first housing 801 and the second housing 806 sandwiching the liquid crystal display device 800. The first housing 801 has an opening 801a via which the image displayed on the liquid crystal display device 800 can be seen. Moreover, the second housing 806 is to cover a backside of the liquid crystal display device 800, and is provided with an operation circuit 805 for operating the display device 800, and is attached with a supporting member 808 in a lower part of the second housing 806.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

An active matrix substrate according to the present invention and a liquid crystal panel provided with the same is suitably applicable to a liquid crystal television, for example.

The invention claimed is:

1. A display device comprising a plurality of scanning signal lines and a plurality of data signal lines, the data signal lines being provided to pixel arrays in such a manner that first and second pixel arrays being adjacent to each other and each including a plurality of pixels are provided with two data signal lines each, wherein each pixel includes one or plural pixel electrodes;

the scanning signal lines are selected in such a manner that every N number of the scanning signal lines are selected concurrently (N is an integer of 1 or greater);

each of the first and second pixel arrays is such that one pixel electrode contained in one of two pixels arranged in sequence and one pixel electrode contained in the other one of the two pixels arranged in sequence are connected with different ones of the data signal lines via respective transistors;

a transistor connected with the one pixel electrode contained in the one of two pixels arranged in sequence, and a transistor connected with the one pixel electrode contained in the other one of the two pixels arranged in sequence are connected respectively with the N number of scanning signal lines selected concurrently;

the display device performs correction of input gray scales of data signals inputted to the display device externally, the display device performing the correction in such a manner that when the input gray scales of the data signal inputted to the display device externally so as to be supplied respectively to the pixel electrodes contained in the two pixels arranged in sequence are different from each other, both the input gray scales are corrected so as to cause the gray scale difference between post-correction gray scales to be greater than the gray scale difference between the input gray scales; and, the display device displays with the post-correction gray scales, wherein the display device further comprises a correction circuit for correcting gray scales of the data signals, and when the correction circuit corrects the input gray scale of the one of the two pixels arranged in sequence, the correction circuit corrects the input gray scale on the basis of the input gray scale of the other one of the two pixels arranged in sequence, wherein the post-correction gray scale is calculated from the following Formula:

Post-correction gray scale level of Target Pixel=Input Gray scale level of Target Pixel+$k$×(Input Gray scale level of Target pixel−Input Gray scale level of Comparative Pixel), where:
the target pixel is that one of the two pixels arranged in sequence, whose input gray scale is to be corrected; and
the comparative pixel is that one of the two pixels arranged in sequence which is to be compared with the target pixel in correcting the input gray scale of the target pixel.

2. The display device as set forth in claim 1, wherein:
N=2, so that the scanning signal lines are selected in such a manner that every two scanning signal lines are selected concurrently;
the transistor connected with the one pixel electrode contained in the one of two pixels arranged in sequence is connected with one of the two scanning signals selected concurrently, and the transistor connected with the one pixel electrode contained in the other one of the two pixels arranged in sequence is connected with the other one of the two scanning signals selected concurrently.

3. The display device as set forth in claim 1, wherein:
the pixel electrodes contained in the first pixel array are provided to overlap both of the two data signal lines provided for the first pixel array; and
the pixel electrodes contained in the second pixel array are provided to overlap both of the two data signal lines provided for the second pixel array.

4. The display device as set forth in claim 1, wherein:
the data signal lines are supplied with the data signals in such a manner that a pair of data signal lines provided for one pixel array are supplied respectively with data signals of different polarities in a horizontal scanning period.

5. The display device as set forth in claim 1, wherein each pixel contains the plural pixel electrodes.

6. The display device as set forth in claim 1, wherein each pixel contains the two pixel electrodes connectable with each other via a capacitance, only one of the two pixel electrodes is connected with one of the data signal lines for the pixel via the transistor connected with one of the scanning signal lines.

7. A method of driving a display device comprising a plurality of scanning signal lines and a plurality of data signal lines, the data signal lines being provided to pixel arrays in such a manner that first and second pixel arrays being adjacent to each other and each including a plurality of pixels are provided with two data signal lines each, wherein:
each pixel includes one or plural pixel electrodes;
the scanning signal lines are selected in such a manner that every N number of the scanning signal lines are selected concurrently (N is an integer of 1 or greater);
each of the first and second pixel arrays is such that one pixel electrode contained in one of two pixels arranged in sequence and one pixel electrode contained in the other one of the two pixels arranged in sequence are connected with different ones of the data signal lines via respective transistors; and
a transistor connected with the one pixel electrode contained in the one of two pixels arranged in sequence, and a transistor connected with the one pixel electrode contained in the other one of the two pixels arranged in sequence are connected respectively with the N number of scanning signal lines selected concurrently,
the method comprises:
performing correction of input gray scales of data signals inputted to the display device externally, wherein the correction is performed in such a manner that if the input gray scales of the data signal inputted to the display device externally so as to be supplied respectively to the pixel electrodes contained in the two pixels arranged in sequence are different from each other, both the input gray scales are corrected so as to cause the gray scale difference between post-correction gray scales to be greater than the gray scale difference between the input gray scales,
correcting the input gray scale, using a correction circuit, on the basis of the input gray scale of the other one of the two pixels arranged in sequence, when correcting the input gray scale of the one of the two pixels arranged in sequence; and
displaying with the post-correction gray scales,
wherein the post-correction gray scale is calculated from the following Formula:

Post-correction gray scale level of Target Pixel=Input Gray scale level of Target Pixel+$k$×(Input Gray scale level of Target pixel−Input Gray scale level of Comparative Pixel), where:
the target pixel is that one of the two pixels arranged in sequence, whose input gray scale is to be corrected; and
the comparative pixel is that one of the two pixels arranged in sequence which is to be compared with the target pixel in correcting the input gray scale of the target pixel.

8. A liquid crystal display device, comprising a display device as set forth in claim 1.

9. A television receiver comprising a liquid crystal display device as set forth in claim 8 and a tuner for receiving television broadcast.

* * * * *